United States Patent [19]
Shinohara et al.

[11] Patent Number: 5,737,042
[45] Date of Patent: Apr. 7, 1998

[54] IMAGE DISPLAY DEVICE WITH OPTICAL LOW-PASS FILTER

[75] Inventors: Masayuki Shinohara, Takatsuki; Shigeru Aoyama, Kyoto, both of Japan

[73] Assignee: Omron Corporation, Kyoto, Japan

[21] Appl. No.: 521,477

[22] Filed: Aug. 30, 1995

[30] Foreign Application Priority Data

Aug. 31, 1994 [JP] Japan .................. 6-229084

[51] Int. Cl.$^6$ .................. G02F 1/1335; G02B 27/46; G09F 9/00
[52] U.S. Cl. .................. 349/57; 349/104; 349/109; 349/112; 359/569; 348/342
[58] Field of Search .................. 349/5, 145, 7, 349/57, 104, 105, 106, 122, 109, 112; 359/498, 891, 566, 569, 570, 574; 348/333, 341, 342, 760, 761, 291; 345/32

[56] References Cited

U.S. PATENT DOCUMENTS

| | | | |
|---|---|---|---|
| 5,046,827 | 9/1991 | Frost et al. | 349/109 |
| 5,300,942 | 4/1994 | Dolgoff | 345/32 |
| 5,513,025 | 4/1996 | Watanabe et al. | 349/112 |
| 5,550,663 | 8/1996 | Nishizaki et al. | 349/201 |
| 5,621,487 | 4/1997 | Shirochi | 349/112 |

FOREIGN PATENT DOCUMENTS 63-114475  5/1988  Japan .
3-293316  12/1991  Japan .

*Primary Examiner*—William L. Sikes
*Assistant Examiner*—Tai V. Duong
*Attorney, Agent, or Firm*—Foley & Lardner

[57] ABSTRACT

An image display device is so adapted as to eliminate both largest and next largest noise components. The image display device includes an image display body having a plurality of pixels arranged periodically in two dimensions and an optical low-pass filter placed on or above the front surface of the image display body. One of two cut-off spatial frequencies in at least one direction of the optical low-pass filter is set within a range of values greater than ¼ and less than ¾ of a specific sampling frequency (that having the second lowest frequency) among sampling frequencies determined by the pixel arrangement of the image display body, and the other of the two cut-off spatial frequencies is set within a range of values greater than ¾ and less than 5/4 of the specific sampling frequency, where the specific sampling frequency is taken as being 1.

21 Claims, 57 Drawing Sheets

MONOCHROMATIC DELTA ARRANGEMENT

STRIPE ARRANGEMENT

MONOCHROMATIC STRIPE ARRANGEMENT

COLOR STRIPE ARRANGEMENT

SQUARE ARRANGEMENT
(R AND B ARE NOTED)

Fig. 26 DELTA ARRANGEMENT

DELTA ARRANGEMENT

DELTA ARRANGEMENT

SQUARE ARRANGEMENT
(G IS NOTED)

Fig. 30 MOSAIC ARRANGEMENT

MOSAIC ARRANGEMENT

MOSAIC ARRANGEMENT

IMAGE DISPLAY DEVICE WITH OPTICAL LOW-PASS FILTER

BACKGROUND OF THE INVENTION

1. Field of the Invention

This invention relates to an image display device having an optical low-pass filter and to the optical low-pass filter. The image display device referred to here signifies a device which displays visible information having a two-dimensional spread. It goes without saying that images capable of being displayed include not only pictures, photographs and illustrations but also characters, symbols and numerals, etc.

2. Description of the Related Art

Many image display devices such as liquid-crystal panels (liquid-crystal display devices), CRT display devices and plasma display devices express images by a number of pixels arrayed periodically in two dimensions (these are so-called dot-matrix image display apparatus). In such an image display device, a phenomenon ascribable to the periodic arrangement of the pixels is observed in which so-called sampling noise is produced and results in a decline in image quality, namely images which have a rough appearance.

In an effort to reduce or eliminate this sampling noise, placing an optical low-pass filter (a phase grating or quartz plate, etc.) on the display surface of the image display device has been proposed. (For example, see the specification of Japanese Patent Application Laid-Open No. 63-114475). The optical low-pass filter passes spatial frequency components of a frequency lower than that determined by the pitch of the pixels in the image display device.

Sampling frequency is decided by the periodic arrangement of the pixels in the image display device, and the sampling frequencies are distributed in a frequency plane. Noise components are distributed about each sampling frequency. The lower the sampling frequency, the larger the noise components distributed about the sampling frequency and the more detrimental the effects upon image quality.

Accordingly, it is desirable to remove not only the noise components distributed about the lowest sampling frequency but also the noise components centered about the next lowest sampling frequency.

SUMMARY OF THE INVENTION

An object of the present invention is to provide the structure of an optical low-pass filter for eliminating or reducing the largest noise component and the next largest noise component, as well as an image display device using this optical low-pass filter.

The present invention attains the foregoing object by means of a single optical low-pass filter and seeks to reduce the number of component parts.

An image display device according to the present invention comprises an image display body having a plurality of pixels arranged periodically in two dimensions, and an optical low-pass filter placed on or above a front surface of the image display body, wherein one of two cut-off spatial frequencies in at least one direction of the optical low-pass filter is set within a range of values greater than ¼ and less than ¾ of a specific sampling frequency among sampling frequencies determined by the pixel arrangement of the image display body, and the other of the two cut-off spatial frequencies is set within a range of values greater than ¾ and less than 5/4 of the specific sampling frequency, where the specific sampling frequency is taken as being 1.

It goes without saying that two cut-off spatial frequencies in each of two directions of the optical low-pass filter may be set in the above-mentioned ranges.

Examples of the image display body are a liquid-crystal display panel, a plasma display panel, an electroluminescent display panel and a CRT display.

The optical low-pass filter may be implemented by means capable of splitting light into three light rays in at least one direction, examples being a phase grating, a combination of quartz plates, etc.

In accordance with the present invention, the cut-off spatial frequencies of an optical low-pass filter are set respectively in the neighborhood of a sampling frequency in which the largest noise components are distributed and in the neighborhood of a sampling frequency in which the next largest noise components are distributed in at least one direction of the optical low-pass filter. This makes it possible to reduce the noise components by a wide margin.

There are various ways to decide the aforesaid specific sampling frequency. One (Group I) is to consider two basic frequency vectors capable of expressing all sampling frequencies decided by the pixel arrangement of the image display body and decide the specific sampling frequency to be twice at least one of the basic frequency vectors.

A second (Group II) is to consider two basic frequency vectors capable of expressing all sampling frequencies decided by the pixel arrangement of the image display body and decide the specific sampling frequency by the sum of or difference between the two basic frequency vectors.

A third (Group III) is to consider two basic frequency vectors capable of expressing all sampling frequencies decided by the pixel arrangement of the image display body and decide the specific sampling frequency by twice the sum of or twice the difference between the two basic frequency vectors.

Arrangements of the pixels in the image display device include a stripe arrangement, a delta arrangement, a mosaic arrangement, etc.

The ranges of the two above-mentioned cut-off spatial frequencies can be defined, for each method of determining the specific sampling frequency and each pixel arrangement, by parameters from the viewpoint of the light-splitting efficiency of the optical low-pass filter and position of the split light (position of the virtual image).

Actual measurement is facilitated by using these parameters to stipulate the characterizing structure of the image display device having the optical low-pass filter according to the present invention. To this end, the claims include, in addition to claim 1 specifying the basic structure and claims 2–4 stipulating the characteristics of the optical low-pass filter by the basic frequency vectors, claims 5–7 which stipulate the features of the optical low-pass filter by using the above-mentioned parameters (by using formulae which contain the parameters).

Formulae containing the aforementioned parameters are as set forth below.

Let $\Delta_x$ represent a pixel period in the row direction of the image display body and $\Delta_y$ the pixel period in the column direction of the image display body, let the relative position of a virtual image of a pixel, which virtual image is formed on the image display body by the split light rays, with respect to the central optic axis be represented by a component $X_1$ in the row direction of the pixel arrangement and a component $Y_1$ in the column direction of the pixel arrangement, and let $P_0$, $P_1$ represent the light-intensity ratios of light on the central optical axis and split light, respectively, to the incident light.

Stripe Arrangement

In case of Group I: Equations (1) and (2) or Equations (3) and (4)

In case of Group II: Equations (5) and (6) or Equations (7) and (8)

Delta Arrangement

In case of Group I: Equations (9) and (10) or Equations (11) and (12)

In case of Group II: Equations (13) and (14) or Equations (15) and (16)

In case of Group III: Equations (17) and (18) or Equations (19) and (20)

Mosaic Arrangement

In case of Group I: Equations (21) and (22) or Equations (23) and (24)

In case of Group II: Equations (25) and (26) or Equations (27) and (28)

In case of Group III: Equations (29) and (30) or Equations (31) and (32)

$$\frac{1}{4} < \frac{\cos^{-1}(-P_0/2P_1)}{4\pi X_1/\Lambda_x} < \frac{3}{4} \quad \text{Eq. (1)}$$

$$\frac{3}{4} < \frac{2\pi - \cos^{-1}(-P_0/2P_1)}{4\pi X_1/\Lambda_x} < \frac{5}{4} \quad \text{Eq. (2)}$$

$$\frac{1}{4} < \frac{\cos^{-1}(-P_0/2P_1)}{4\pi Y_1/\Lambda_y} < \frac{3}{4} \quad \text{Eq. (3)}$$

$$\frac{3}{4} < \frac{2\pi - \cos^{-1}(-P_0/2P_1)}{4\pi Y_1/\Lambda_y} < \frac{5}{4} \quad \text{Eq. (4)}$$

$$\frac{1}{4} < \frac{\cos^{-1}(-P_0/2P_1)}{2\pi(X_1/\Lambda_x + Y_1/\Lambda_y)} < \frac{3}{4} \quad \text{Eq. (5)}$$

$$\frac{3}{4} < \frac{2\pi - \cos^{-1}(-P_0/2P_1)}{2\pi(X_1/\Lambda_x + Y_1/\Lambda_y)} < \frac{5}{4} \quad \text{Eq. (6)}$$

$$\frac{1}{4} < \frac{\cos^{-1}(-P_0/2P_1)}{2\pi(X_1/\Lambda_x - Y_1/\Lambda_y)} < \frac{3}{4} \quad \text{Eq. (7)}$$

$$\frac{3}{4} < \frac{2\pi - \cos^{-1}(-P_0/2P_1)}{2\pi(X_1/\Lambda_x - Y_1/\Lambda_y)} < \frac{5}{4} \quad \text{Eq. (8)}$$

$$\frac{1}{4} < \frac{\cos^{-1}(-P_0/2P_1)}{2\pi(2X_1/\Lambda_x + 2Y_1/\Lambda_y)} < \frac{3}{4} \quad \text{Eq. (9)}$$

$$\frac{3}{4} < \frac{2\pi - \cos^{-1}(-P_0/2P_1)}{2\pi(2X_1/\Lambda_x + 2Y_1/\Lambda_y)} < \frac{5}{4} \quad \text{Eq. (10)}$$

$$\frac{1}{4} < \frac{\cos^{-1}(-P_0/2P_1)}{-2\pi(X_1/\Lambda_x + 2Y_1/\Lambda_y)} < \frac{3}{4} \quad \text{Eq. (11)}$$

$$\frac{3}{4} < \frac{2\pi - \cos^{-1}(-P_0/2P_1)}{2\pi(-2X_1/\Lambda_x + 2Y_1/\Lambda_y)} < \frac{5}{4} \quad \text{Eq. (12)}$$

$$\frac{1}{4} < \frac{\cos^{-1}(-P_0/2P_1)}{4\pi X_1/\Lambda_x} < \frac{3}{4} \quad \text{Eq. (13)}$$

$$\frac{3}{4} < \frac{2\pi - \cos^{-1}(-P_0/2P_1)}{4\pi X_1/\Lambda_x} < \frac{5}{4} \quad \text{Eq. (14)}$$

$$\frac{1}{4} < \frac{\cos^{-1}(-P_0/2P_1)}{4\pi Y_1/\Lambda_y} < \frac{3}{4} \quad \text{Eq. (15)}$$

$$\frac{3}{4} < \frac{2\pi - \cos^{-1}(-P_0/2P_1)}{4\pi Y_1/\Lambda_y} < \frac{5}{4} \quad \text{Eq. (16)}$$

$$\frac{1}{4} < \frac{\cos^{-1}(-P_0/2P_1)}{8\pi X_1/\Lambda_x} < \frac{3}{4} \quad \text{Eq. (17)}$$

$$\frac{3}{4} < \frac{2\pi - \cos^{-1}(-P_0/2P_1)}{8\pi X_1/\Lambda_x} < \frac{5}{4} \quad \text{Eq. (18)}$$

$$\frac{1}{4} < \frac{\cos^{-1}(-P_0/2P_1)}{8\pi Y_1/\Lambda_y} < \frac{3}{4} \quad \text{Eq. (19)}$$

$$\frac{3}{4} < \frac{2\pi - \cos^{-1}(-P_0/2P_1)}{8\pi Y_1/\Lambda_y} < \frac{5}{4} \quad \text{Eq. (20)}$$

$$\frac{1}{4} < \frac{\cos^{-1}(-P_0/2P_1)}{2\pi(2X_1/\Lambda_x + 2Y_1/\Lambda_y)} < \frac{3}{4} \quad \text{Eq. (21)}$$

$$\frac{3}{4} < \frac{2\pi - \cos^{-1}(-P_0/2P_1)}{2\pi(2X_1/\Lambda_x + 2Y_1/\Lambda_y)} < \frac{5}{4} \quad \text{Eq. (22)}$$

$$\frac{1}{4} < \frac{\cos^{-1}(-P_0/2P_1)}{2\pi(-2X_1/\Lambda_x + 4Y_1/\Lambda_y)} < \frac{3}{4} \quad \text{Eq. (23)}$$

$$\frac{3}{4} < \frac{2\pi - \cos^{-1}(-P_0/2P_1)}{2\pi(-2X_1/\Lambda_x + 4Y_1/\Lambda_y)} < \frac{5}{4} \quad \text{Eq. (24)}$$

$$\frac{1}{4} < \frac{\cos^{-1}(-P_0/2P_1)}{2\pi(2X_1/\Lambda_x - Y_1/\Lambda_y)} < \frac{3}{4} \quad \text{Eq. (25)}$$

$$\frac{3}{4} < \frac{2\pi - \cos^{-1}(-P_0/2P_1)}{2\pi(2X_1/\Lambda_x - Y_1/\Lambda_y)} < \frac{5}{4} \quad \text{Eq. (26)}$$

$$\frac{1}{4} < \frac{\cos^{-1}(-P_0/2P_1)}{6\pi Y_1/\Lambda_y} < \frac{3}{4} \quad \text{Eq. (27)}$$

$$\frac{3}{4} < \frac{2\pi - \cos^{-1}(-P_0/2P_1)}{6\pi Y_1/\Lambda_y} < \frac{5}{4} \quad \text{Eq. (28)}$$

$$\frac{1}{4} < \frac{\cos^{-1}(-P_0/2P_1)}{2\pi(4X_1/\Lambda_x - 2Y_1/\Lambda_y)} < \frac{3}{4} \quad \text{Eq. (29)}$$

$$\frac{3}{4} < \frac{2\pi - \cos^{-1}(-P_0/2P_1)}{2\pi(4X_1/\Lambda_x - 2Y_1/\Lambda_y)} < \frac{5}{4} \quad \text{Eq. (30)}$$

$$\frac{1}{4} < \frac{\cos^{-1}(-P_0/2P_1)}{12\pi Y_1/\Lambda_y} < \frac{3}{4} \quad \text{Eq. (31)}$$

$$\frac{3}{4} < \frac{2\pi - \cos^{-1}(-P_0/2P_1)}{12\pi Y_1/\Lambda_y} < \frac{5}{4} \quad \text{Eq. (32)}$$

Other features of the present invention will become clear from the description of the embodiment.

DESCRIPTION OF THE PREFERRED EMBODIMENT (1) Premises

An optical low-pass filter is implemented by a phase grating or quartz plate which functions to split (branch) light. The optical low-pass filter is placed on the display (front) surface of an image display device. By virtue of the light splitting function thereof, the optical low-pass filter forms a virtual (an imaginary) image of each pixel between pixels and eliminates or reduces the roughness of an image.

Figure 1:
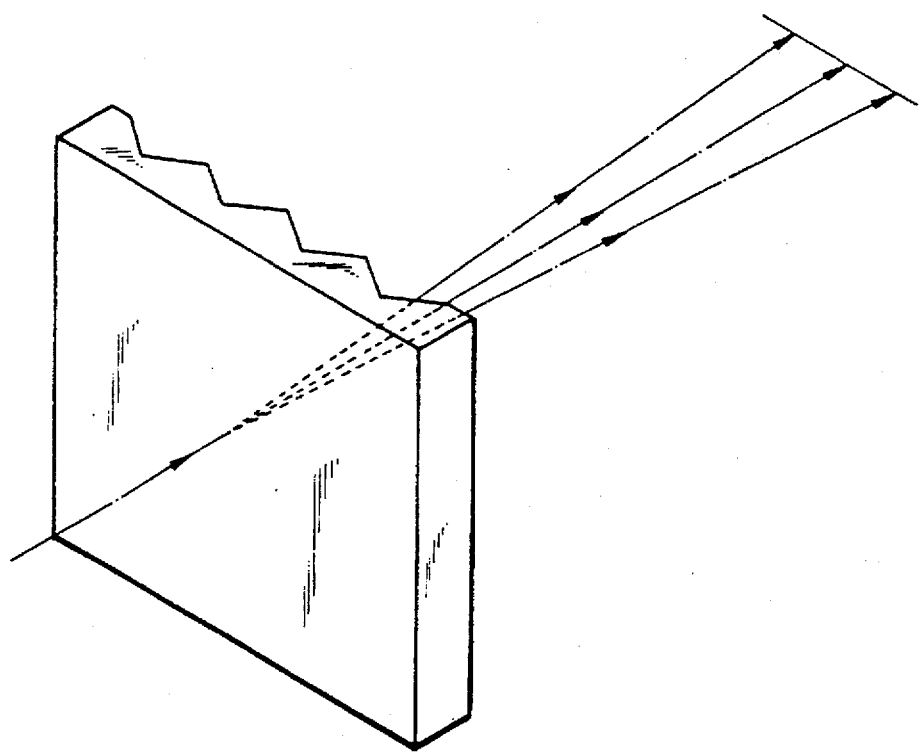
FIG. 1 is a perspective view showing diffraction of light by a one-dimensional phase grating.

FIG. 1 illustrates a one-dimensional phase grating. Light incident upon the diffraction grating is separated into light of order 0 (0th-order) and diffracted light of orders ±1 (±1st-orders) on both sides of the 0th-order light. (Higher-order diffracted light of order 2 (2nd-order) or greater is not shown.)

Figure 2:
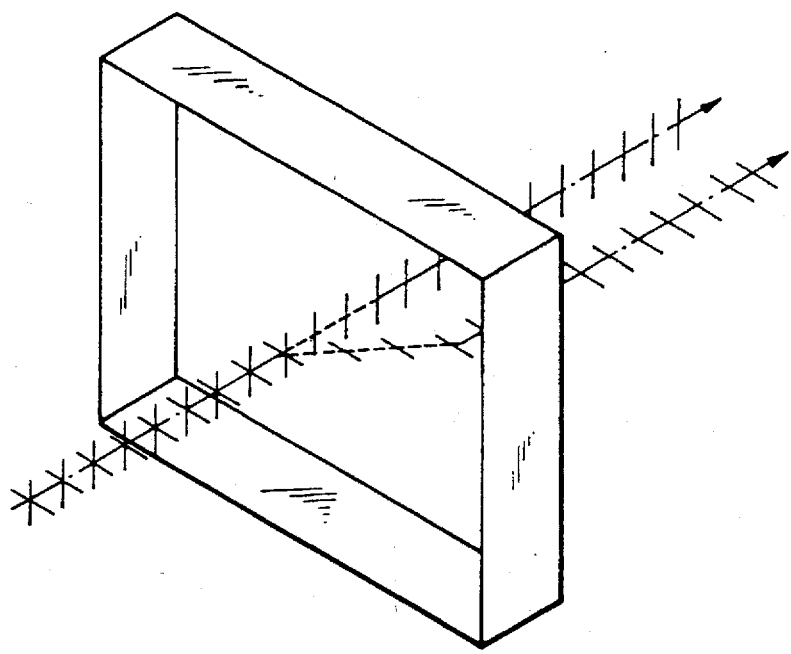
FIG. 2 is a perspective view showing a quartz plate.

FIG. 2 illustrates a quartz plate. Light incident upon the quartz plate is separated into two parallel light rays of equal intensity which vibrate in directions perpendicular to each other.

Figure 3:
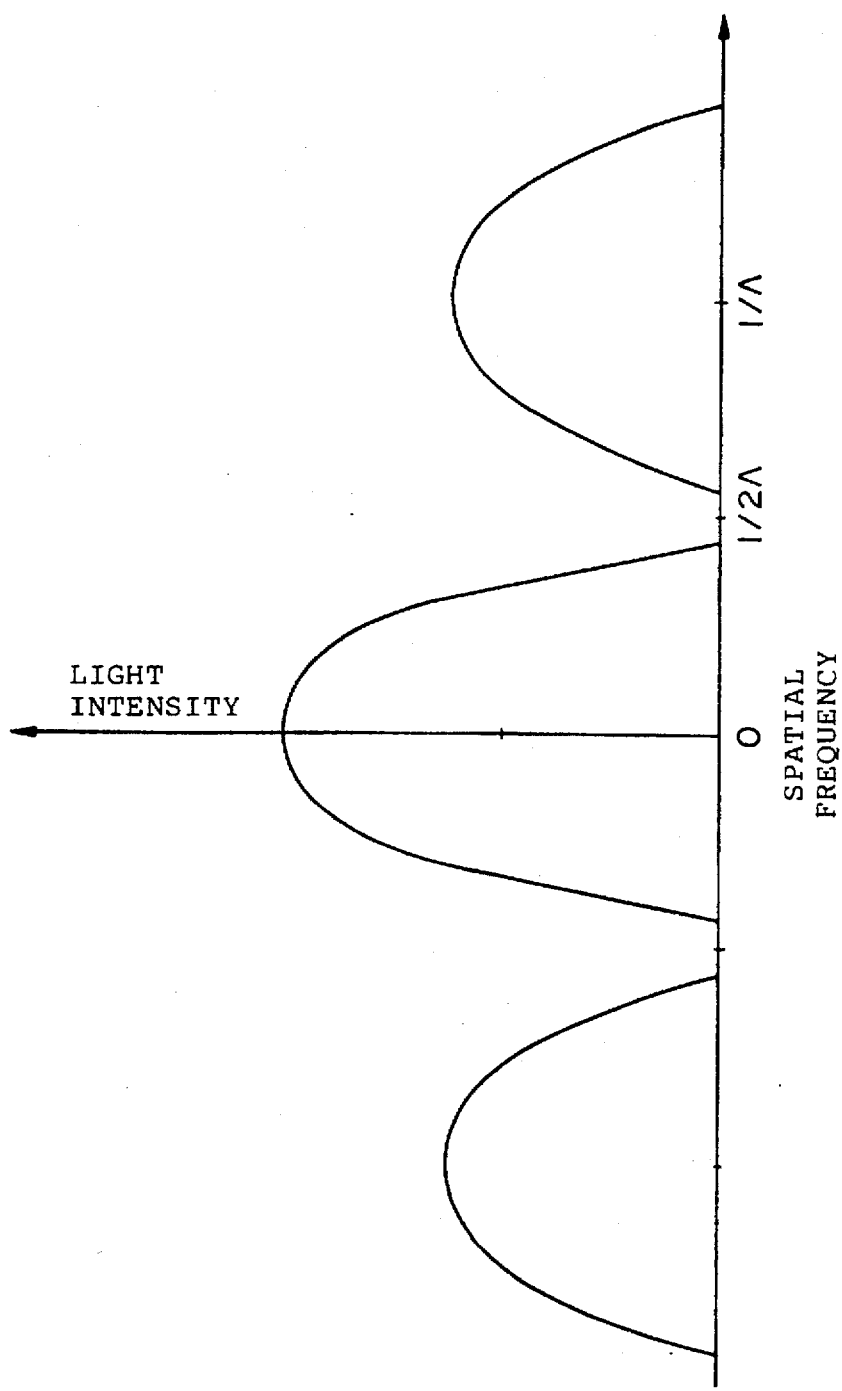
FIG. 3 is a graph showing spatial frequency versus the light-intensity distribution of a displayed image.
Figure 4:
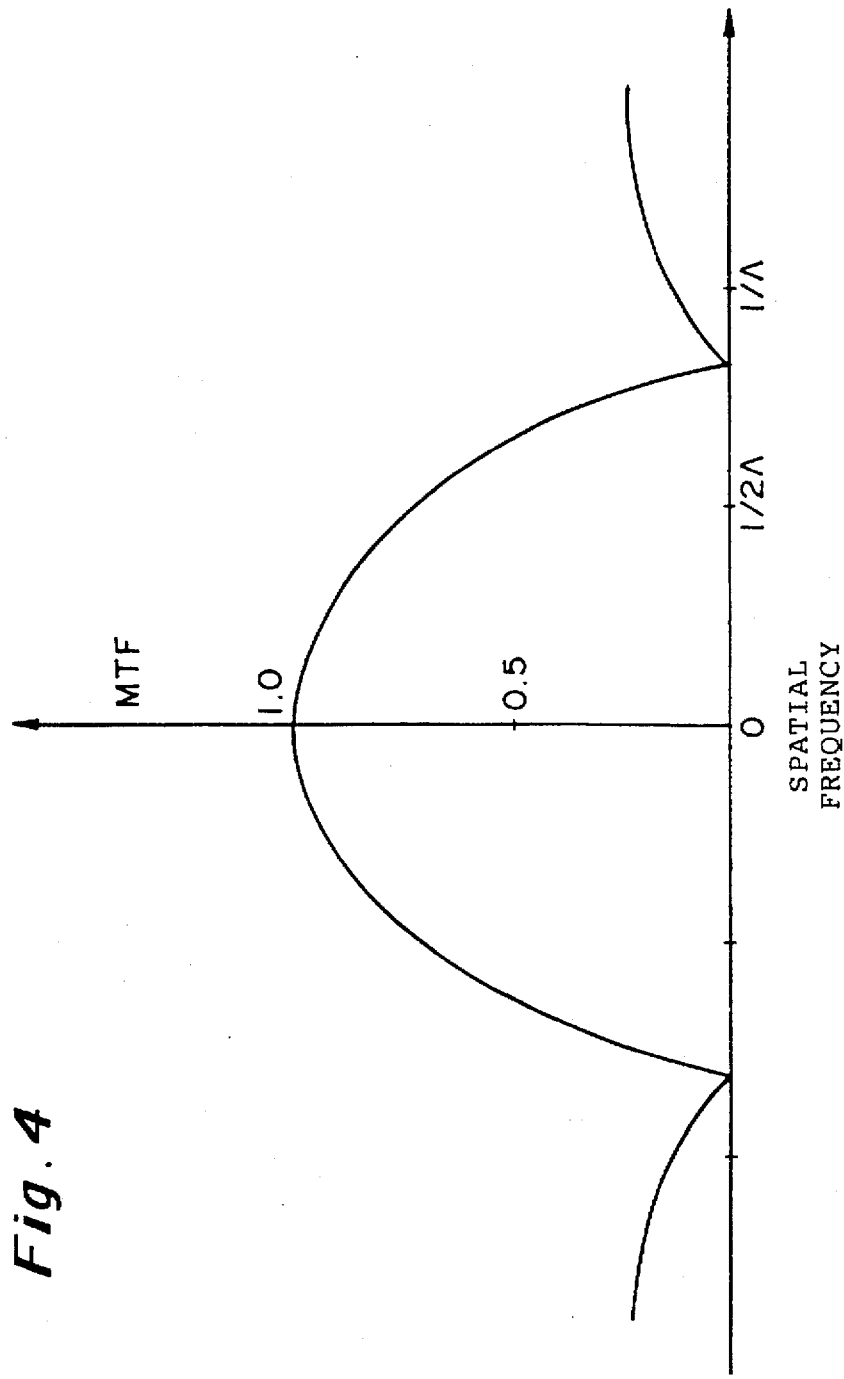
FIG. 4 is a graph showing the MTF characteristic of an optical low-pass filter.
Figure 5:
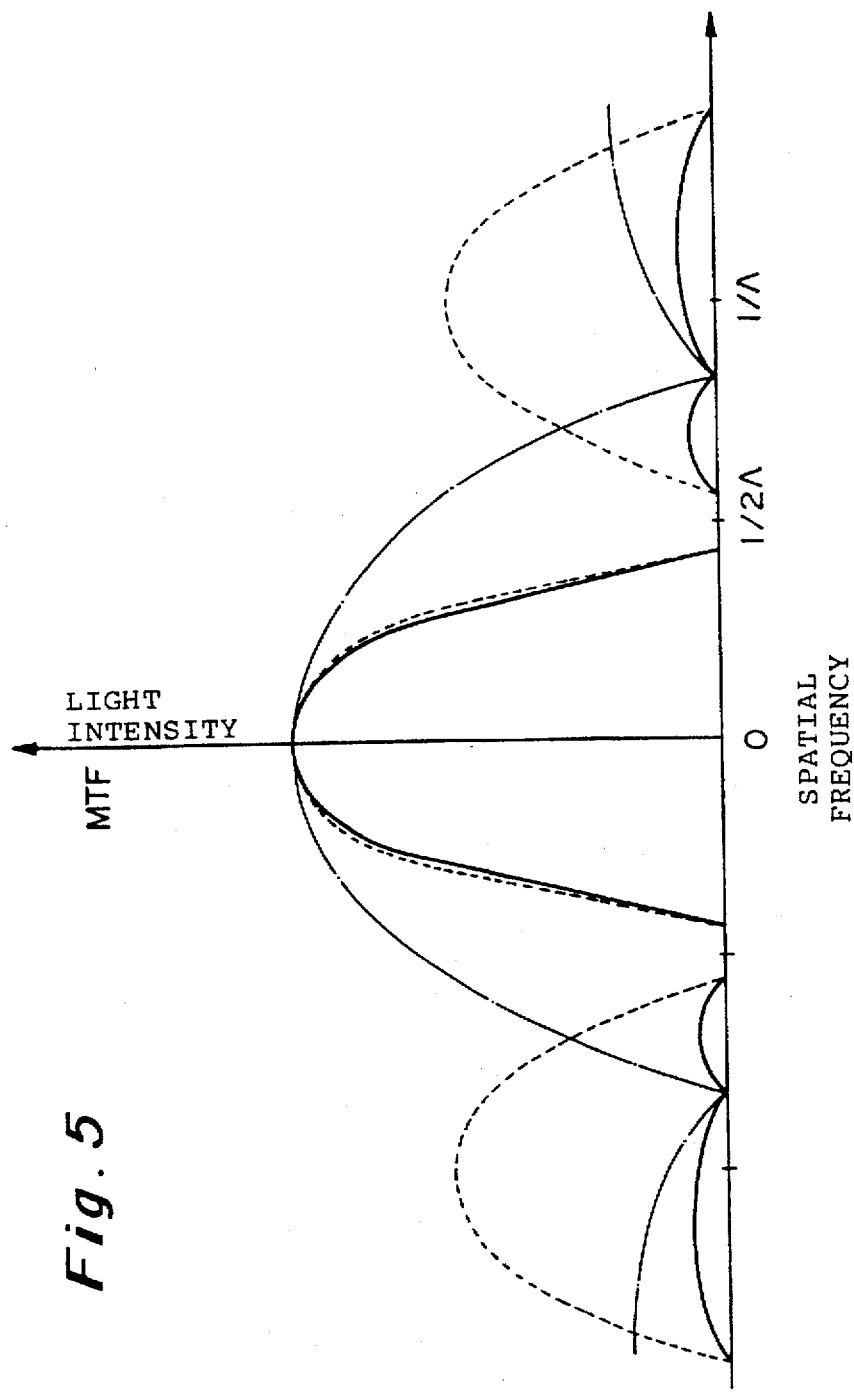
FIG. 5 is a graph showing spatial frequency versus the light-intensity distribution of a displayed image when the optical low-pass filter has been attached.

FIGS. 3 through 5 illustrate the action of the optical low-pass filter in one dimension.

FIG. 3 shows the light-intensity distribution of a display image plotted against spatial frequency, which is shown along the horizontal axis. In FIG. 3, Λ represents the period (pitch or pixel spacing) of pixels in one dimension (in one direction), and 1/Λ is referred to as the sampling frequency (pixel frequency). The light-intensity distribution centered on a spatial frequency of 0 depends upon the image represented by a video signal applied to the display device. Light-intensity distributions of an image which appear centered on frequencies that are whole-number multiples (1/Λ, 2/Λ, 3/Λ) of the sampling frequency represent noise which causes image roughness.

FIG. 4 illustrates an example of the MTF (modulation transfer function, namely the optical transmission characteristic with respect to spatial frequency) of an optical low-pass filter. [In this example, the cut-off spatial frequency (the position at which MTF=0 holds) has been determined appropriately.] The MTF is found by a Fourier transform of a point spread function.

FIG. 5 illustrates an output light-intensity distribution (an image seen by the eye) obtained when an optical low-pass filter having the MTF shown in FIG. 4 is placed in front of a display image having the light-intensity distribution shown in FIG. 3. The dot lines in FIG. 5 indicate the light-intensity distribution shown in FIG. 3 and the dot-and-dash lines represent the MTF of the optical low-pass filter shown in FIG. 4. It will be understood that most of the light-intensity distribution representing the image to be displayed originally (namely the image represented by the input video signal) remains and that the noise which causes the roughening of the image has been reduced to a significant degree.

Figure 6:
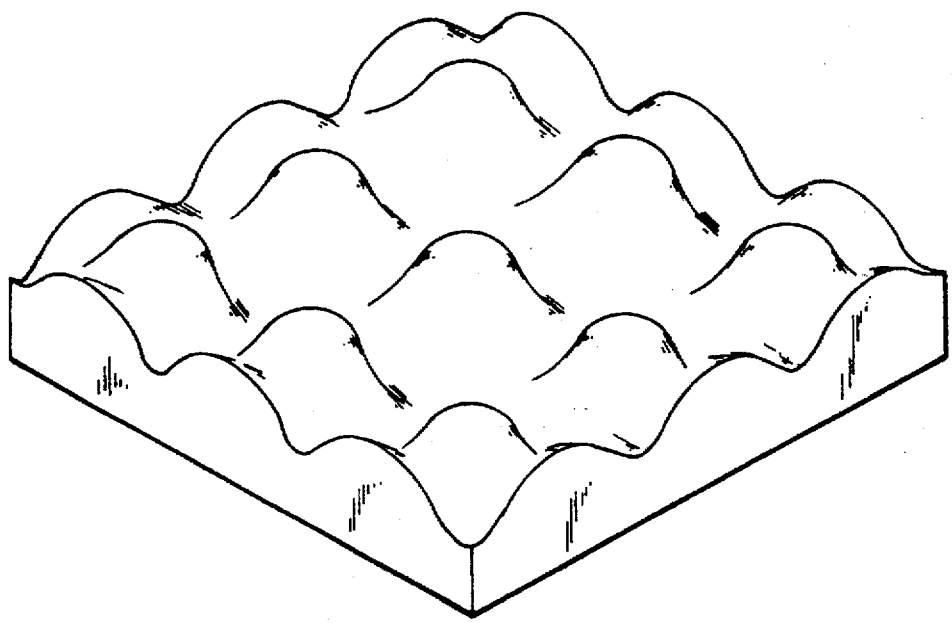
FIG. 6 is a perspective view of a sinusoidal phase grating.
Figure 7:
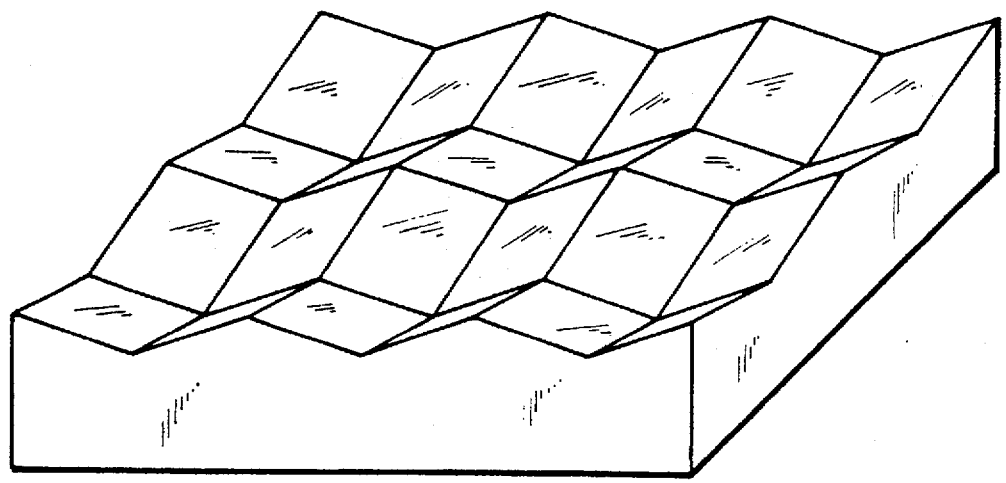
FIG. 7 is a perspective view of a triangular phase grating.

FIGS. 6 and 7 illustrate examples of two-dimensional phase gratings. FIG. 6 shows a sinusoidal phase grating. The projections and depressions on the surface of this phase grating has a two-dimensional spread and changes sinusoidally. The phase grating of FIG. 7 is referred to as a triangular phase grating the surface of which varies in triangular fashion in two dimensions. The change in one direction may have the form of a triangular wave while the change in the perpendicular direction may have the form of a sawtooth. Furthermore, the phase grating may have a surface which varies in step-like form (rectangular form) in one or two directions.

Such a two-dimensional phase grating acts as an optical low-pass filter. Other examples of arrangements of optical low-pass filters will be described later.

These optical low-pass filters can be fabricated by milling (cutting), injection molding, sheet molding or molding using a stamper, etc. Examples of the material of the optical low-pass filter are glass or transparent resins such as polymethyl methacrylate (PMMA) (generally an acrylic resin), a resin cured by ultraviolet radiation (UV setting resin), polycarbonate (PC), etc.

Figure 8:
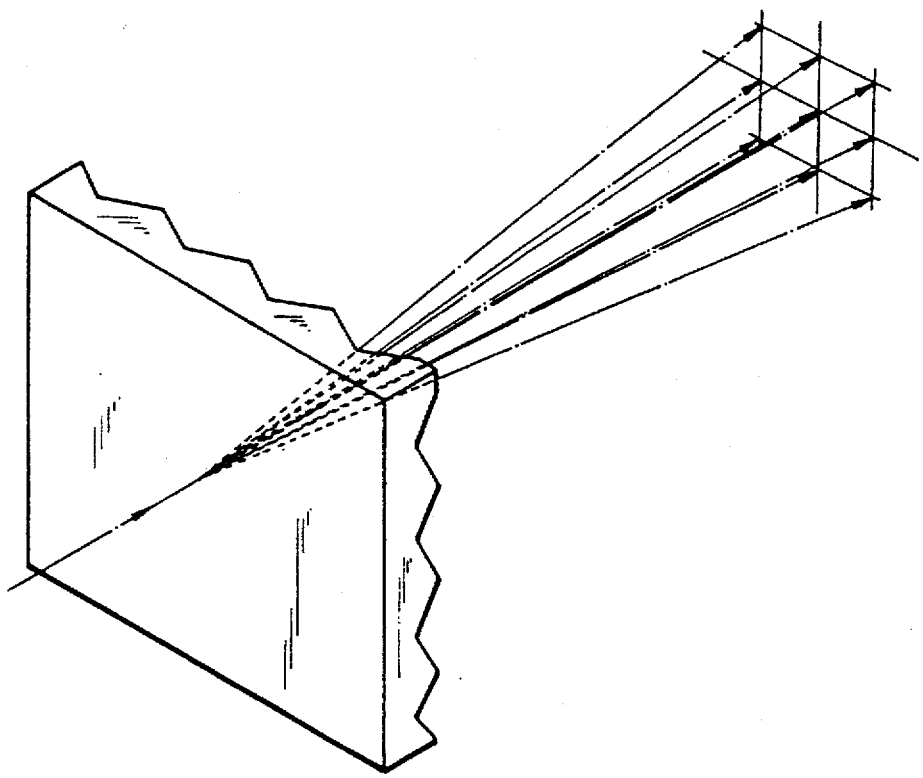
FIG. 8 is a perspective view showing diffraction of light by a two-dimensional phase grating.

FIG. 8 illustrates the manner in which light is split (caused to branch) in a two-dimensional phase grating (the grating of FIG. 7 by way of example) the projections and depressions on the surface of which varies in two mutually perpendicular directions. Eight diffracted light rays of order 1 are produced about a central light ray of order 0. (Higher-order diffracted light of order 2 or greater is not shown.)

Figure 9:
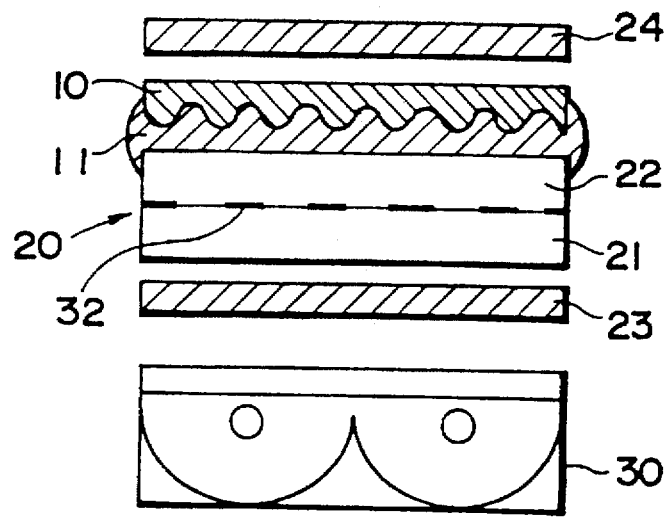
FIG. 9 is a sectional view schematically illustrating an example of the construction of a liquid-crystal display device.

FIG. 9 schematically illustrates the structure of a liquid-crystal display device having an optical low-pass filter. In FIG. 9, the liquid-crystal panel and other structural elements are drawn in fairly enlarged size in the direction of thickness but in considerably reduced size in the direction of length (or width) (i.e., the number of pixels or dots is shown to be much reduced in this direction). This holds for FIG. 10 as well.

A liquid-crystal panel 20 has two glass substrates 21, 22 defining a small gap filled with liquid crystal. The dashed line drawn between the two glass substrates 21 and 22 represents a black matrix (the details of which will be described later).

An optical low-pass filter (having the structure shown in FIG. 6) 10 is bonded by a bonding layer 11 to the outer side of one glass substrate 22 of the liquid-crystal panel 20. It is preferred that the sinusoidal waveform surface (the surface having the optical function) of the optical low-pass filter 10 be faced toward the glass substrate 22. The glass substrate 22 and the optical low-pass filter 10 are disposed accurately so as to lie parallel to each other.

The bonding layer 11 consists of a bonding resin such as a UV setting resin, an epoxy resin, etc.

Polarizing plates 23, 24 are placed on either side of the liquid-crystal panel 20 to one surface of which the optical low-pass filter 10 has been adhered. A light source (for back-lighting) 30 is disposed on one side of the panel 20. This completes the construction of the liquid-crystal display device.

Figure 10:
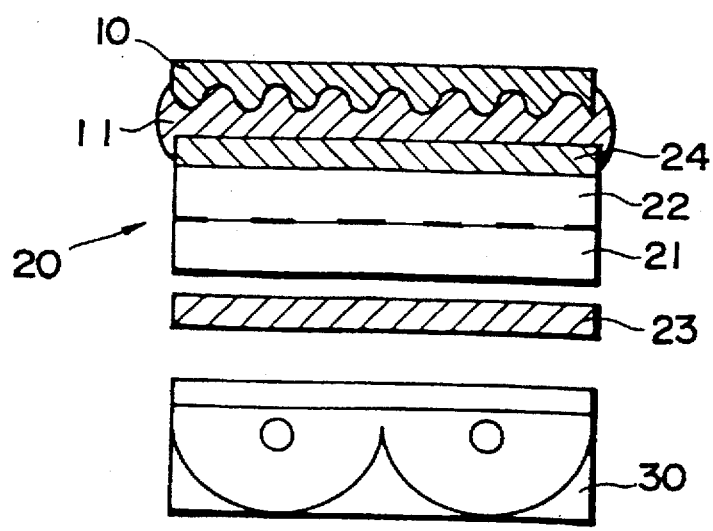
FIG. 10 is a sectional view schematically illustrating another example of the construction of a liquid-crystal display device.

FIG. 10 illustrates another example of the construction of a liquid-crystal display device.

Here the polarizing plate 24 is joined (in a bonded or adhered state) to the glass substrate 22 of the liquid-crystal panel 20. The polarizing plate 24 and optical low-pass filter 10 are bonded together by an bonding layer 11. Other structural elements are the same as those shown in FIG. 9.

Thus, the optical low-pass filter can be placed in front of the display surface of the display device in a variety of modes. The bonding layer 11 is not always necessary.

Figure 11:
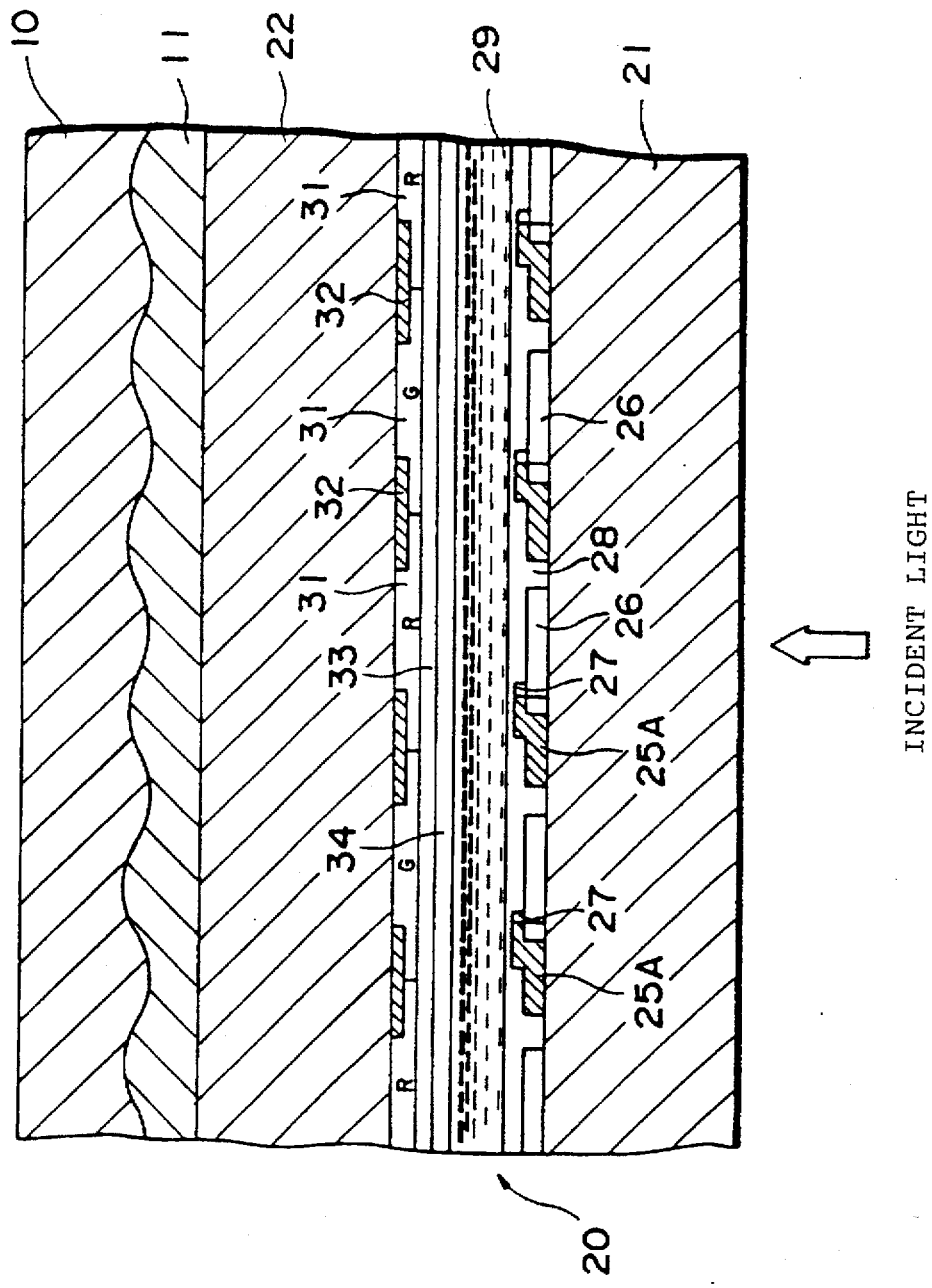
FIG. 11 is an enlarged sectional view of the liquid-crystal display device.
Figure 12:
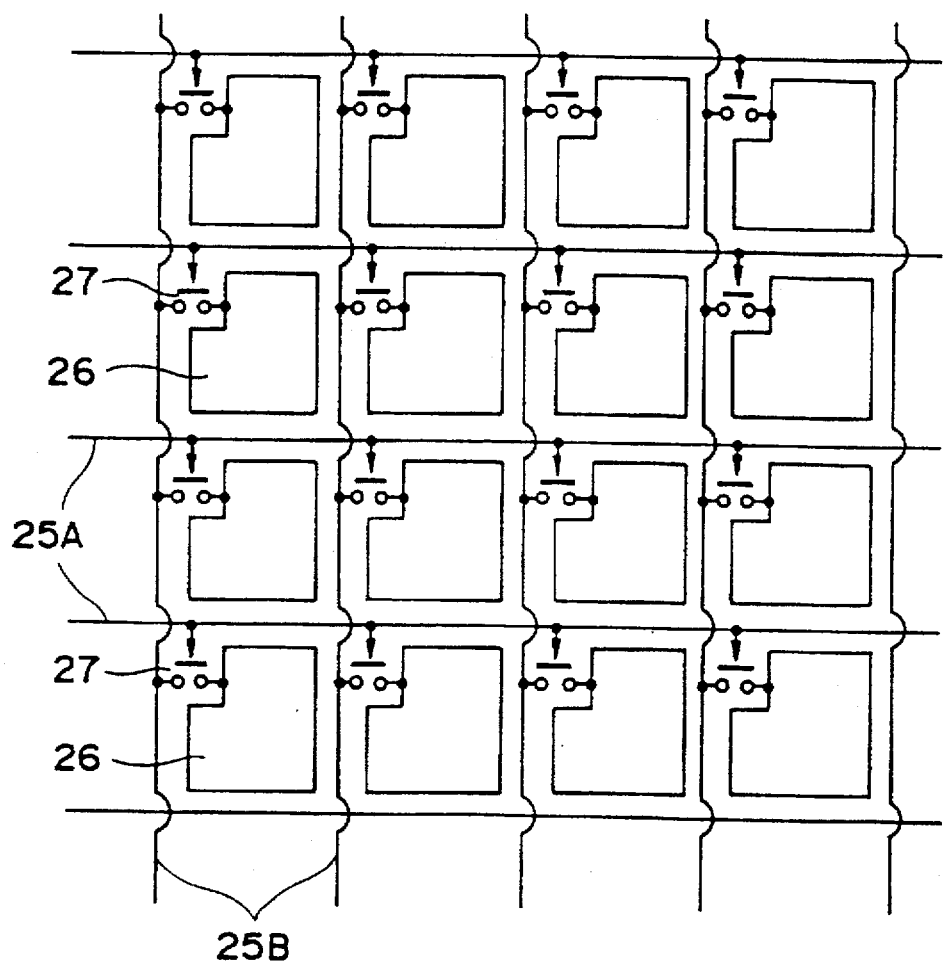
FIG. 12 is an equivalent circuit diagram of a wiring pattern on a glass substrate in the liquid-crystal display device.

FIG. 11 illustrates part of the enlarged cross section of the liquid-crystal panel 20 and optical low-pass filter 10 bonded thereto. Here insulating films and the internal structure of switching elements are not shown. FIG. 12 shows an equivalent circuit of pixel electrodes, switching elements and conductive wiring patterns formed on the surface of one of the two glass substrates 21, 22 constructing the liquid-crystal panel 20. For the sake of simplicity, the pixel electrodes (apertures) are illustrated in the form of a square arrangement (to be described later).

As shown in these drawings, the liquid-crystal panel 20 basically comprises the two glass substrates 21 and 22 arranged with the small (e.g., 5 μm) gap between them, and a liquid crystal 29 filling the gap between the glass substrates 21 and 22.

A number of equally spaced scanning electrodes 25A and a number of equally spaced signal electrodes 25B are formed horizontally and vertically, respectively, on the inner surface of one glass substrate 21. The scanning electrodes 25A and the signal electrodes 25B are insulated from each other. (In FIG. 11, the signal electrodes 25B are deleted from the drawing.)

Pixel electrodes 26 are formed in a matrix array and in a mutually insulated state on the inner surface of the glass substrate 21 in areas bounded by the scanning electrodes 25A and signal electrodes 25B. Each pixel electrode 26 is connected to its adjacent signal electrode 25B via a three-terminal switching element (e.g., a thin-film transistor comprising a FET) 27. Each switching element 27 has a control terminal (a gate terminal, for example) connected to its adjacent scanning electrode 25A. An alignment film 28 is formed on the entire inner surface of the glass substrate 21 so as to cover the electrodes 25A, 25B.

Color filters for the colors R, G and B are formed on the inner surface of the other glass substrate 22 at positions corresponding to the pixel electrodes 26, and light shielding films (black matrices) 32 are formed on the inner surface of the other glass substrate 22 at positions corresponding to the scanning electrodes 25A and signal electrodes 25B. It is well known that the arrangements of the color filters 31 include a stripe arrangement, a delta arrangement (inclusive of a square arrangement) and a mosaic arrangement, as will be discussed later.

A common electrode 33 is formed on the entire inner surface of the glass substrate 22 so as to cover the color filters 31, and an alignment film 34 is formed on the common electrode 33.

The pixel electrodes 26 and the common electrode 33 consist of a transparent conductive film (an ITO film, for example). The scanning electrodes 25A, signal electrodes 25B and shielding films 32, on the other hand, are non-transparent films of metal or the like. Accordingly, incident light can pass through only the areas of the pixel electrodes 26 bounded by the scanning electrodes 25A and signal electrodes 25B. (These areas coincide with the areas not covered by the shielding films 32.) The areas through which light is capable of passing are apertures or pixels.

Figure 13:
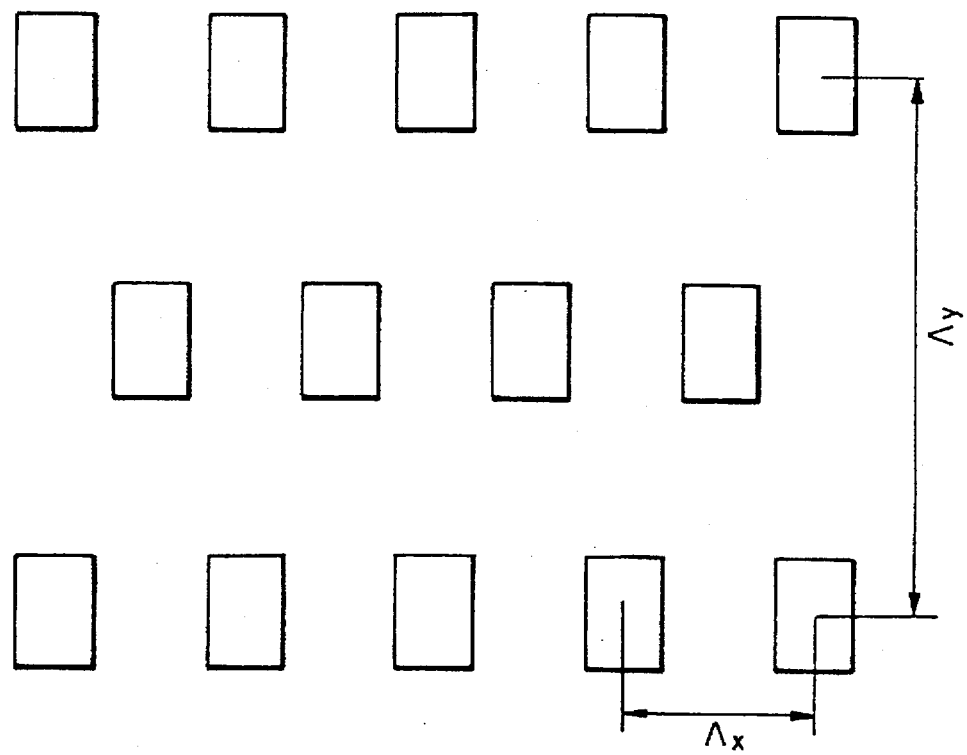
FIG. 13 illustrates an example of the arrangement (monochromatic delta) of pixels (apertures) in a liquid-crystal panel.
Figure 27:
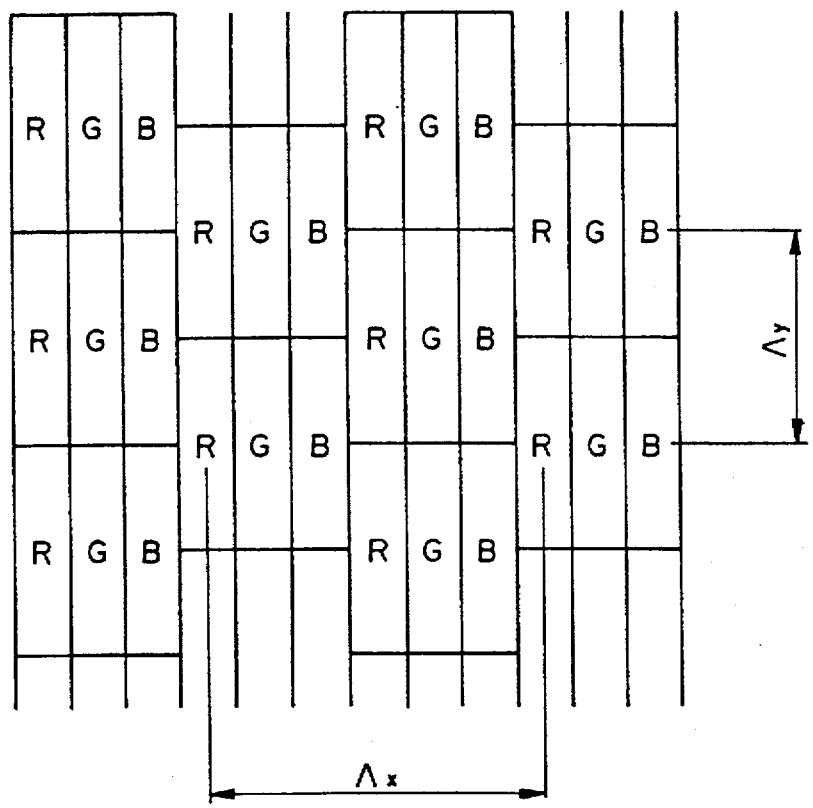
FIGS. 27 through 29 illustrates examples of delta arrangements.
Figure 28:
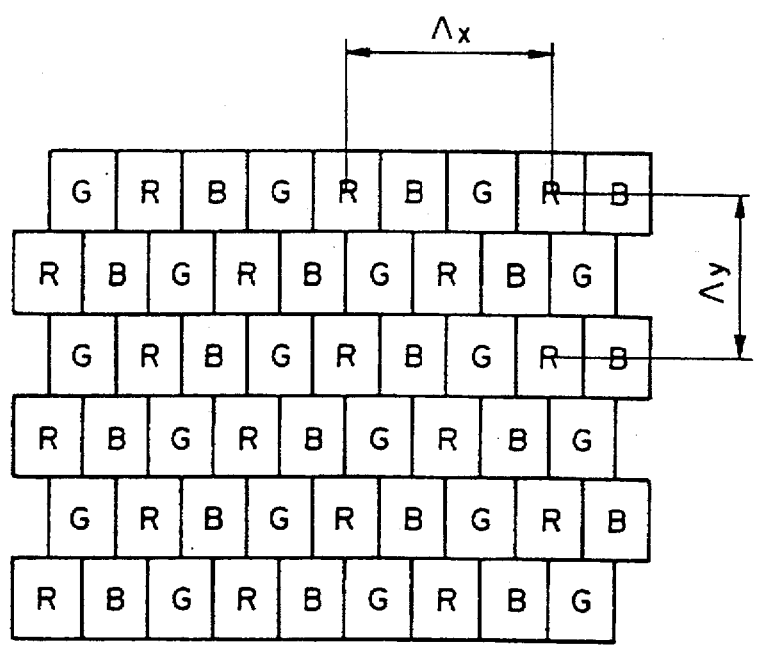

FIG. 13 illustrates the arrangement of apertures (pixels) of the liquid-crystal panel in the liquid-crystal display device described above. This is a delta arrangement in a monochromatic image display device. (A delta arrangement in a color image display device is illustrated in FIGS. 27 and 28.) In the delta arrangement for both the monochromatic image display and color image display, let $A_x$, $A_y$ represent the pixel periods (i.e., pitch or spacing) along the X direction (transverse or horizontal direction) and Y direction (longitudinal or vertical direction), respectively. Though there are various ways of taking the pixel period, here the pixel period refers to the spacing in arrays having the same shape, as illustrated.

Figure 14:
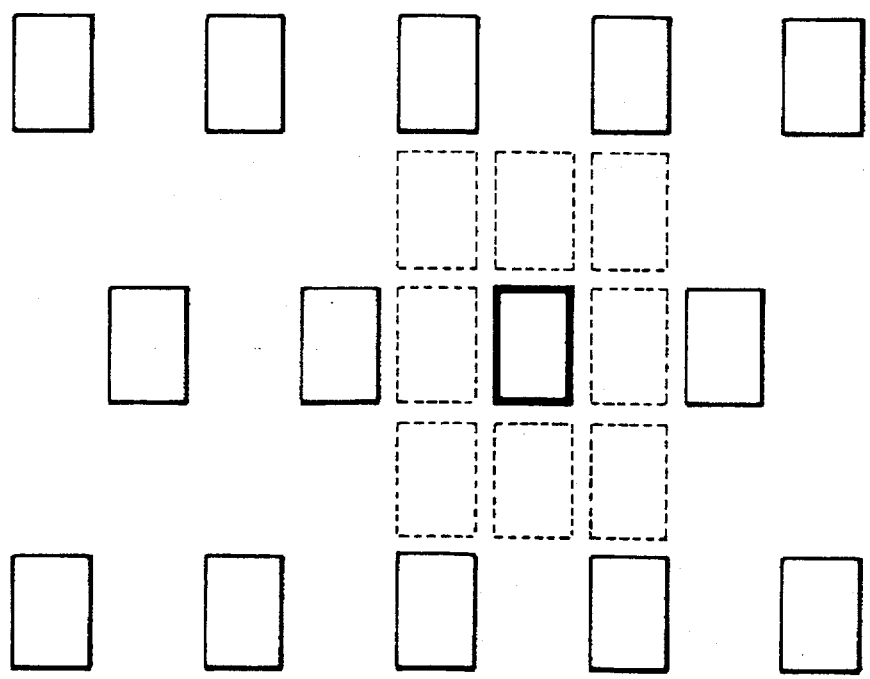
FIG. 14 illustrates the manner in which virtual images of pixels are formed by an optical low-pass filter.

FIG. 14 illustrates virtual images produced when a two-dimensional optical low-pass filter is placed on the front surface of a liquid-crystal panel having the pixel arrangement shown in FIG. 13. The eight images indicated by the dot lines are virtual images of the pixel indicated by the bold solid lines. This is a phenomenon produced as a result of light representing an image being split by the optical low-pass filter, as shown in FIG. 8. The virtual images of the pixel are formed between pixels by the light-splitting function of the optical low-pass filter, and thus it will be understood that roughness is reduced or eliminated as a result.

Figure 15:
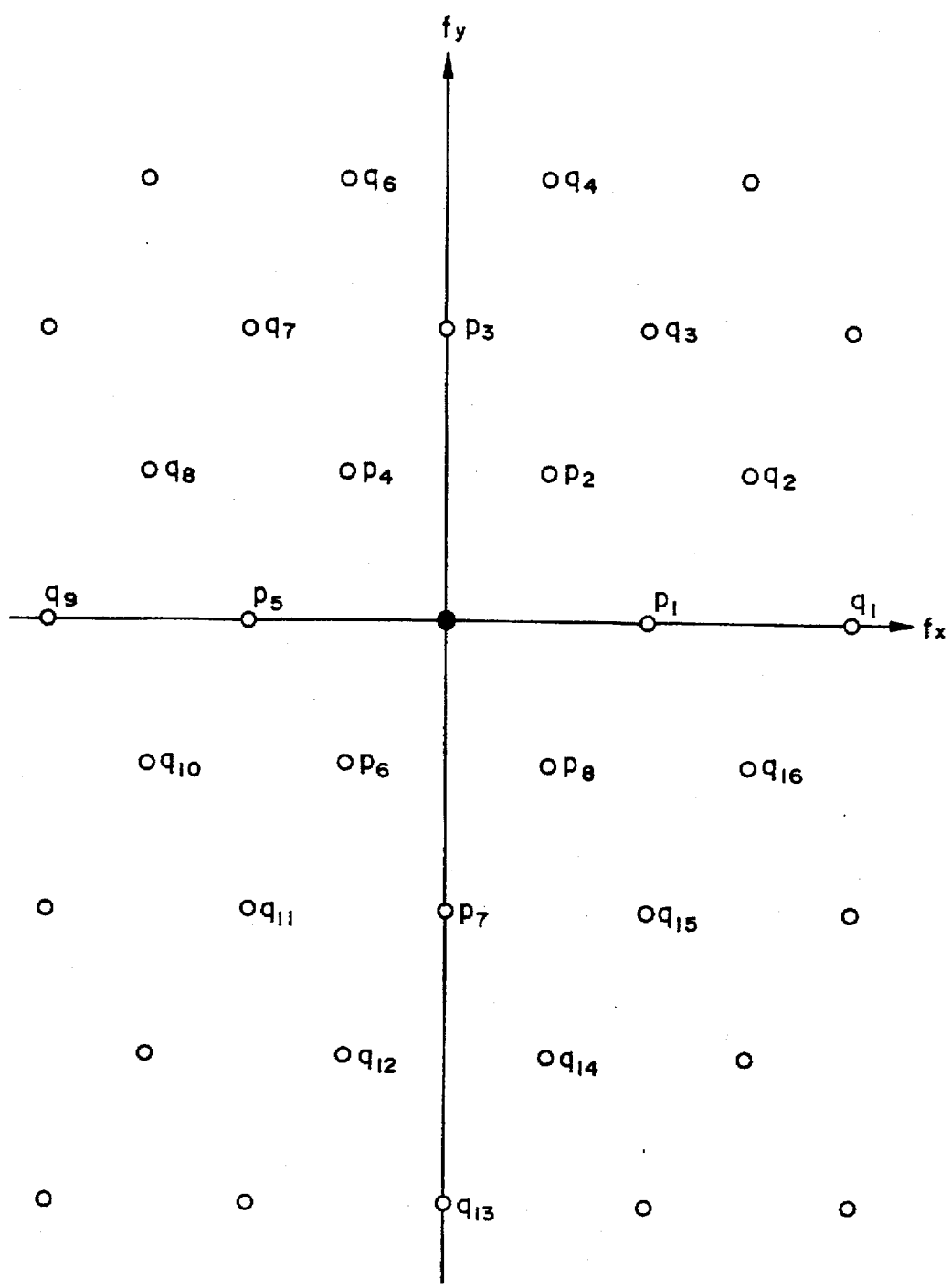
FIG. 15 illustrates a distribution of sampling frequencies produced by a delta arrangement of pixels.

The sampling frequencies which arise from a pixel arrangement causing roughness of a displayed image are obtained by subjecting the positions at which the pixels are arranged to a Fourier transform. The sampling frequencies produced by the delta pixel arrangement are distributed in two-dimensional spatial frequency space in the manner shown in FIG. 15. (FIG. 15 illustrates sampling frequencies produced by an arrangement of pixels of one color in the delta arrangement depicted in FIG. 28.) In FIG. 15, the white circles indicate the positions of sampling frequencies produced by the pixel arrangement. The black circle merely indicates the origin of the frequency space. Further, $f_x$ represents spatial frequency in the X direction and $f_y$ spatial frequency in the Y direction.

In the same manner as described in connection with one-dimensional space using FIG. 3, the frequency of noise which produces roughness is distributed about each point of these sampling frequencies in two-dimensional frequency space (FIG. 15) as well.

Noise (roughness) components are distributed about each sampling frequency, as already mentioned. The lower the sampling frequency, the more the image quality is affected by the noise components about this sampling frequency.

Accordingly, the most effective expedient is to remove the noise components distributed about the lowest sampling frequencies ($p_1 \sim p_8$ shown in FIG. 15). Here the general practice is to establish cut-off spatial frequencies, at MTF=0 holds, at the positions of these sampling frequencies $p_1 \sim p_8$.

In a case where elimination of the noise components is insufficient even if cut-off spatial frequencies have been established at the positions of these sampling frequencies $p_1 \sim p_8$, it is contemplated to establish cut-off spatial frequencies at the next lowest sampling frequencies $q_1 \sim q_{16}$ (which reside about the sampling frequencies $p_1 \sim p_8$).

Figure 16:
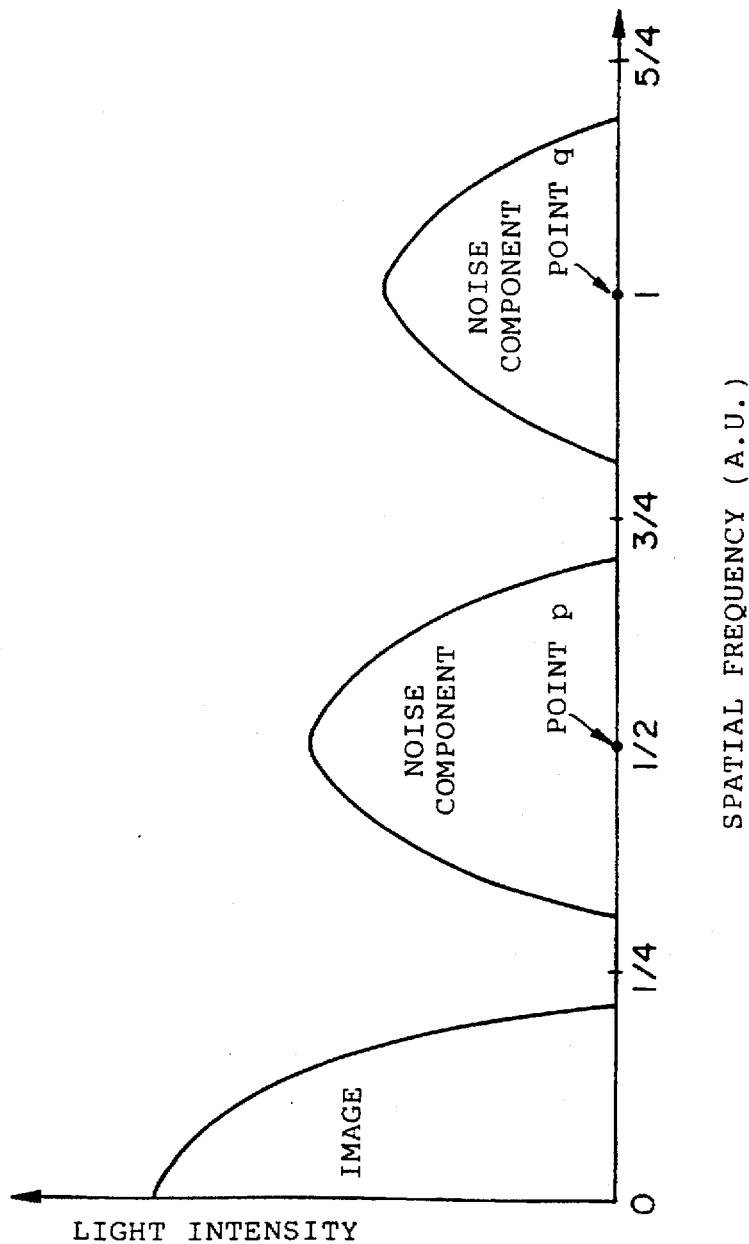
FIG. 16 shows the relationship between the light-intensity distribution of a displayed image and sampling frequency.

FIG. 16 again illustrates the light-intensity distribution of a displayed image identical with that of FIG. 3. The scale of spatial frequency along the horizontal axis is arbitrary (unlike FIG. 3), and the position of point q (q stands for $q_1 \sim q_{16}$) is set at 1. This illustrates an approach in which the noise components about point p (p stands for $p_1 \sim p_8$) are eliminated by establishing a cut-off spatial frequency (MTF=0) at point p and the noise components about point q are eliminated by establishing the cut-off spatial frequency at point q.

Here it should be noted that the sampling frequency q is exactly twice the sampling frequency p (its counterpart). (For example, $q_1$ is twice $p_1$ and $q_3$ is twice $p_2$.)

An optical low-pass filter is realized by a diffraction grating, quartz plate or prism plate, etc., as mentioned earlier. In some of these, however, two types of cut-off spatial frequencies of the kind in which one is twice the other cannot be established.

Figure 17:
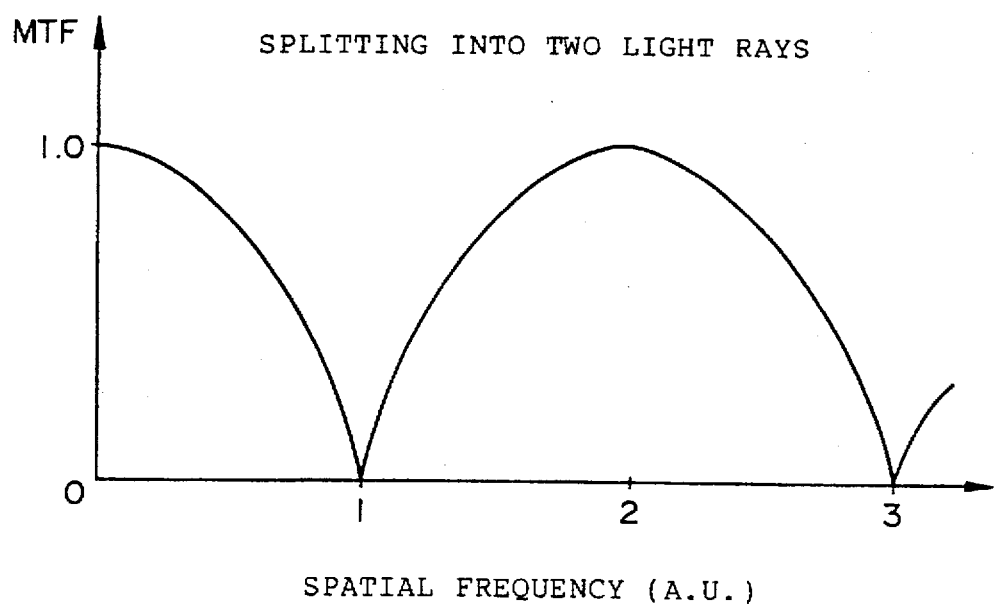
FIG. 17 illustrates the MTF characteristic of an optical low-pass filter of the type which splits light into two light rays.
Figure 18:
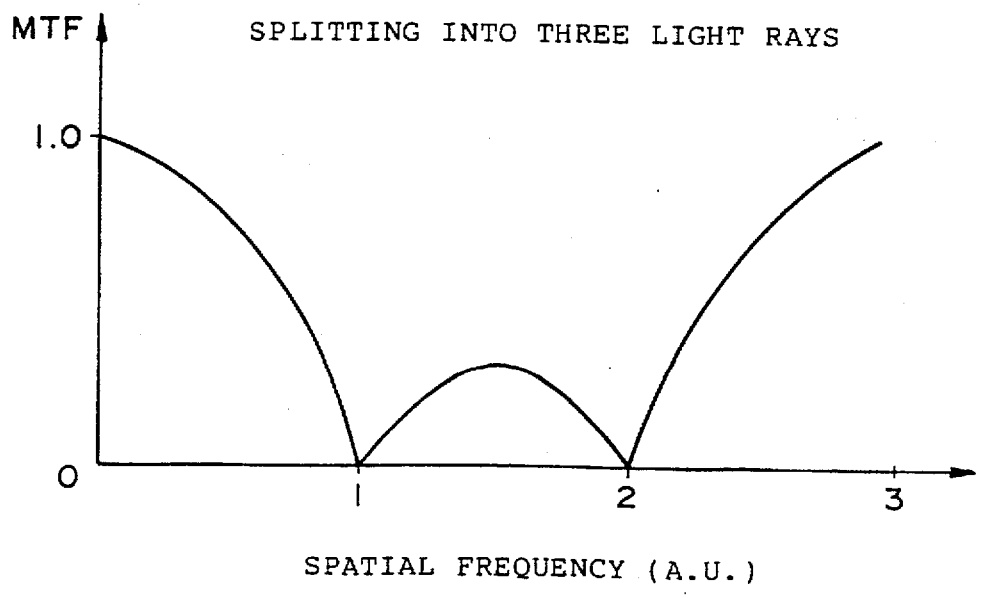
FIG. 18 illustrates the MTF characteristic of an optical low-pass filter of the type which splits light into three light rays.

FIG. 17 illustrates an example of the MTF characteristic of an optical low-pass filter of the type which causes incident light to split (branch) into two light rays in one dimension, as in the quartz plate shown in FIG. 2, and FIG. 18 shows an example of the MTF characteristic of an optical low-pass filter of the type which causes incident light to split (branch) into three light rays in one dimension, as in the diffraction grating shown in FIG. 1. The intensities of the split light rays are assumed to be equal and the scale of spatial frequency along the horizontal axis is arbitrary.

The cut-off spatial frequencies of the optical low-pass filter of the type which splits incident light into two light rays are 1 and 3, and the second cut-off spatial frequency is three times the first cut-off spatial frequency. Accordingly, even if an optical low-pass filter of this type is used, the noise components distributed about the points p and q cannot be eliminated.

Since the cut-off spatial frequencies of the optical low-pass filter of the type which splits incident light into three light rays are 1 and 2, it is theoretically possible to eliminate the noise components distributed about the points p and q. Theoretically, if the optical low-pass filter is one capable of splitting light into three or more light rays in one dimension, then it is possible to eliminate the noise components distributed about the points p and q.

In the quartz optical filter described in the specification of Japanese Patent Application Laid-Open No. 3-293316, the splitting of light into four light rays in the horizontal direction and into two light rays in the vertical direction is achieved by stacking four quartz plates. A quartz plate is more expensive than a phase grating, which is capable of being formed of a transparent resin. Four of such costly quartz plates are used to construct the quartz optical filter. In general, light can be split into four or more light rays in one dimensional direction (the same direction) by stacking two or more quartz plates. In such case, it is required that a quarter-wave plate be placed between the two quartz plates. The inevitable result is a greater number of parts and a correspondingly higher price.

When a phase grating is used, the splitting of light into three light rays in one direction can be achieved, as set forth above. It is also possible to split light into three or more light rays in each of two directions using a single phase grating. Described below will be the setting of cut-off spatial frequencies for eliminating noise components distributed about each of the points p and q with use of a phase grating.

(2) Basic Principles

The two-dimensional phase grating shown in FIG. 6 or 7 can be considered as being one obtained by stacking two one-dimensional phase gratings each having periodically irregular structures (projections and depressions) in mutually perpendicular directions. Accordingly, the MTF of a two-dimensional phase grating is represented by the product of the MTFs of two one-dimensional phase gratings. Since a cut-off spatial frequency is a frequency at which the MTF is zero, the cut-off spatial frequencies of two one-dimensional phase gratings can be considered independently of each other.

Accordingly, in the description that follows, we will consider cut-off spatial frequency with regard to a one-dimensional phase grating having an irregular periodic structure (projections and depressions) in one direction. The sampling frequencies in the above-mentioned delta arrangement will be taken as an example.

Figure 19:
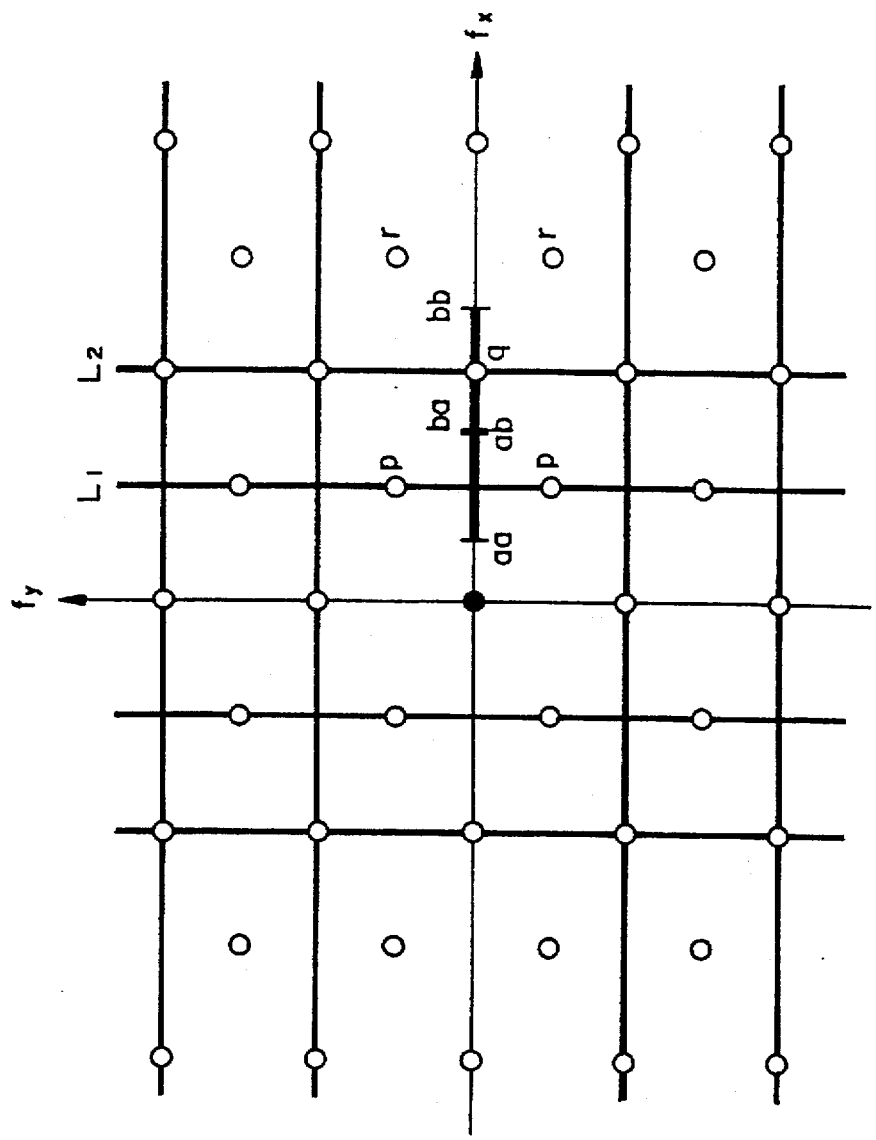
FIG. 19 illustrates a principle for setting first and second cut-off spatial frequencies.

Set cut-off spatial frequencies are indicated by the solid lines in FIG. 19. Typical examples of these cut-off spatial frequencies are indicated by L1, L2. Here L1, L2 are cut-off spatial frequencies in the horizontal direction ($f_x$ direction).

The cut-off spatial frequency L1 passes through the point p and acts to eliminate noise components distributed about the point p. The cut-off spatial frequency L2 passes through the point q and acts to eliminate noise components distributed about the point q.

Thus, it is most desirable that these two types of cut-off spatial frequencies L1, L2 be set to values that are exactly equal to the sampling frequencies of the points p, q. However, the effect of reducing noise is still manifested even if these cut-off spatial frequencies shift somewhat from the points p, q. Accordingly, ranges of these two cut-off spatial frequencies need only be decided about respective ones of L1, L2.

When the ranges of the cut-off spatial frequencies are decided, neighboring sampling frequencies are taken into account. A rational approach is to set the boundary of the range of cut-off spatial frequencies, centered on a sampling frequency of interest, at a point intermediate the sampling frequency of interest and the sampling frequency neighboring it. The reason for this is that the cut-off spatial frequencies centered on the sampling frequency of interest do not reduce down to noise distributed about the neighboring sampling frequency. For example, the range of cut-off spatial frequencies set with the point q as the center need not extend to a point r neighboring it on the outer side; it will suffice to consider that the range has a boundary at a point intermediate the point q and the point r.

Figure 21:
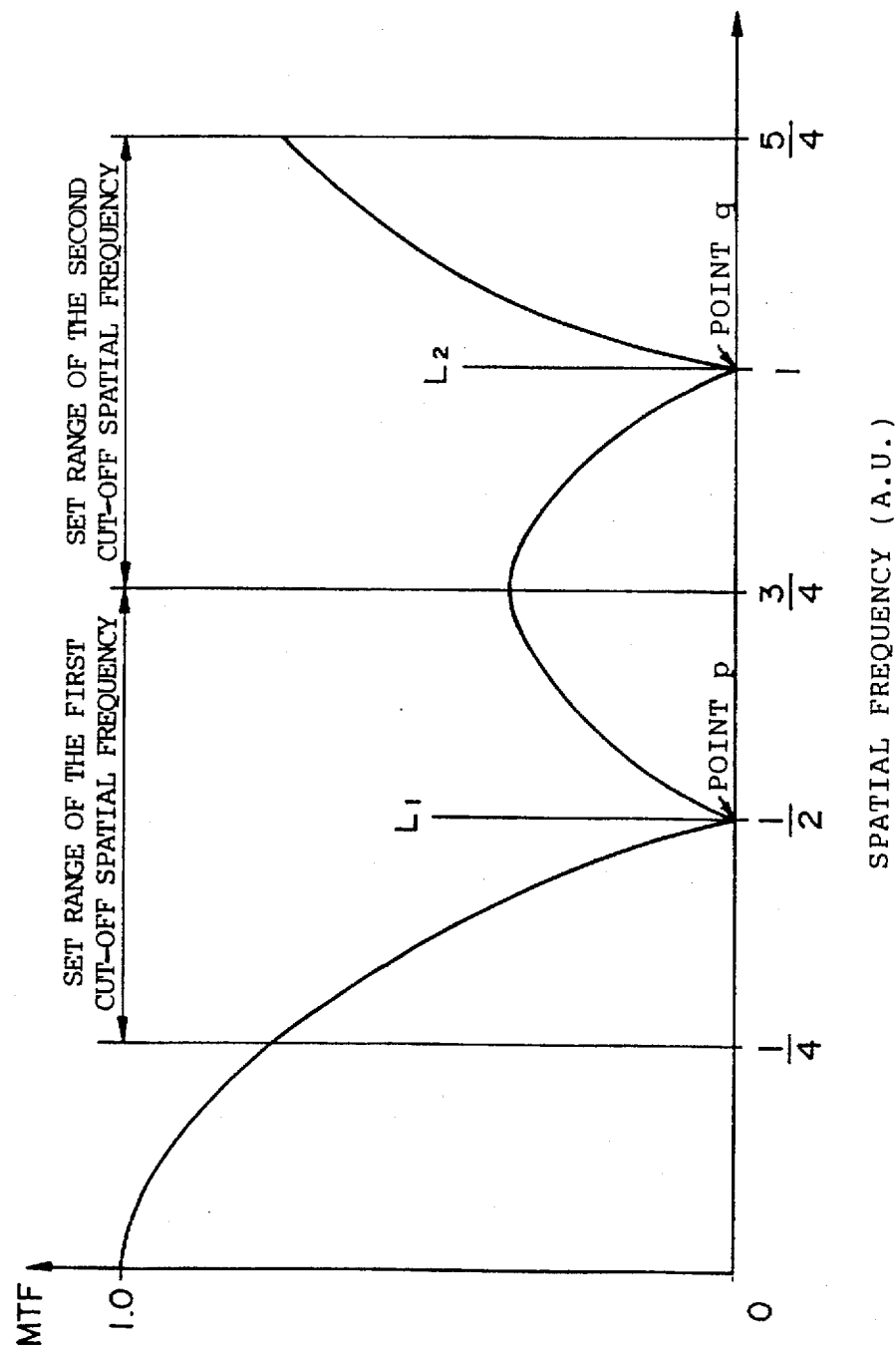
FIG. 21 illustrates ranges of first and second cut-off spatial frequencies.

FIG. 21 illustrates a range of cut-off spatial frequencies centered on the point p (let this range be a first set range of cut-off spatial frequencies) and a range of cut-off spatial frequencies centered on the point q (let this range be a second set range of cut-off spatial frequencies).

Let the spatial frequency of point q on the $f_x$ axis be 1. The spatial frequency of point p on the $f_x$ axis be ½. The spatial frequency of the point intermediate the points p and q is ¾.

The first set range of cut-off spatial frequencies is the range aa–ab shown in FIG. 19, namely the range ¼–¾ on the $f_x$ axis. The second set range of cut-off spatial frequencies is the range ba–bb shown in FIG. 19, namely the range ¾–5⁄4 on the $f_x$ axis.

In FIG. 19, the two set ranges of cut-off spatial frequencies in the vertical direction (along the $f_y$ axis) are determined in the same fashion.

Figure 20:
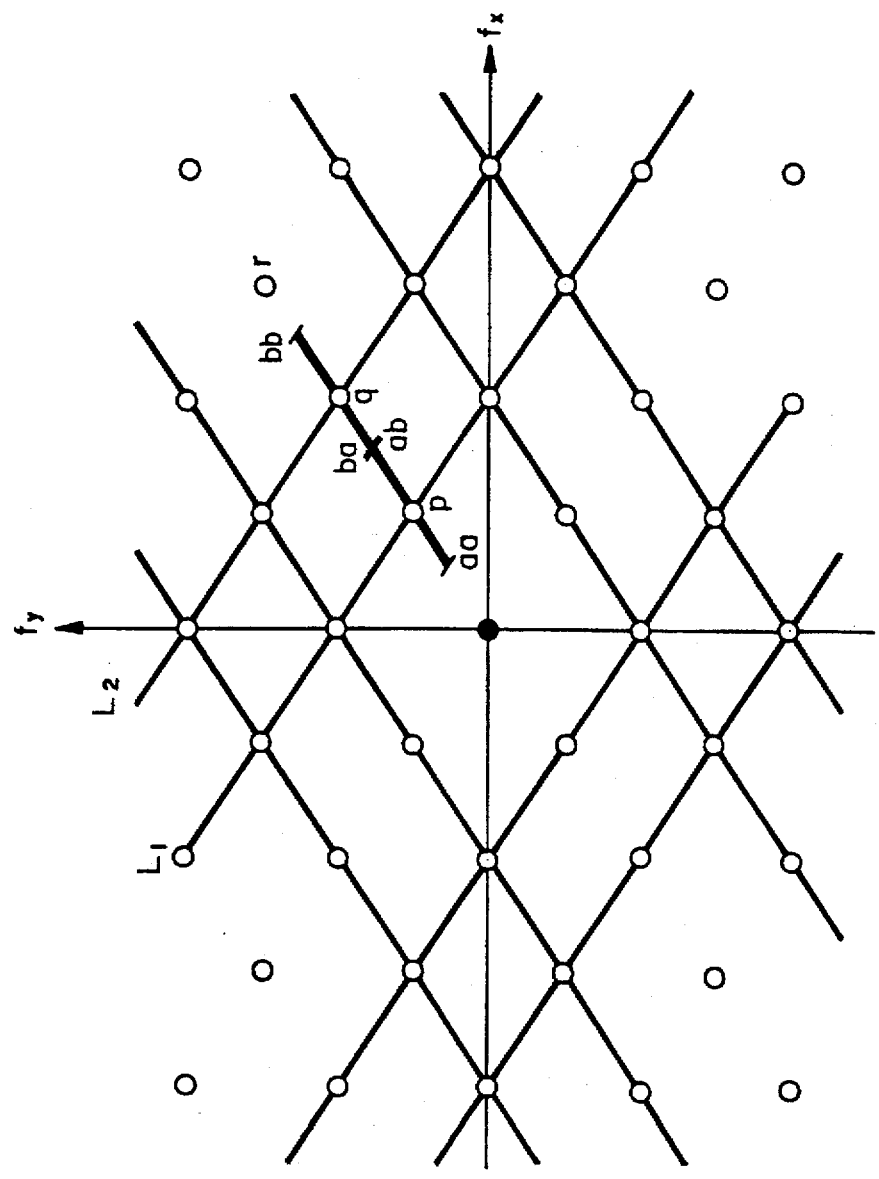
FIG. 20 illustrates another example of the setting of first and second cut-off spatial frequencies.

FIG. 20 illustrates another example of the setting of cut-off spatial frequencies and ranges thereof. The cut-off spatial frequencies L1, L2 are set diagonally in the $f_x$-$f_y$ coordinate system so as to pass through the points p, q. The first and second set ranges of the cut-off spatial frequencies are aa–ab and ba–bb, respectively.

In summary, therefore, the frequency of the point q is taken as being 1 and the first and second cut-off spatial frequency ranges should be set to ¼–¾ and ¾–5⁄4, respectively.

Figure 22:
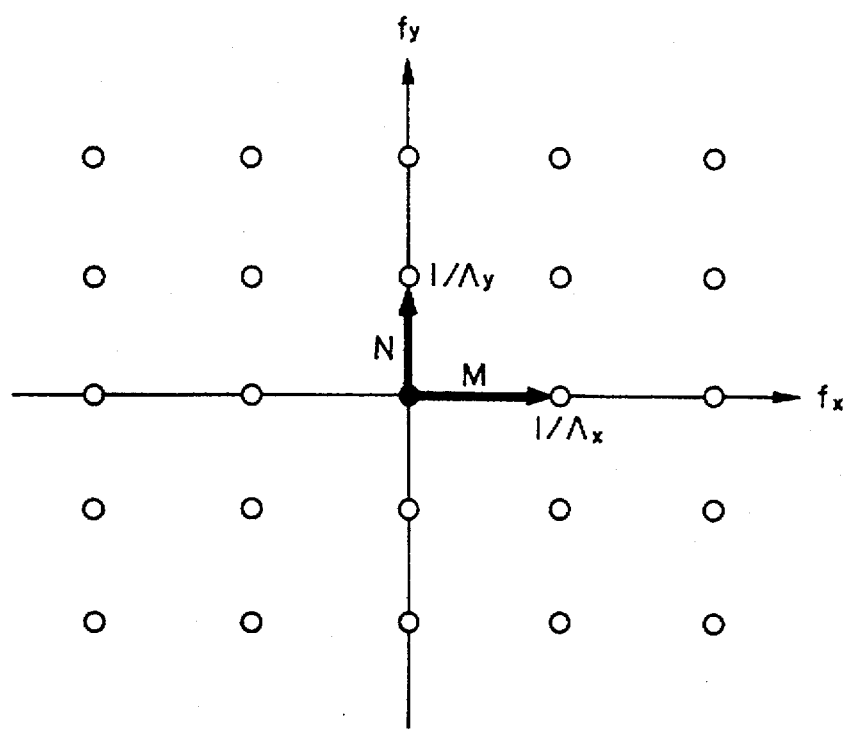
FIG. 22 illustrates a sampling-frequency distribution and basic frequency vectors in a stripe arrangement.
Figure 23:
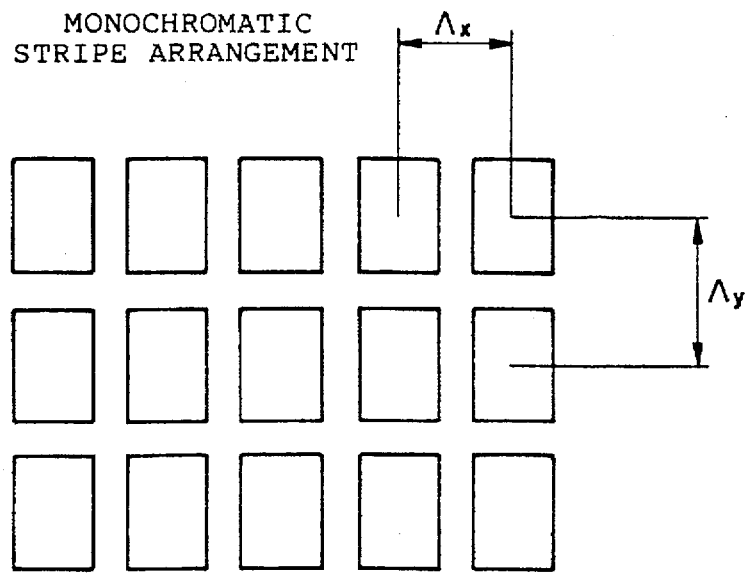
FIGS. 23 through 25 illustrates examples of stripe arrangements.
Figure 24:
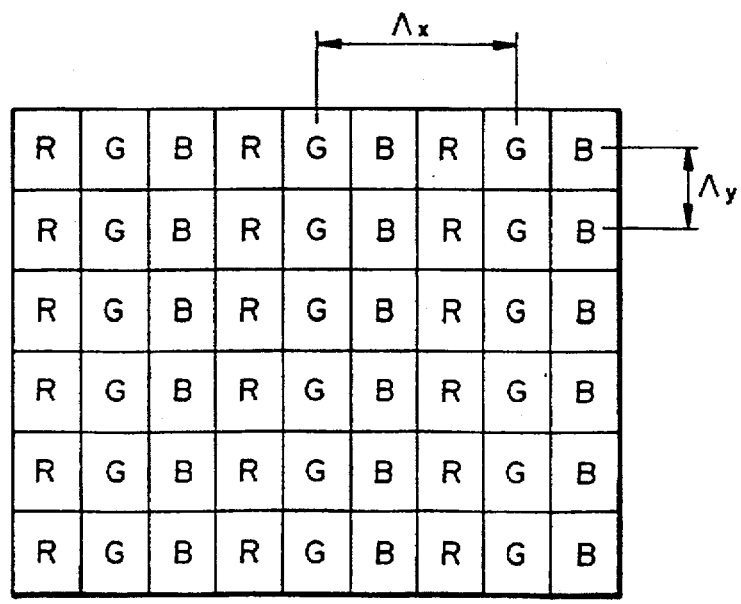
Figure 25:
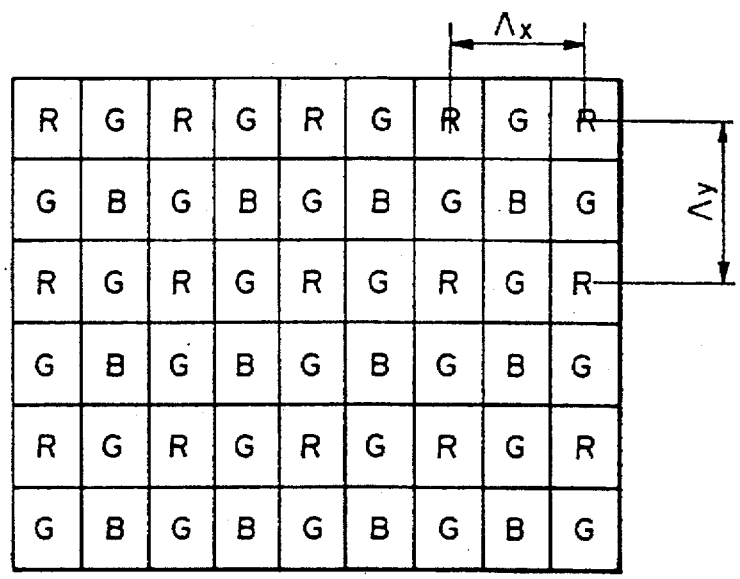

(3) Various Pixel Arrangements and Set Ranges of Cut-Off Spatial Frequencies Therefor FIG. 22 illustrates a sampling-frequency distribution in a stripe arrangement. FIGS. 23 through 25 illustrate examples of stripe arrangements.

In the distribution of sampling frequencies in the stripe arrangement of FIG. 22, consider two vectors M, N directed from the origin of the two-dimensional frequency coordinate system toward two different sampling frequencies at the positions closest to the origin, and let these vectors be two basic frequency vectors.

All of the sampling frequencies distributed in the two-dimensional frequency coordinate system $f_x$, $f_y$ can be expressed by the resultant of these two basic frequency vectors M and N. Conversely speaking, the two vectors that are capable of synthesizing all sampling frequencies are referred to as basic frequency vectors.

FIG. 23 illustrates a stripe arrangement for a black-and-white (monochromatic) display, as well as the pixel periods $\Lambda_x$, $\Lambda_y$ thereof.

FIG. 24 illustrates a stripe arrangement for a color display, as well as the pixel periods $\Lambda_x$, $\Lambda_y$ thereof. The plurality of display colors are R (red), G (green) and B (blue).

FIG. 25 illustrates a square arrangement and the pixel periods $\Lambda_x$, $\Lambda_y$ thereof. With regard to the color R or B, the square arrangement can be considered an arrangement identical with the stripe arrangement.

Figure 26:
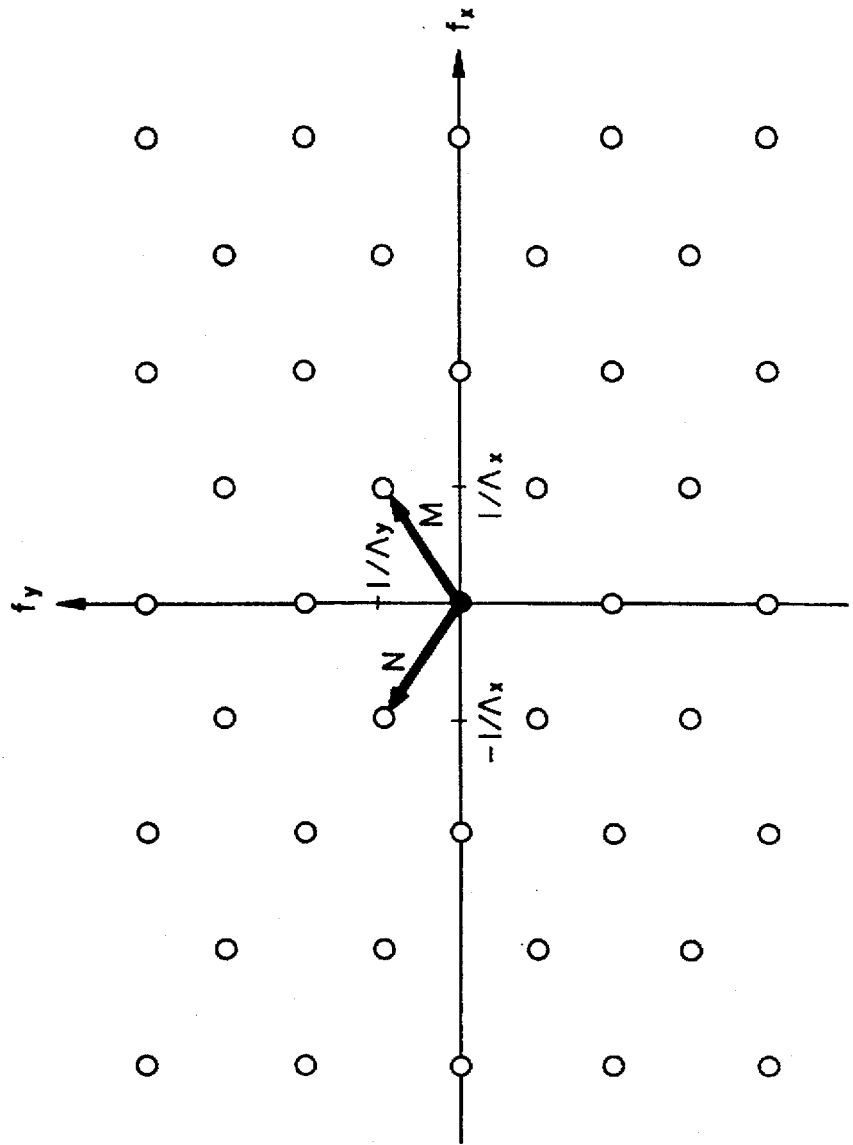
FIG. 26 illustrates a sampling-frequency distribution and basic frequency vectors in a delta arrangement.

FIG. 26 illustrates a distribution of sampling frequencies and the basic frequency vectors M, N in a delta arrangement. (The magnitude of the scale along the $f_x$ axis and $f_y$ axis differs from that shown in FIG. 15.)

Figure 29:
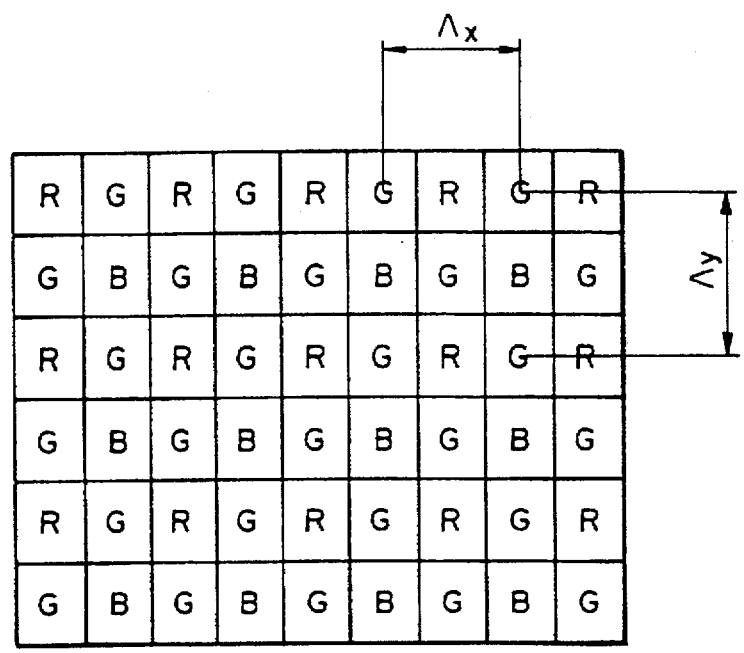

There are four examples of delta arrangements. One is the delta arrangement for the monochromatic display already illustrated in FIG. 13. Second and third examples are shown in FIGS. 27 and 28, respectively. The fourth example is the square arrangement shown in FIG. 29. The square arrangement can be regarded as a delta arrangement with regard to the color G. These drawings also show the pixel periods $\Lambda_x$, $\Lambda_y$.

Figure 30:
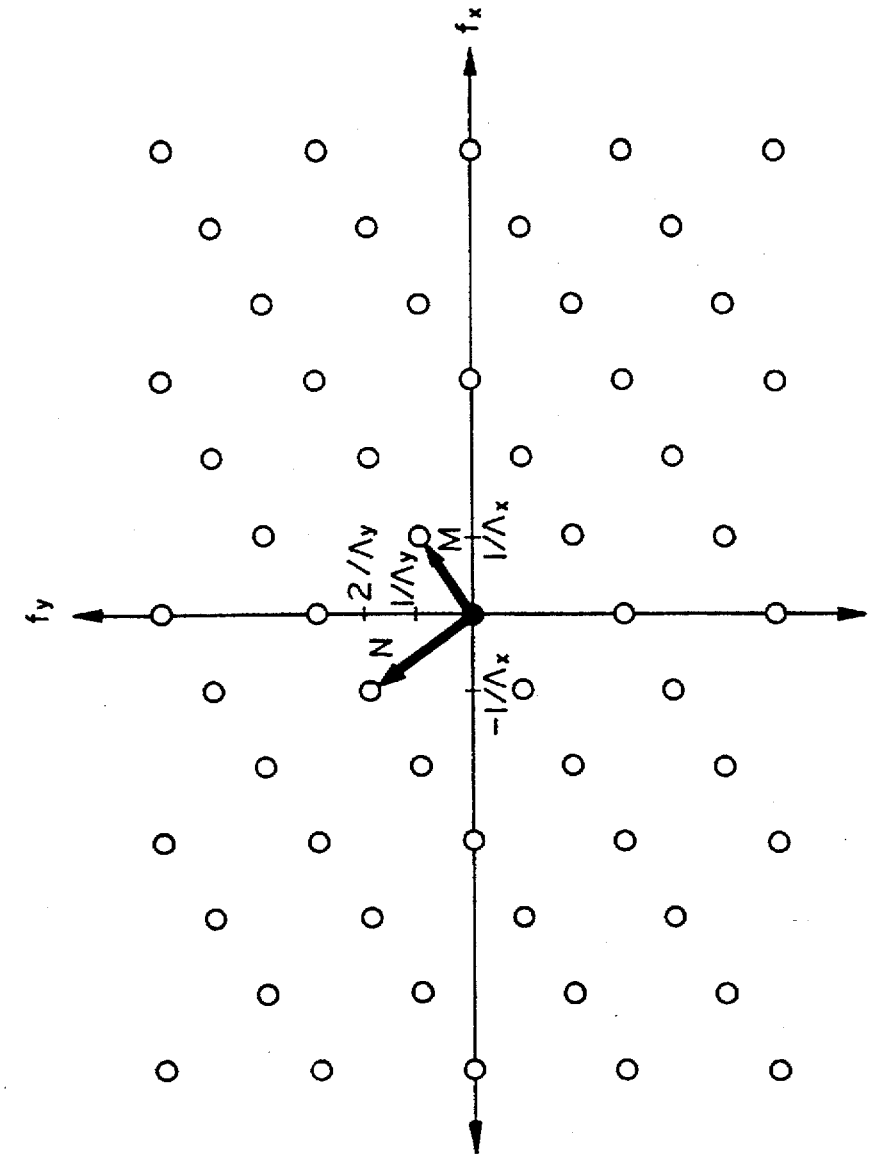
FIG. 30 illustrates a sampling-frequency distribution and basic frequency vectors in a mosaic arrangement.

FIG. 30 illustrates a sampling-frequency distribution and the basic frequency vectors M, N in a mosaic arrangement.

Figure 31:
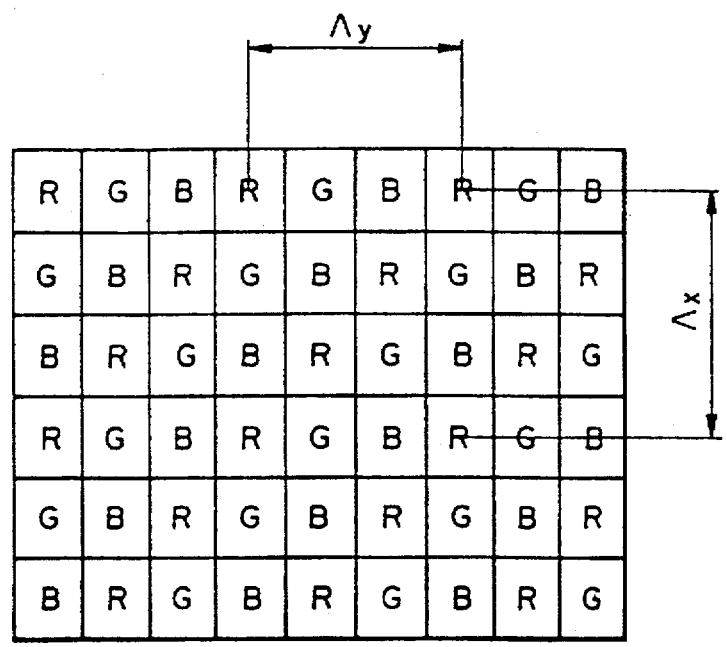
FIGS. 31 and 32 illustrates examples of mosaic arrangements.
Figure 32:
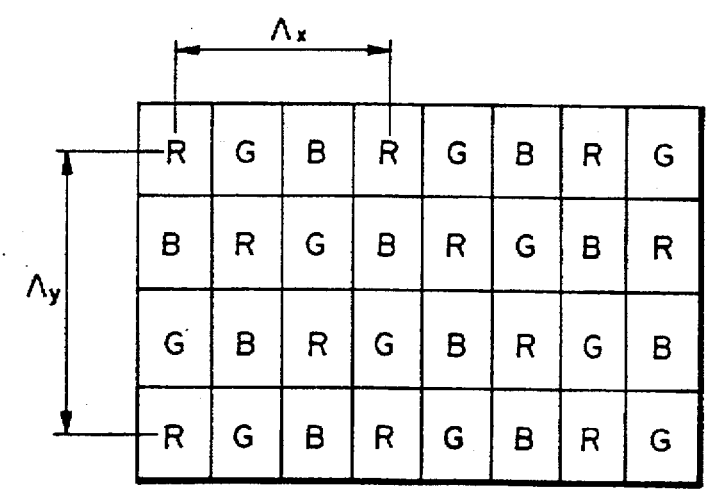

FIGS. 31 and 32 illustrate examples of mosaic arrangements and the pixel periods $\Lambda_x$, $\Lambda_y$ thereof.

In the case of a color display device, image roughness is a result of the fact that the pixels of each of the colors R, G, B are separated and not mixed together. Accordingly, sampling frequency, which is the center frequency of the noise that causes roughness, is dependent upon the arrangement period of the pixels of each color. In other words, the sampling frequencies are dependent upon the arrangement period of the pixels of the color R, the arrangement period of the pixels of the color G and the arrangement period of the pixels of the color B, respectively.

In general, the cut-off spatial frequencies of the optical low-pass filter should be set taking note of any one of the colors R, G, B.

However, the human eye is most sensitive to the color G and, hence, it is preferred that the cut-off spatial frequencies of the optical low-pass filter be decided based upon the pixel arrangement period of the pixels for the color G.

Figure 33:
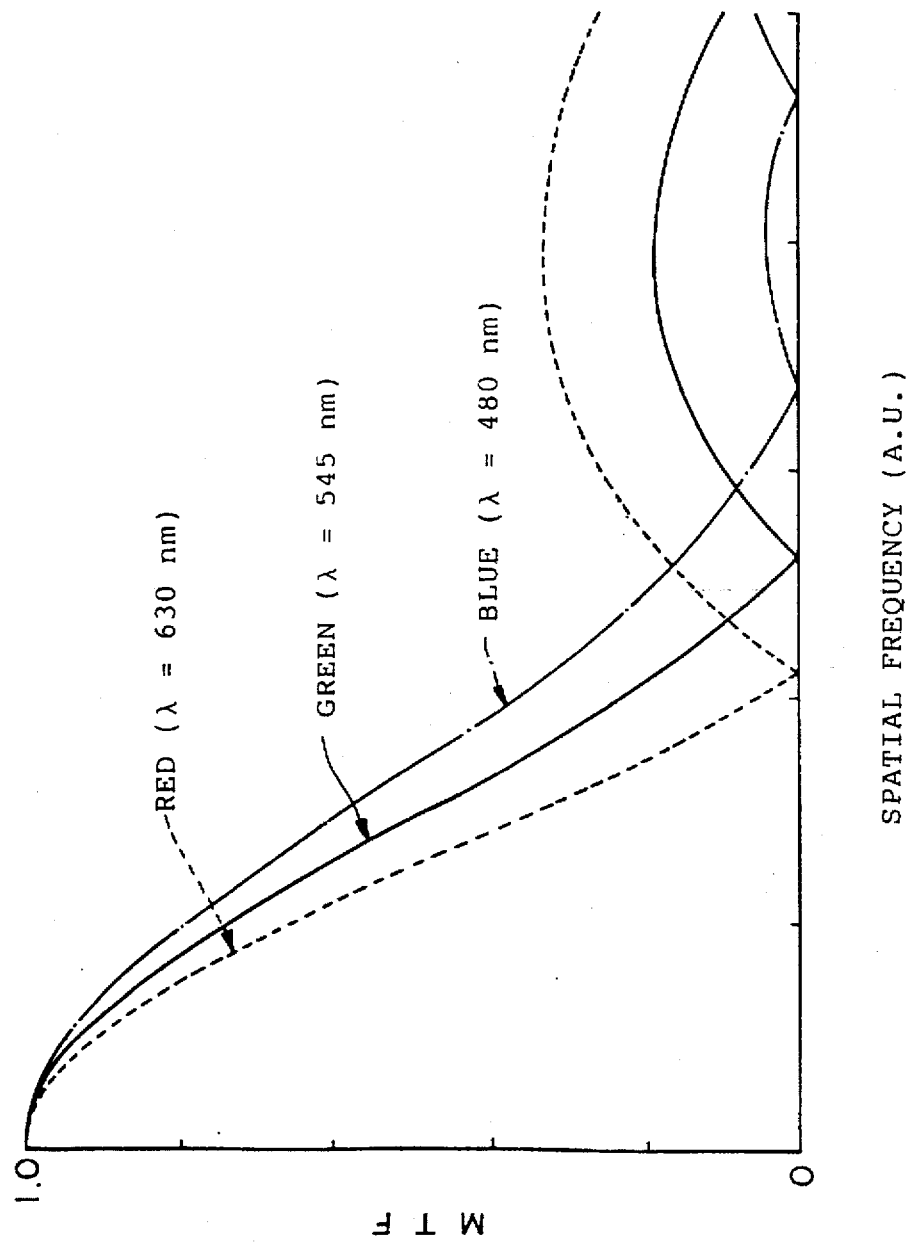
FIG. 33 is a graph showing the wavelength dependence characteristic of MTF plotted against cut-off spatial frequency.

The MTF varies with wavelength. FIG. 33 illustrates the MTF relating to red (R) (a wavelength of 630 nm), green (G) (a wavelength of 545 nm) and blue (B) (a wavelength of 480 nm) of a certain sinusoidal diffraction grating (optical low-pass filter). The larger the wavelength of light, the smaller the cut-off spatial frequency. Among the colors red, green and blue, that for which the cut-off spatial frequency is situated at the center is appropriately made the reference. Accordingly, it will suffice to design the optical low-pass filter using the cut-off spatial frequency of the wavelength of the color green.

Ranges of the first and second cut-off spatial frequencies will now be described for each type of pixel arrangement.

Figure 34:
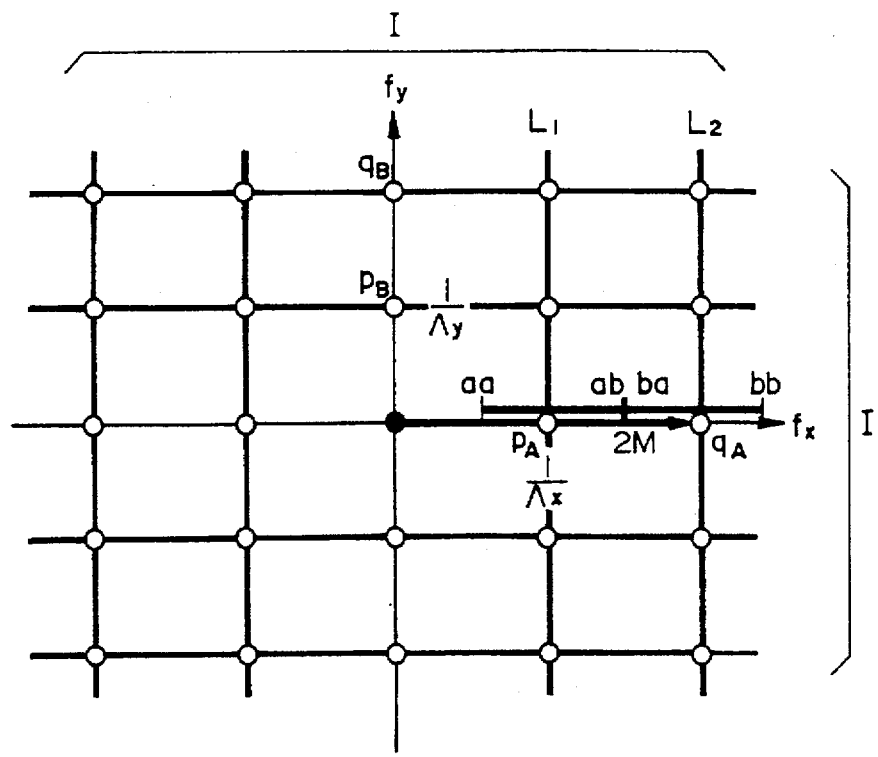
FIG. 34 illustrates an example of the setting of ranges of first and second cut-off spatial frequencies in a stripe arrangement.
Figure 35:
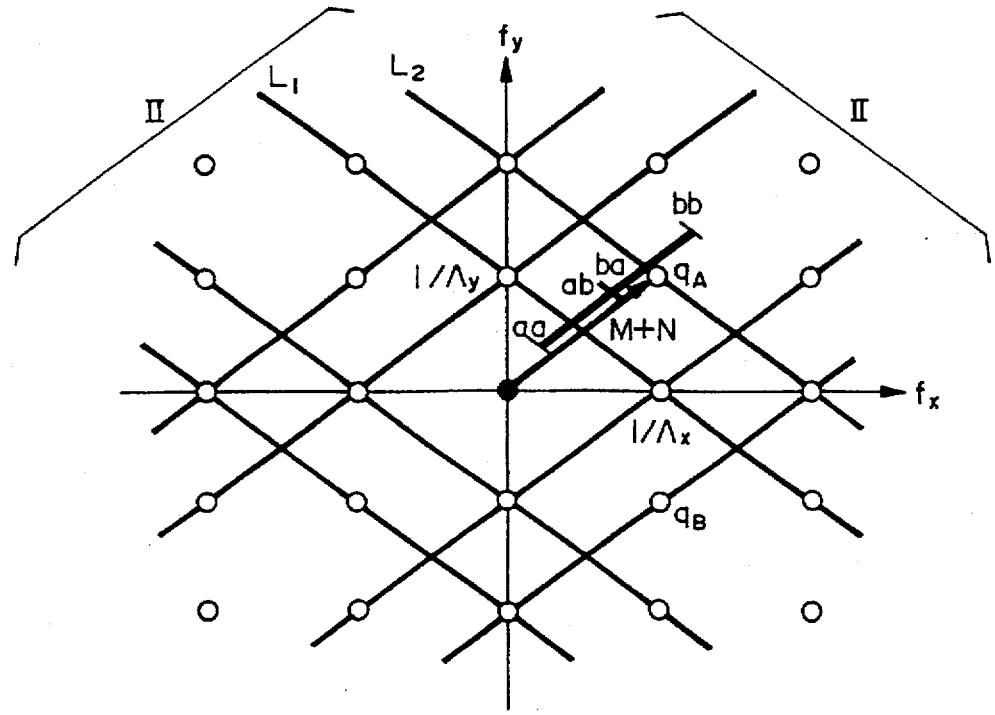
FIG. 35 illustrates another example of the setting of ranges of first and second cut-off spatial frequencies in a stripe arrangement.

FIGS. 34 and 35 illustrate set ranges of the first and second cut-off spatial frequencies L1, L2 in a stripe arrangement.

The basic frequency vectors M, N in the stripe arrangement are expressed by the following equations (see FIG. 22):

$$M = \left( \frac{1}{\Lambda_x}, 0 \right)$$ Eq. (33)

$$N = \left( 0, \frac{1}{\Lambda_y} \right)$$

Since the starting point of the basic frequency vectors is the origin (0,0) of the $f_x$-$f_y$ coordinate system, each basic frequency vector is expressed in Equation (33) by the $f_x$, $f_y$ coordinates of the end point (the arrow symbol) of the vector. The same will hold also in the expression of the frequency vectors in the description that follows.

In FIG. 34, $q_A$ on the $f_x$ axis is represented by 2M+0N=2M using the basic frequency vectors M, N.

$$2M = \left( \frac{2}{\Lambda_x}, 0 \right)$$ Eq. (34)

The range (aa–ab) of the first cut-off spatial frequency L1 centered on point $p_A$ and the range (ba–bb) of the second cut-off spatial frequency L2 centered on point $q_A$ are represented by Equations (1) and (2), respectively. In other words, when Equations (1) and (2) are satisfied, the first and second cut-off spatial frequencies (the points at which MTF=0 holds) in one direction (the horizontal direction in FIG. 34) of the optical low-pass filter reside within the ranges aa–ab and ba–bb in FIG. 34.

Similarly, a point $q_B$ on the $f_y$ axis is represented by 0M+2N=2N.

$$2N = \left( 0, \frac{2}{\Lambda_y} \right)$$ Eq. (35)

The range of the first cut-off spatial frequency centered on point $p_B$ and the range of the second cut-off spatial frequency centered on point $q_B$ are represented by Equations (3) and (4), respectively. Conversely speaking, when Equations (3) and (4) are satisfied, the first and second cut-off spatial frequencies (the points at which MTF=0 holds) in the other direction (the vertical direction in FIG. 34) of the optical low-pass filter lie within the aforesaid ranges ¼–¾ and ¾–5/4 (where the frequency of $q_B$ is taken as being 1), respectively.

The Equations (1), (2) and the Equations (3), (4) indicate, by the relationship with the pixel periods ($\Lambda_x$, $\Lambda_y$) and the position ($X_1$, $Y_1$) of the virtual image of the pixel, in which ranges the light-splitting efficiencies ($P_0$, $P_1$) of the optical low-pass filter reside when the first and second cut-off spatial frequencies of a two-dimensional phase grating (optical low-pass filter) are within the ranges mentioned above. Conversely speaking, by actually measuring the light-splitting efficiency of the optical low-pass filter at the position of the virtual image (diffracted light of order 1) and at the position of the real image of the pixel (light of order 0), the magnitudes of the first and second cut-off spatial frequencies can be determined. Actual measurement of the diffraction efficiency of an optical low-pass filter is comparatively easy.

The proof of Equations (1)–(4) will be given later.

It will suffice if the ranges of the first and second cut-off spatial frequencies are satisfied in at least one direction. In other words, it will suffice if Equations (1) and (2) hold or if Equations (3) and (4) hold.

The foregoing is applied with regard to all conditions described below.

In FIG. 35, the point $q_A$ is represented by M+N using the two basic frequency vectors.

$$M + N = \left( \frac{1}{\Lambda_x}, \frac{1}{\Lambda_y} \right)$$ Eq. (36)

The ranges of the first and second cut-off spatial frequencies L1 and L2 in one direction are defined by Equations (5) and (6).

The point $q_B$ in the other direction is represented by M–N.

$$M - N = \left( \frac{1}{\Lambda_x}, -\frac{1}{\Lambda_y} \right)$$ Eq. (37)

The ranges of the first and second cut-off spatial frequencies in the other direction are defined by Equations (7) and (8).

In FIG. 34, the centers of the set ranges of the first and second cut-off spatial frequencies with regard to two directions are indicated by the bold solid lines (these are referred to as "Group I"). In FIG. 35, the centers of the set ranges of the first and second cut-off spatial frequencies with regard to two directions are indicated by the bold solid lines (these are referred to as "Group II"). The meaning of Group I and Group II will be set forth later.

FIGS. 36 through 39 illustrate set ranges of the first and second cut-off spatial frequencies in delta arrangements.

The basic frequency vectors M, N in the delta arrangement are represented by the following, respectively (see FIG. 26):

$$M = \left(\frac{1}{\Lambda_x}, \frac{1}{\Lambda_y}\right) \qquad \text{Eq. (38)}$$

$$N = \left(-\frac{1}{\Lambda_x}, \frac{1}{\Lambda_y}\right)$$

Figure 36:
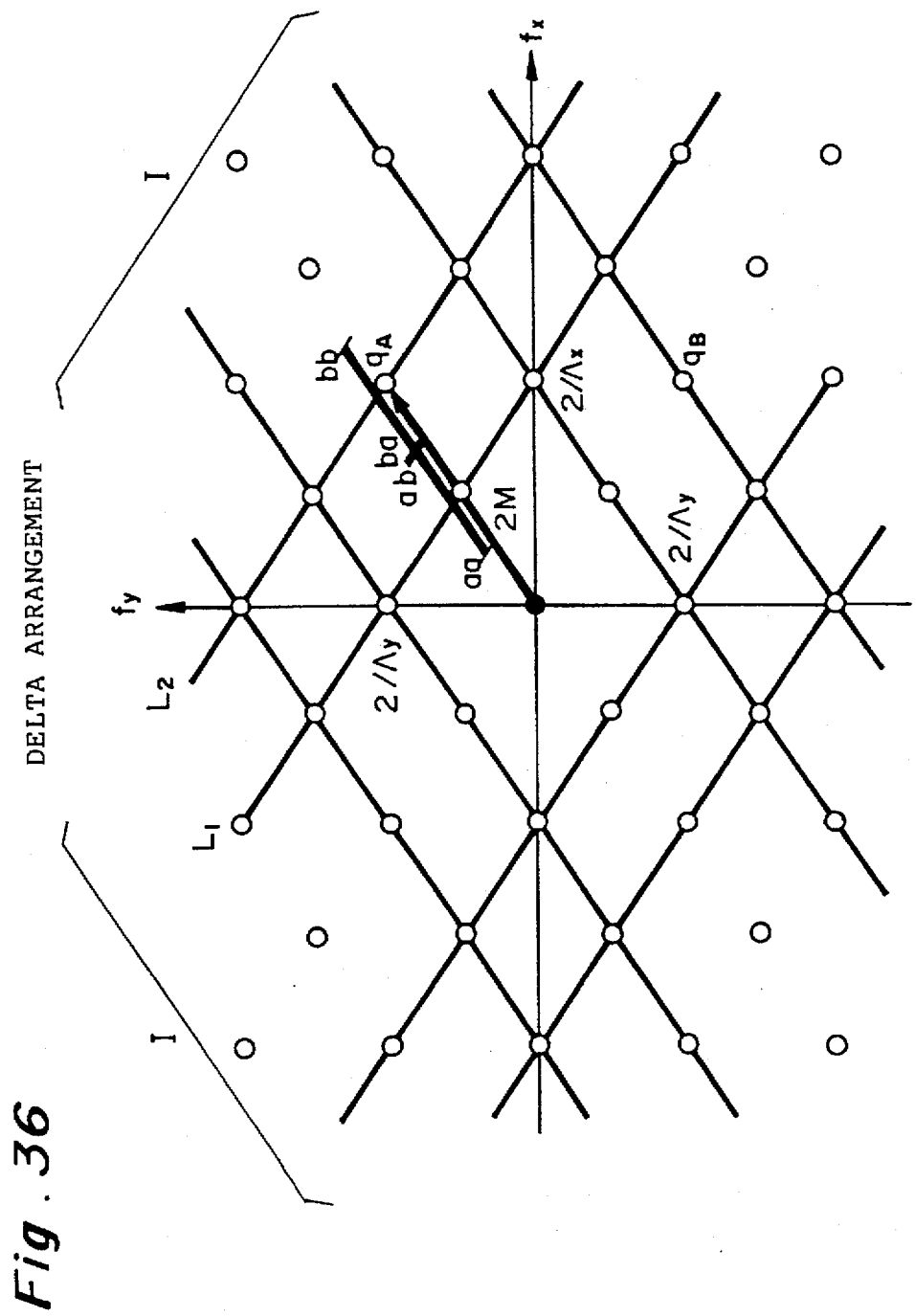
FIG. 36 illustrates an example of the setting of ranges of first and second cut-off spatial frequencies in a delta arrangement.

The point $q_A$ in FIG. 36 is represented by 2M.

$$2M = \left(\frac{2}{\Lambda_x}, \frac{2}{\Lambda_y}\right) \qquad \text{Eq. (39)}$$

The set ranges (aa–ab and ba–bb) of the first and second cut-off spatial frequencies in one direction are represented by Equations (9) and (10), respectively (Group I).

The point $q_B$ that defines the cut-off spatial frequencies in the other direction is represented by $-2N$.

$$-2N = \left(\frac{2}{\Lambda_x}, -\frac{2}{\Lambda_y}\right) \qquad \text{Eq. (40)}$$

The ranges of the first and second cut-off spatial frequencies in the other direction are represented by Equations (11) and (12) (Group II).

Figure 37:
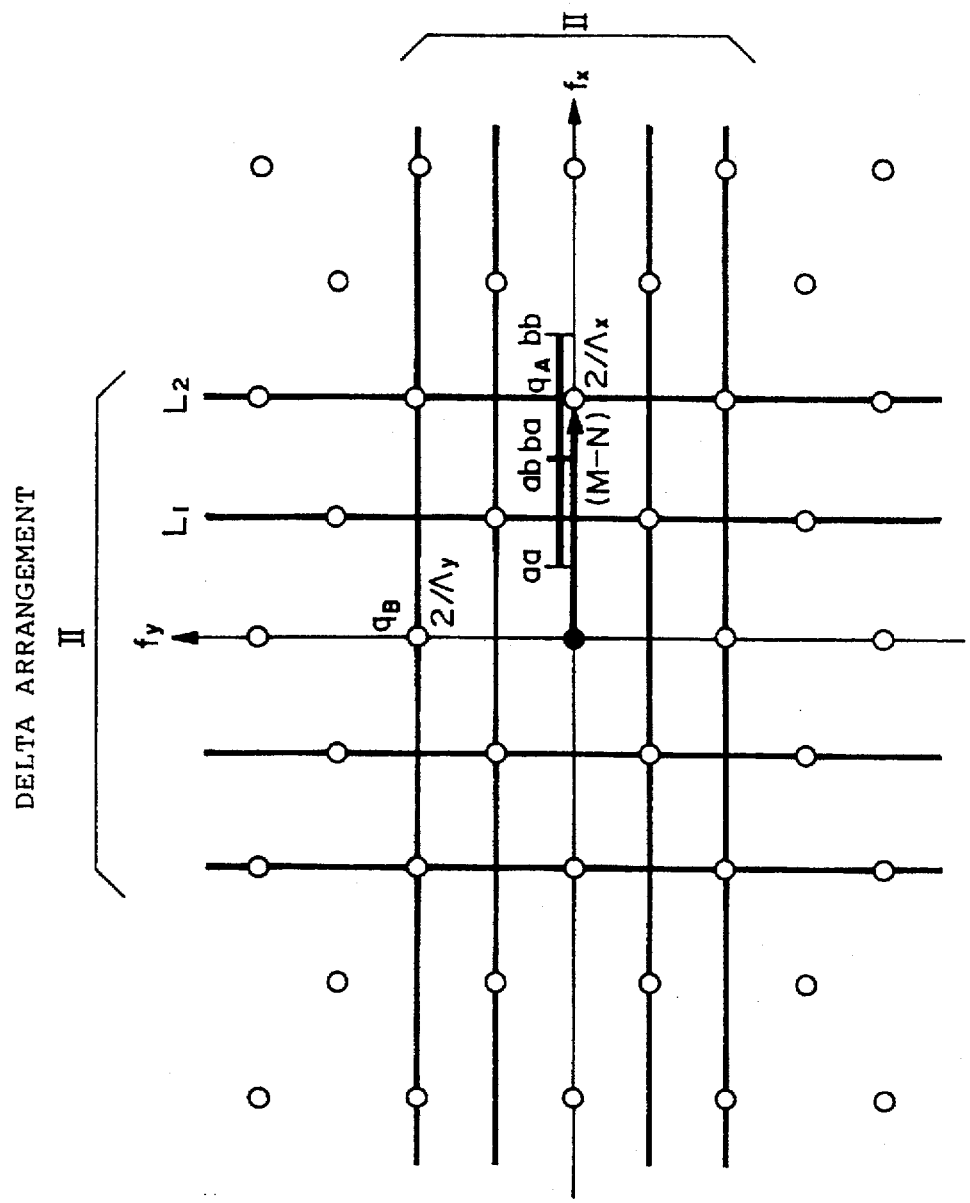
FIG. 37 illustrates another example of the setting of ranges of first and second cut-off spatial frequencies in a delta arrangement.

The point $q_A$ in FIG. 37 is represented by M–N.

$$M - N = \left(\frac{2}{\Lambda_x}, 0\right) \qquad \text{Eq. (41)}$$

When Equations (13) and (14) are satisfied, the first and second cut-off spatial frequencies (L1, L2) in one direction (the horizontal direction) fall within the ranges aa–ab, ba–bb (Group II).

The point $q_B$ that defines the cut-off spatial frequencies in the other direction (the vertical direction) is represented by M+N.

$$M + N = \left(0, \frac{2}{\Lambda_y}\right) \qquad \text{Eq. (42)}$$

The set ranges of the first and second cut-off spatial frequencies in the other direction are represented by Equations (15) and (16).

Figure 38:
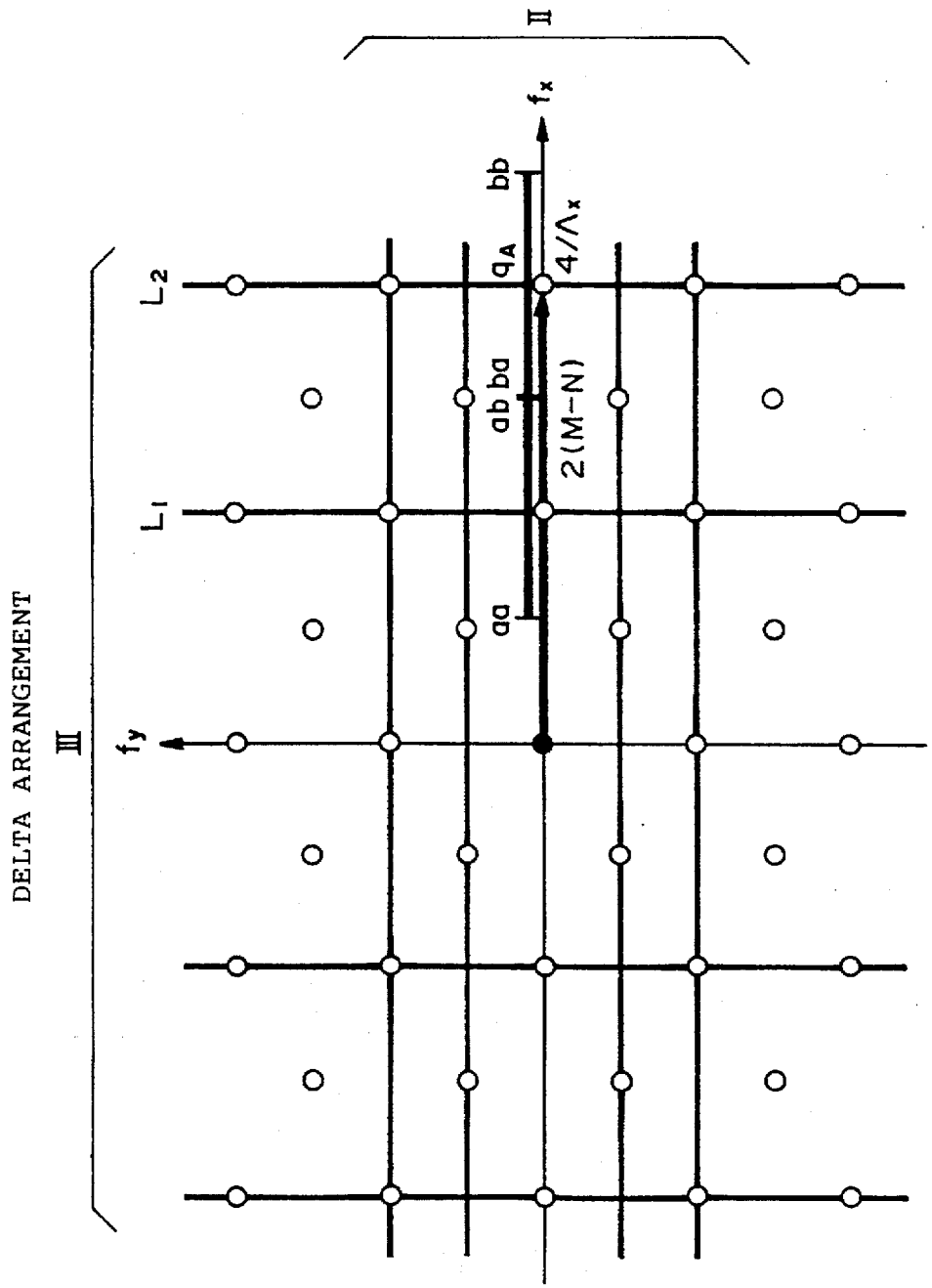
FIG. 38 illustrates still another example of the setting of ranges of first and second cut-off spatial frequencies in a delta arrangement.

The point $q_A$ in FIG. 38 is represented by 2(M–N).

$$2(M - N) = \left(\frac{4}{\Lambda_x}, 0\right) \qquad \text{Eq. (43)}$$

When Equations (17) and (18) are satisfied, the first and second cut-off spatial frequencies (L1, L2) in one direction (the horizontal direction) fall within the ranges aa–ab, ba–bb (Group III).

The set ranges of the first and second cut-off spatial frequencies in the other direction are the same as those shown in FIG. 37 and are represented by Equations (15) and (16) (Group II).

Figure 39:
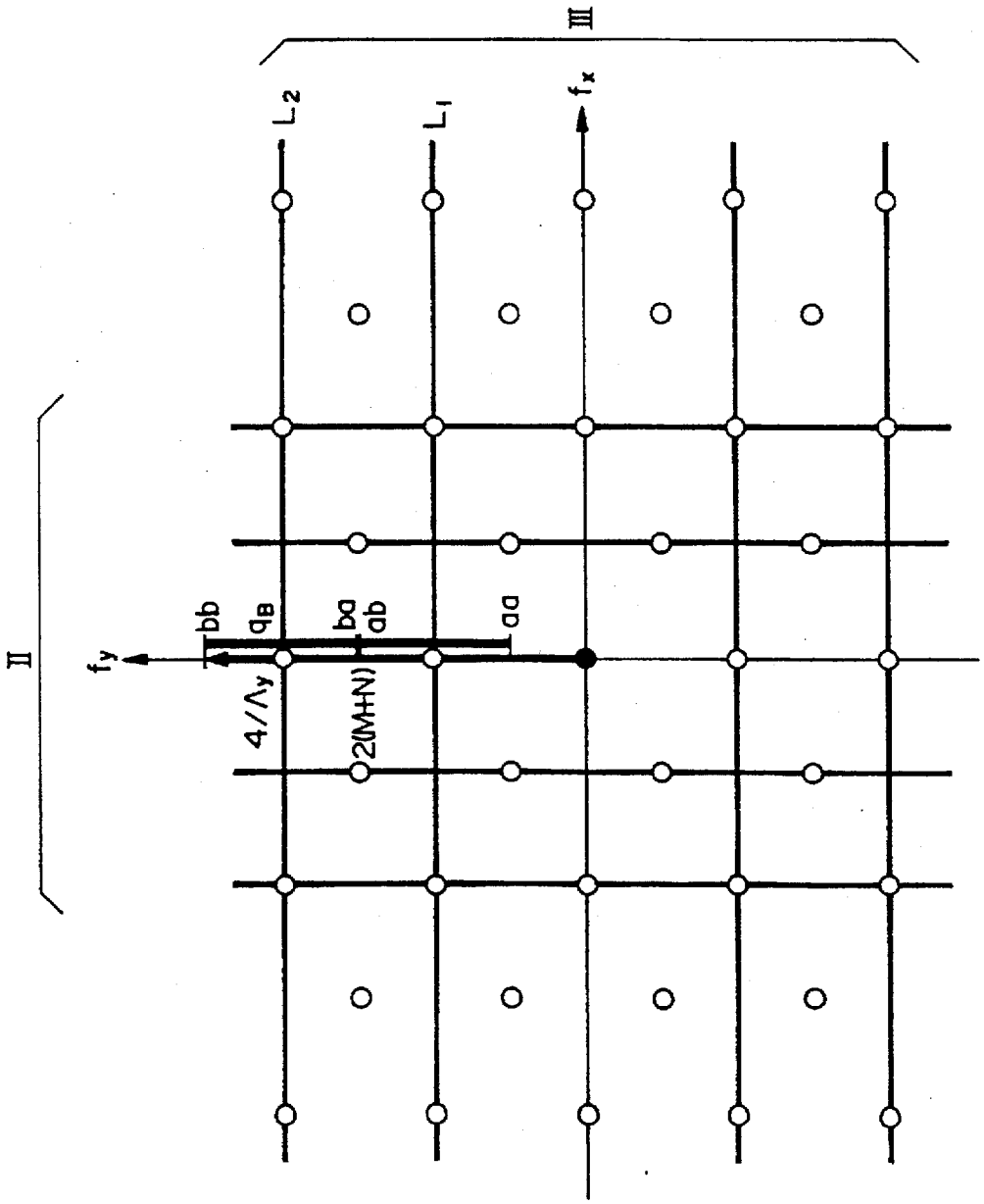
FIG. 39 illustrates a further example of the setting of ranges of first and second cut-off spatial frequencies in a delta arrangement.

The point $q_B$ in FIG. 39 is represented by 2(M+N).

$$2(M + N) = \left(0, \frac{4}{\Lambda_y}\right) \qquad \text{Eq. (44)}$$

When Equations (19) and (20) are satisfied, the first and second cut-off spatial frequencies (L1, L2) in one direction (the vertical direction) fall within the ranges aa–ab, ba–bb (Group III).

The set ranges of the first and second cut-off spatial frequencies in the other direction (the horizontal direction) are the same as those shown in FIG. 37 and are represented by Equations (13) and (14) (Group II).

FIGS. 40 through 44 illustrate set ranges of the first and second cut-off spatial frequencies in mosaic arrangements.

The basic frequency vectors M, N in the mosaic arrangement are represented by the following, respectively (see FIG. 30):

$$M = \left(\frac{1}{\Lambda_x}, \frac{1}{\Lambda_y}\right) \qquad \text{Eq. (45)}$$

$$N = \left(-\frac{1}{\Lambda_x}, \frac{2}{\Lambda_y}\right)$$

Figure 40:
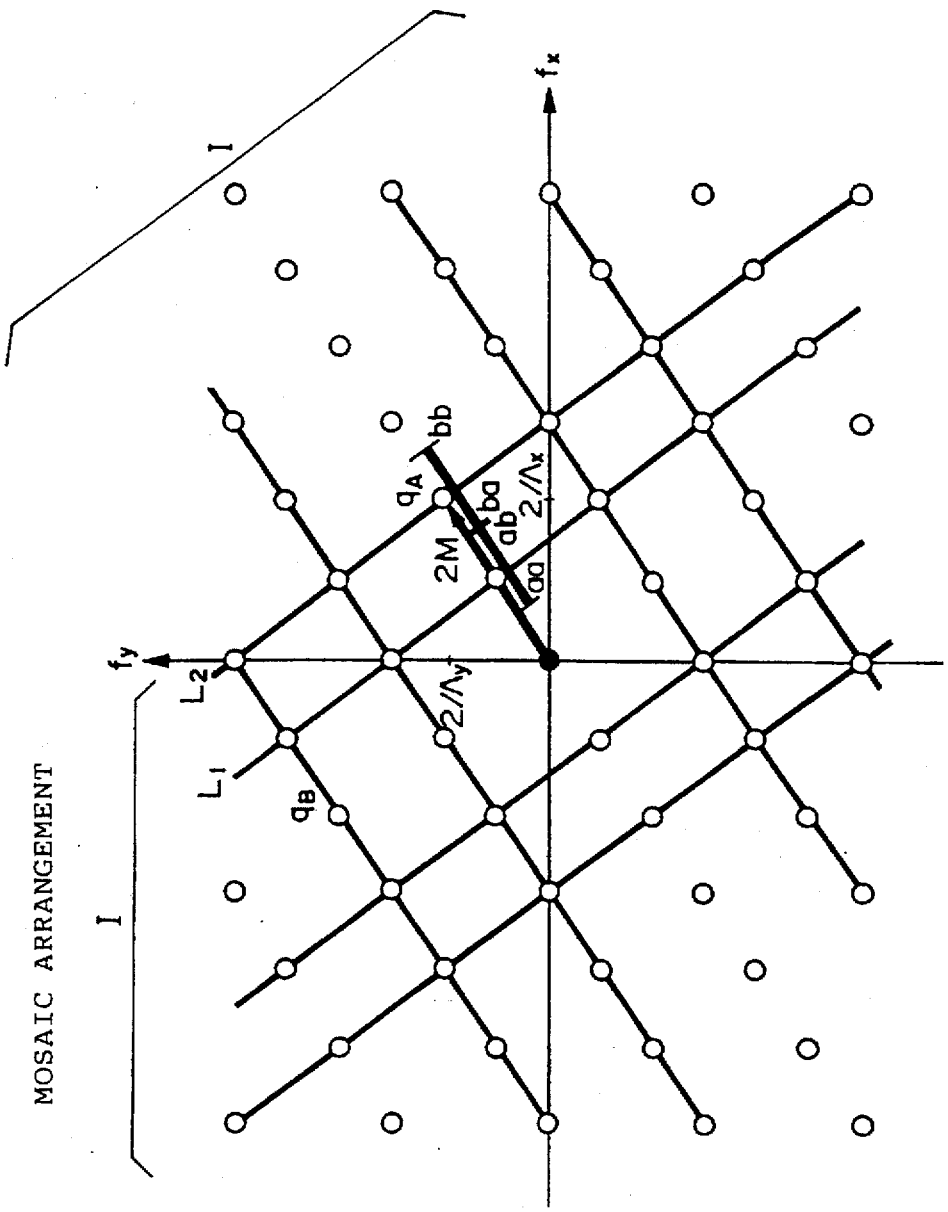
FIG. 40 illustrates an example of the setting of ranges of first and second cut-off spatial frequencies in a mosaic arrangement.

The point $q_A$ in FIG. 40 is represented by 2M.

$$2M = \left(\frac{2}{\Lambda_x}, \frac{2}{\Lambda_y}\right) \qquad \text{Eq. (46)}$$

When Equations (21) and (22) are satisfied, the first and second cut-off spatial frequencies (L1, L2) in one direction fall within the ranges aa–ab, ba–bb (Group I).

The point $q_B$ that defines the cut-off spatial frequencies in the other direction is represented by 2N.

$$2N = \left(-\frac{2}{\Lambda_x}, \frac{4}{\Lambda_y}\right) \qquad \text{Eq. (47)}$$

The set ranges of the first and second cut-off spatial frequencies in the other direction are represented by Equations (23) and (24).

Figure 41:
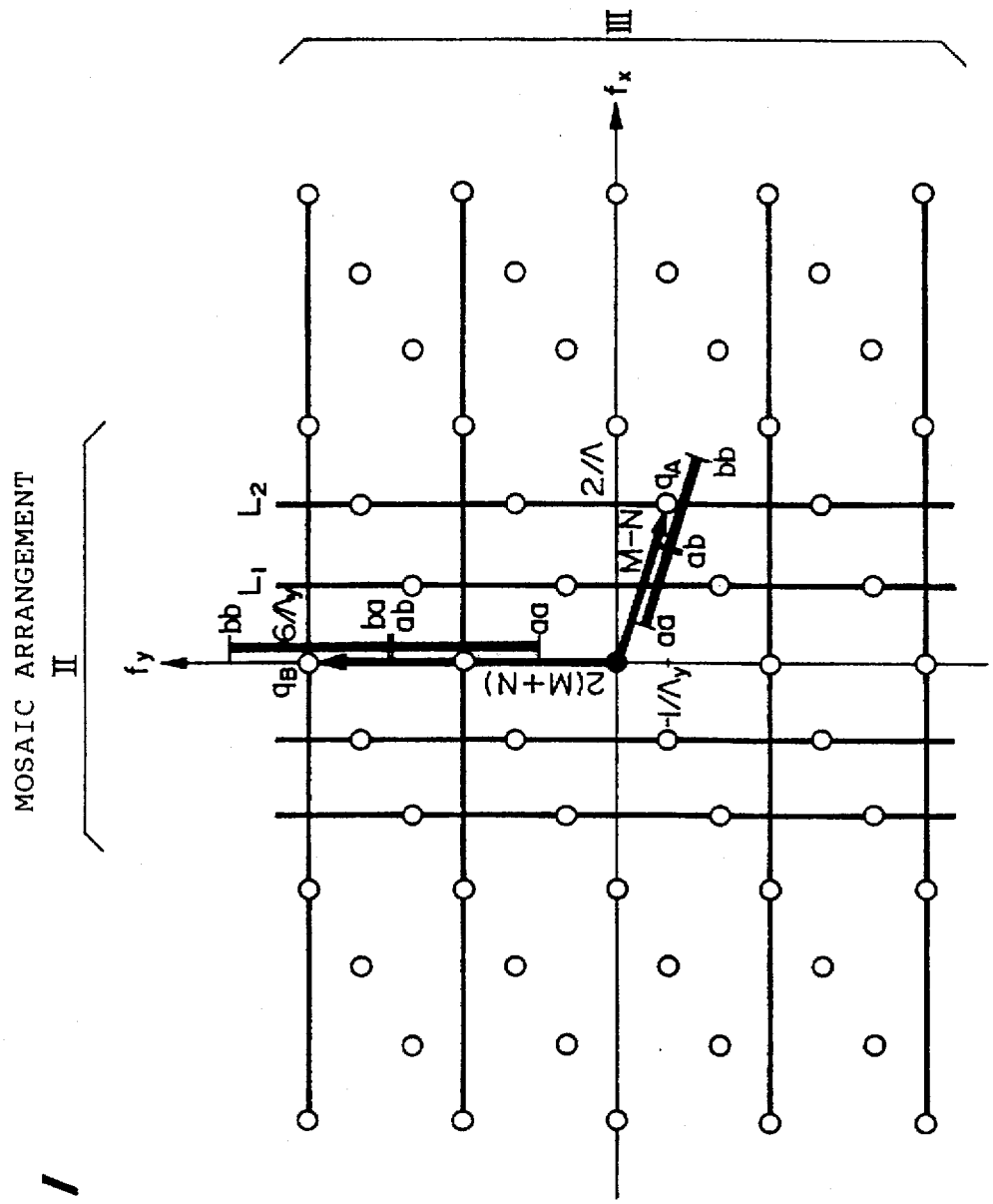
FIG. 41 illustrates another example of the setting of ranges of first and second cut-off spatial frequencies in a mosaic arrangement.

The point $q_A$ in FIG. 41 is represented by M–N.

$$M - N = \left(\frac{2}{\Lambda_x}, -\frac{1}{\Lambda_y}\right) \qquad \text{Eq. (48)}$$

When Equations (25) and (26) are satisfied, the first and second cut-off spatial frequencies (L1, L2) in one direction (the horizontal direction) fall within the ranges aa–ab, ba–bb (Group II).

The point $q_B$ that defines the cut-off spatial frequencies in the other direction (the vertical direction) is represented by 2(M+N).

$$2(M + N) = \left(0, \frac{6}{\Lambda_y}\right) \qquad \text{Eq. (49)}$$

The set ranges of the first and second cut-off spatial frequencies in the other direction are represented by Equations (31) and (32) (Group III).

Figure 42:
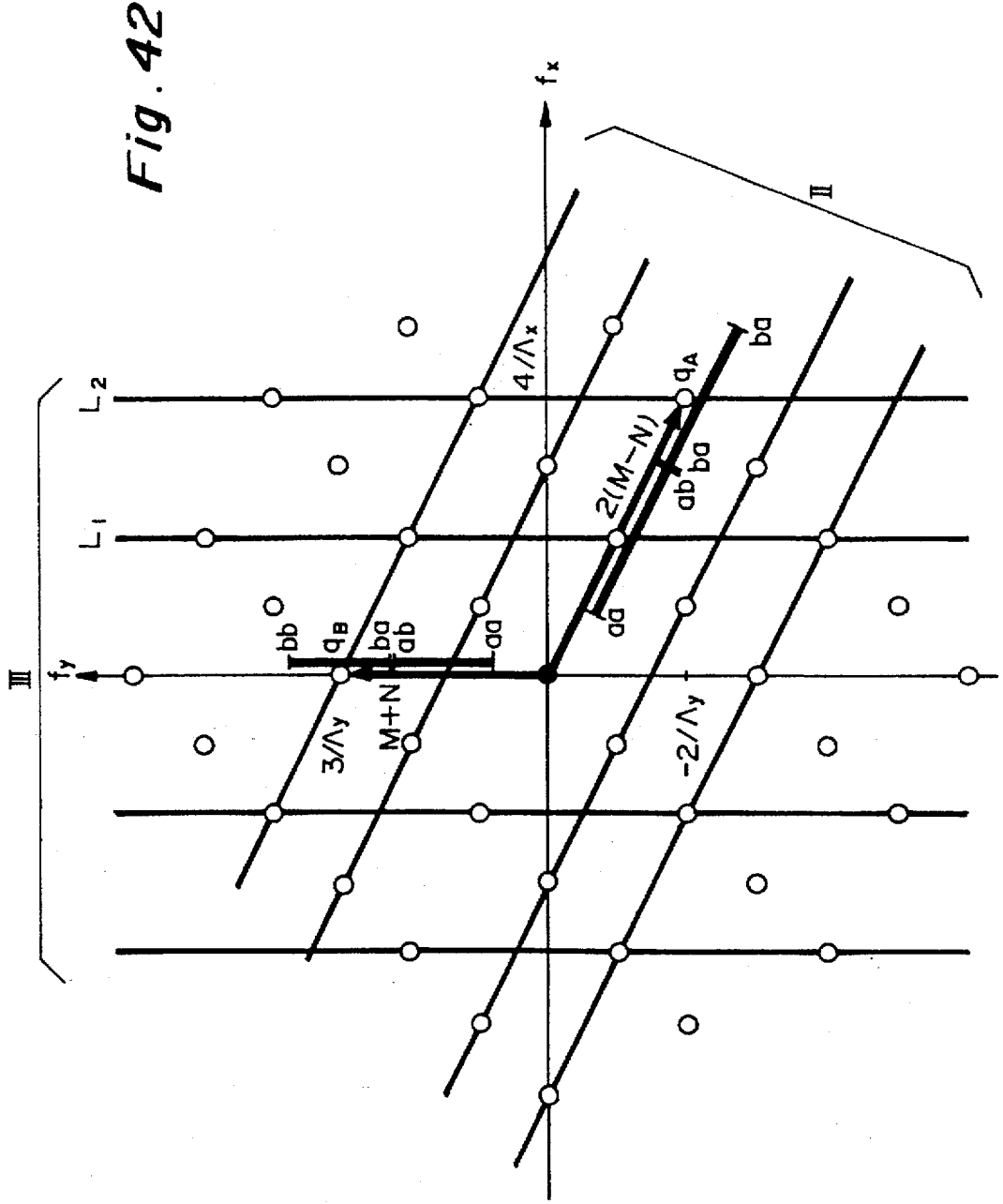
FIG. 42 illustrates still another example of the setting of ranges of first and second cut-off spatial frequencies in a mosaic arrangement.

The point $q_A$ in FIG. 42 is represented by 2(M–N).

$$2(M - N) = \left(\frac{4}{\Lambda_x}, -\frac{2}{\Lambda_y}\right) \qquad \text{Eq. (50)}$$

When Equations (29) and (30) are satisfied, the first and second cut-off spatial frequencies (L1, L2) in one direction (the horizontal direction) fall within the ranges aa–ab, ba–bb (Group III).

The point $q_B$ that defines the cut-off spatial frequencies in the other direction (the vertical direction) is represented by M+N.

$$M + N = \left(0, \frac{3}{\Lambda_y}\right) \qquad \text{Eq. (51)}$$

The ranges of the first and second cut-off spatial frequencies in the other direction are represented by Equations (27) and (28) (Group II).

Figure 43:
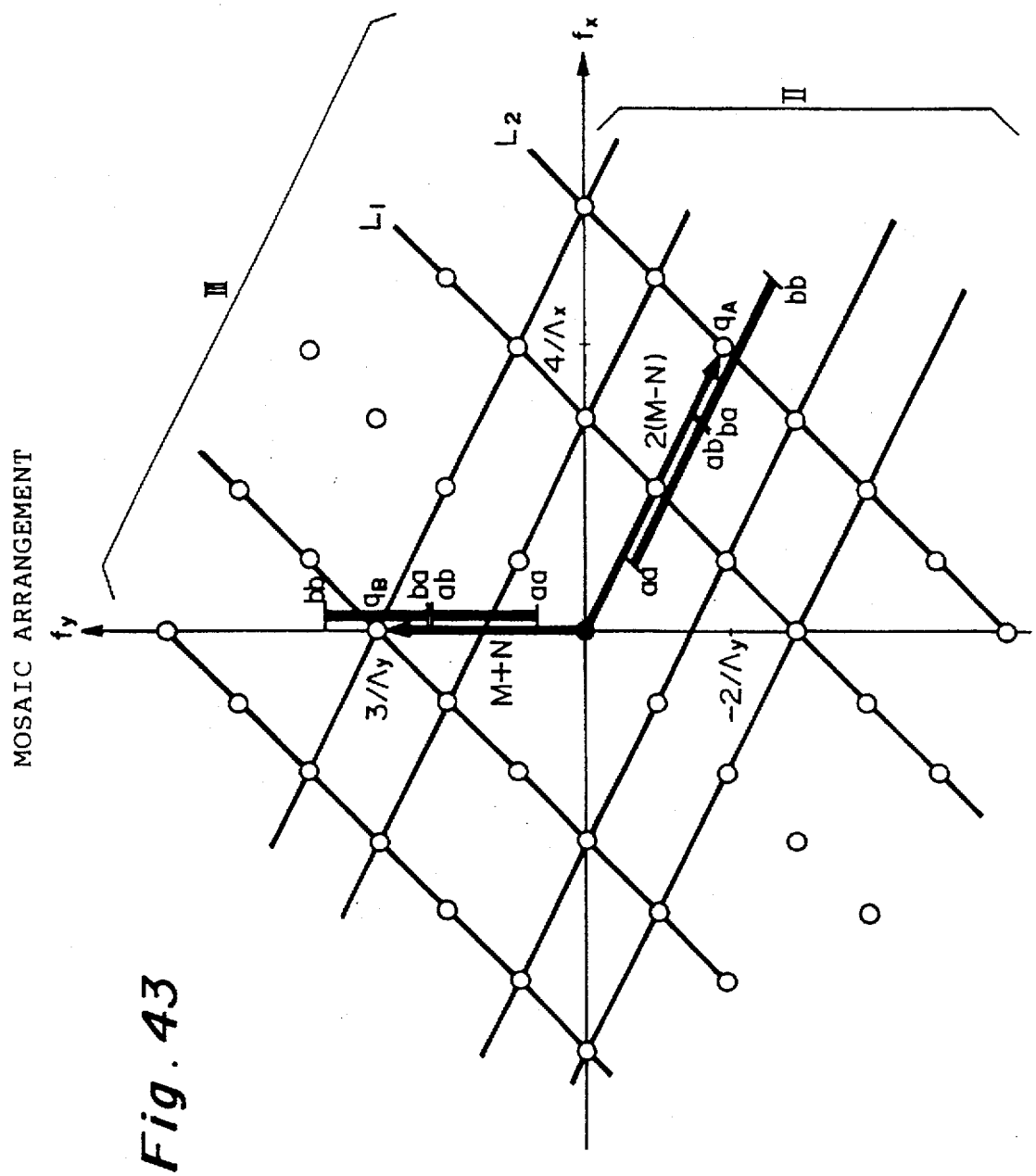
FIG. 43 illustrates a further example of the setting of ranges of first and second cut-off spatial frequencies in a mosaic arrangement.

FIG. 43 basically is the same as FIG. 42. The cut-off spatial frequencies L1, L2 in the horizontal direction in FIG. 42 are set diagonally in FIG. 43.

Figure 44:
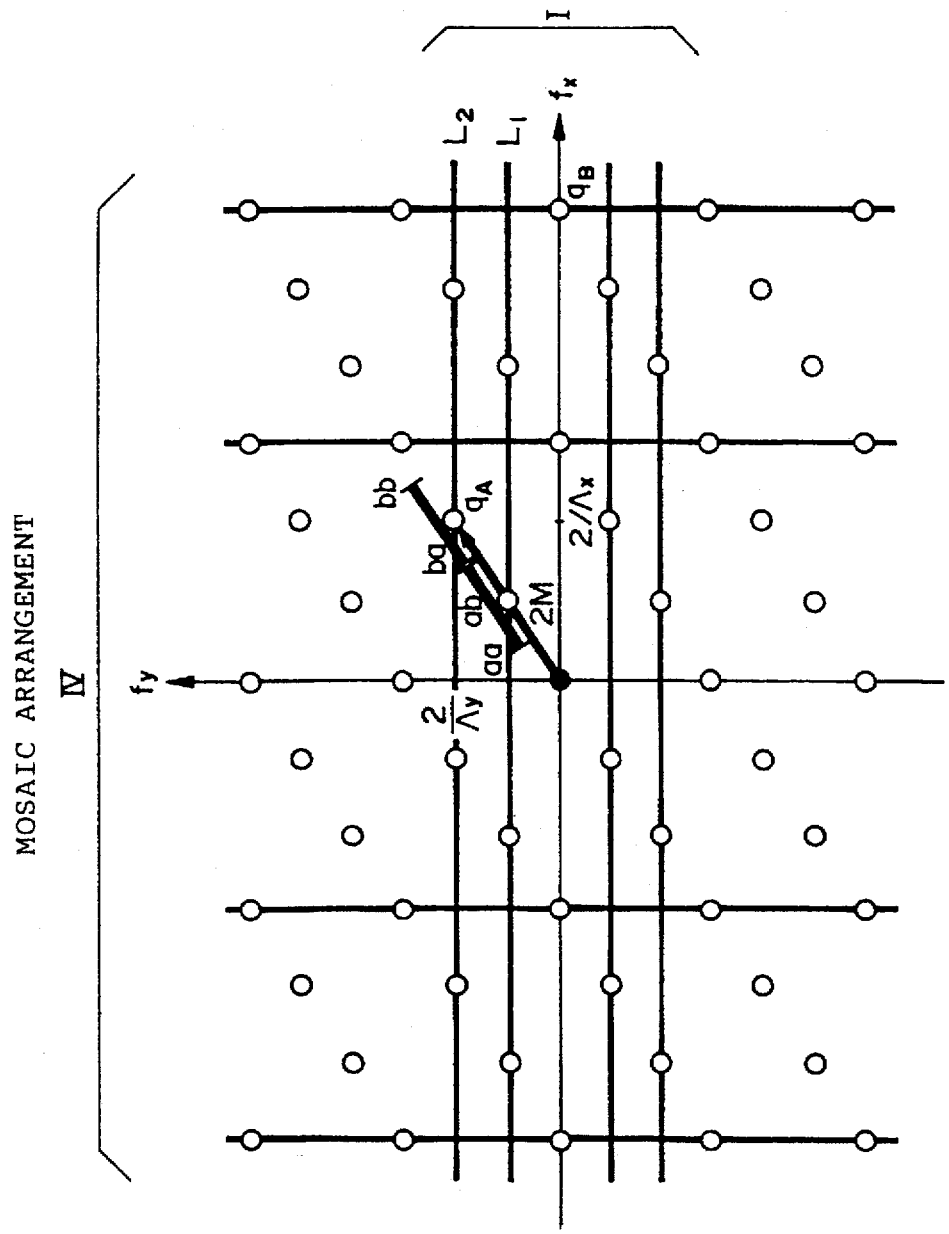
FIG. 44 illustrates a still further example of the setting of ranges of first and second cut-off spatial frequencies in a mosaic arrangement.

FIG. 44 illustrates another example of the cut-off spatial frequencies L1, L2 that belong to Group I. Here the cut-off spatial frequencies are set to be parallel to the $f_x$ axis. (These are cut-off spatial frequencies in the vertical direction.) (Compare with FIG. 40.)

The cut-off spatial frequencies in the horizontal direction are such that the point $q_B$ is represented by 2(2M−N). These frequencies are somewhat exceptional and are designated Group IV.

The mosaic arrangement shown in FIG. 31 and the mosaic arrangement shown in FIG. 32 are the reverse of each other in the left-right direction. Accordingly, the distributions of the sampling frequencies also are the reverse of each other in the left-right direction. (FIG. 30 corresponds to the arrangement of FIG. 32.) To achieve the arrangement of FIG. 31, it will suffice to substitute $-1/\Lambda_x$ for $1/\Lambda_x$ in Equations (21)~(32).

In summary, therefore, the first and second cut-off spatial frequencies belonging to Group I are set in ranges ¼~¾ and ¾~5/4, respectively, of a frequency which is ±M, ±N or a positive whole-number multiple thereof, where the frequency is taken as being 1.

The first and second cut-off spatial frequencies belonging to Group II are set in ranges ¼~¾ and ¾~5/4, respectively, of a frequency which is ±(M±N), where the frequency is taken as being 1.

The first and second cut-off spatial frequencies belonging to Group III are set in ranges ¼~¾ and ¾~5/4, respectively, of a frequency which is ±2×(M±N), where the frequency is taken as being 1.

(4) Derivation of Equations (1)~(32)

Figure 45:
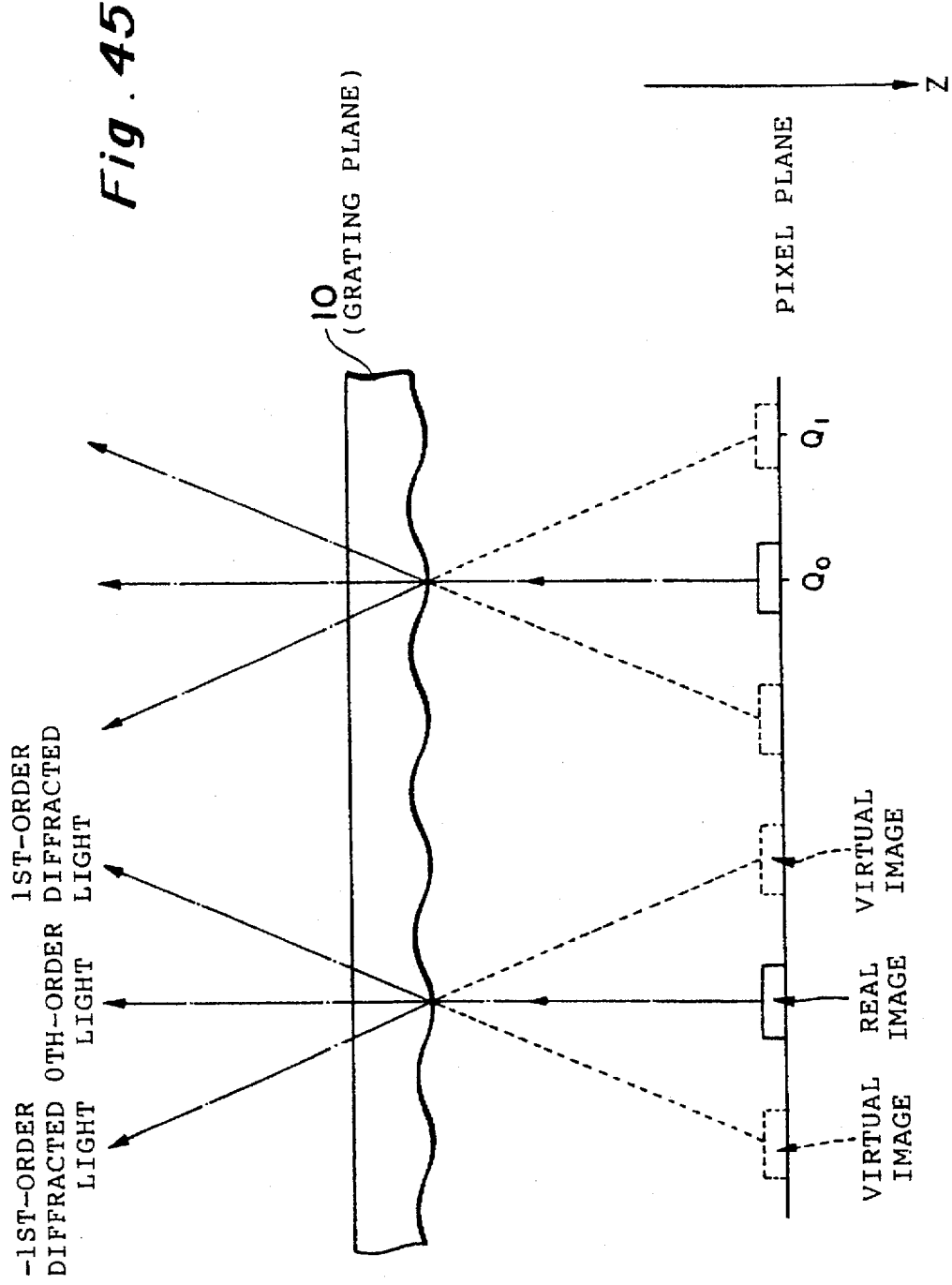
FIG. 45 illustrates the manner in which virtual images of pixels can be formed by a diffraction grating.

FIG. 45 illustrates the manner in which real and virtual images of a pixel are produced by light of order 0 and light of orders ±1, respectively, in a case where a two-dimensional (sinusoidal) diffraction grating is used as the optical low-pass filter.

The pixel plane is, say, the above-described liquid-crystal panel. In order to facilitate understanding, the pixel is illustrated in a form protruding from the pixel plane. The light of order 0 of the diffraction grating 10 produces a real image of the pixel as indicated by the solid lines. The diffracted light (split light or branching light) of orders ±1 produces virtual image of the pixel as indicated by the dot lines. This corresponds to FIG. 14.

Figure 46:
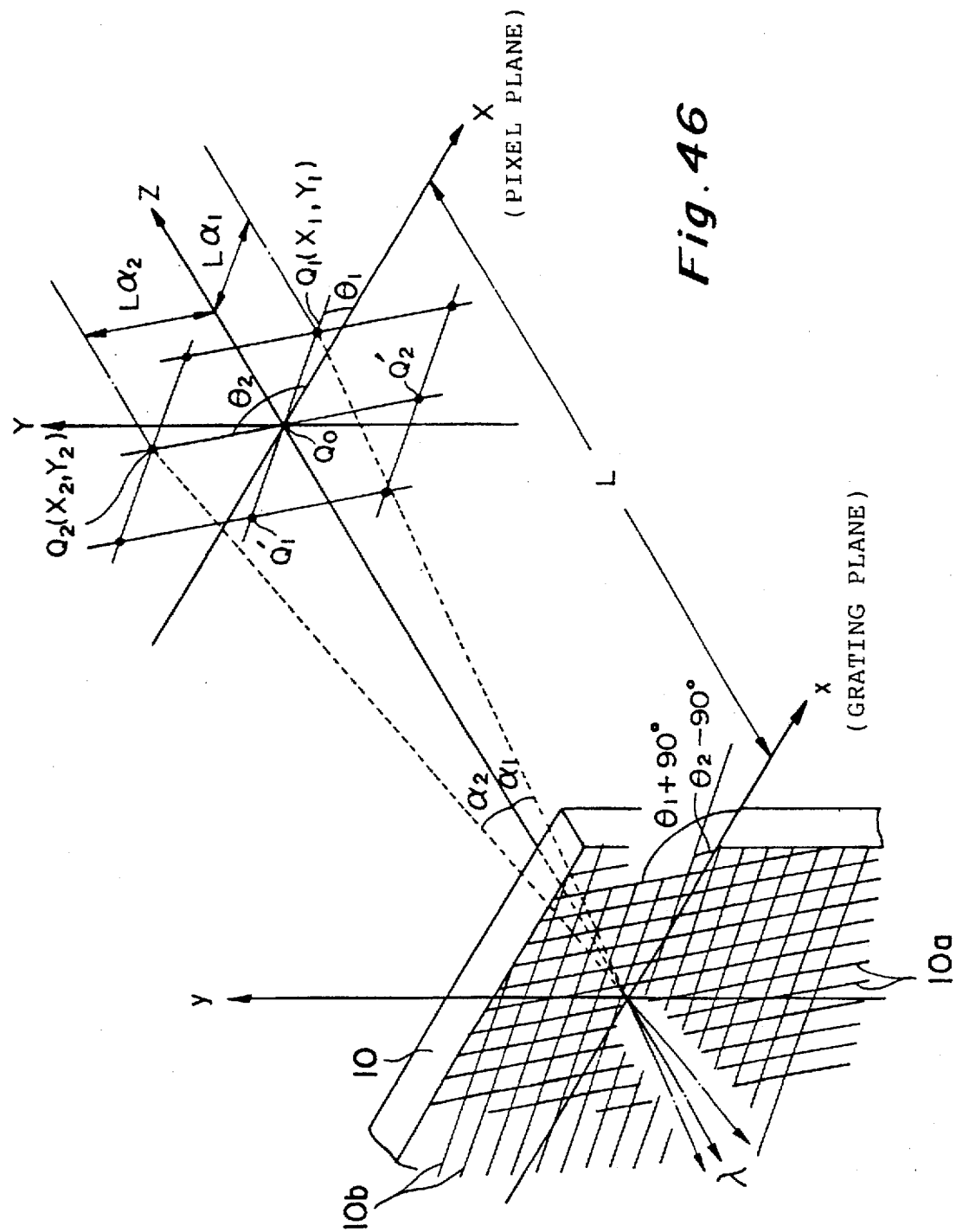
FIG. 46 illustrates the positional relationship between a two-dimensional diffraction grating and a pixel image.

FIG. 46 illustrates the above-mentioned pixel plane and the plane of the grating in three-dimensional form. An XY orthogonal coordinate system is established in the pixel plane, and an xy orthogonal coordinate system is established in the plane of the grating. The two-dimensional diffraction grating 10 comprises a grating 10a in the x direction and a grating 10b in the y direction. The gratings 10a, 10b are inclined with respect to the x axis at inclination angles $\theta_1$, $\theta_2$, respectively. The gratings may thus be inclined. This makes it possible to prevent the occurrence of Moiré fringes. The distance between the grating plane and the pixel plane is L.

Let $Q_0$ represent the center position of the real image in the pixel plane. (This is the position through which the optic axis of the transmitted light, i.e., 0th-order light passes.) The position $Q_0$ is the origin of the XY coordinate system. Let $Q_1$, $Q_1'$ represent the centers of one set of virtual images having point symmetry about the point $Q_0$. Let $(X_1, Y_1)$ represent the coordinates of the point $Q_1$. Let $Q_2$, $Q_2'$ represent the centers of one more set of virtual images formed at positions spaced from the above points by 90°. (Since it is unnecessary for $\theta_2=\theta_1+90°$ to hold, the angle of 90° does not impose any particular limitation.) Let $(X_2, Y_2)$ represent the coordinates of the point $Q_2$.

Let $\alpha_1$ represent the angle defined by the imaginary optic axis (indicated by the dot lines) that produces point $Q_1$ of the virtual image and the optic axis (the direction along the Z axis) passing through the point $Q_0$. The distance from point $Q_0$ to point $Q_1$ in the pixel plane is represented by $L\alpha_1$ (where the angle $\alpha_1$ is assumed to be small). Similarly, let $\alpha_2$ represent the angle defined by the optic axis passing through point $Q_2$ of the virtual image and the optic axis passing through the point $Q_0$. The distance between point $Q_0$ and point $Q_2$ in the pixel plane is represented by $L\alpha_2$ (where the angle $\alpha_2$ is assumed to be small).

Let $P_0$ represent the transmission (splitting or branching) efficiency (the ratio of 0th-order light to incident light) of the 0th-order light (transmitted light) (light which passes through the point $Q_0$) with respect to the incident light (light incident upon the two-dimensional diffraction grating 10).

Let $P_1$ and $P_2$ respectively represent the splitting (branching or transmission) efficiencies (the ratios of ±1st-order light to incident light) of the light (±1st-order light) passing through the respective points $Q_1$ and $Q_2$ with respect to the incident light.

The two-dimensional phase grating 10 can be considered as being two stacked one-dimensional phase gratings 10a and 10b having different directions. It may be considered that light of order 0 and diffracted light of orders ±1 is produced by one of the one-dimensional phase gratings, and that these three light rays are further split into light of order 0 and diffracted light of order ±1.

Figure 47:
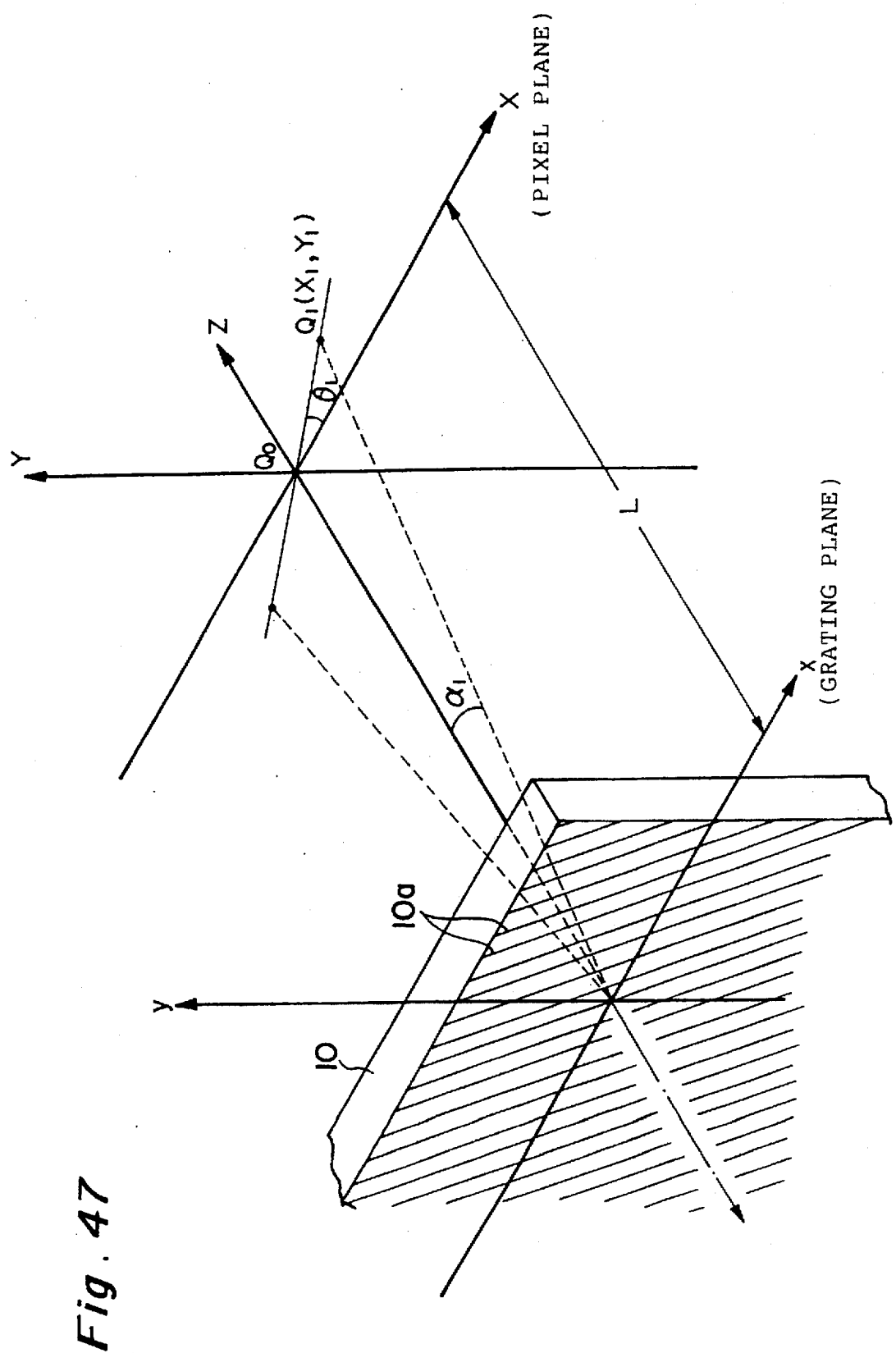
FIG. 47 illustrates the positional relationship between a one-dimensional diffraction grating and a pixel image.

For the sake of simplicity, only a phase grating in one direction will be considered, as shown in FIG. 47. For this reason, point $P_1$ $(X_1, Y_1)$ appears in Equations (1)~(32) and point $P_2$ $(X_2, Y_2)$ of the other imaginary image does not appear.

Consideration will be given to the following premise (approximation) condition:

In order to derive cut-off spatial frequency, it is necessary to obtain the diffraction efficiency of each diffracted light ray. In an ordinary optical low-pass filter, however, the diffraction efficiency of order 2 or greater is taken to be small and does not have that much influence upon cut-off spatial frequency.

Figure 48:
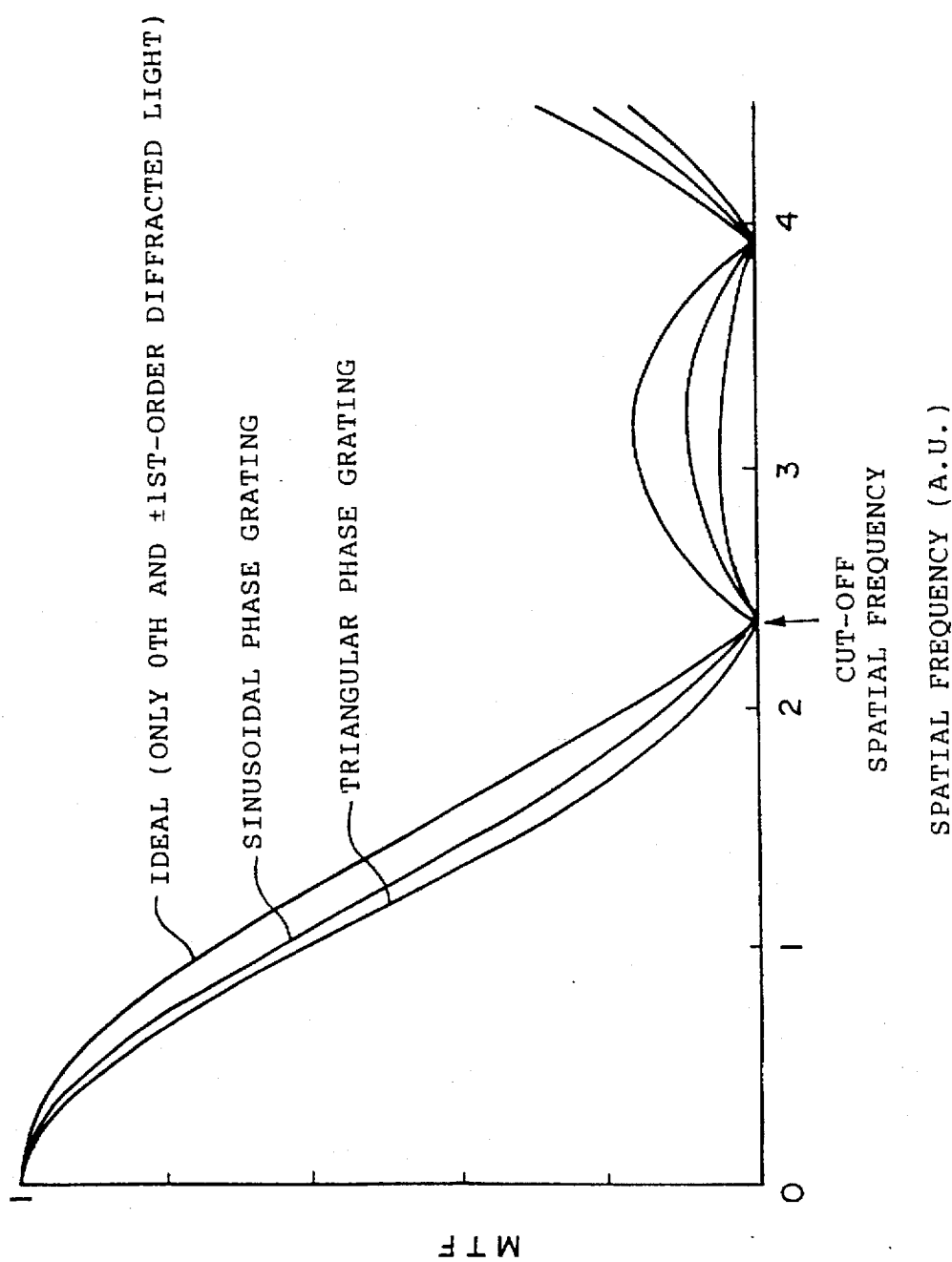
FIG. 48 is a graph illustrating the MTF characteristics of various optical low-pass filters.

FIG. 48 illustrates the MTFs of a triangularly shaped phase grating, a sinusoidally shaped phase grating and an ideal optical low-pass filter (in which there is no diffracted light of order 2 or greater) in a case where (±1st-order diffracted-light efficiency)/(0th-order light efficiency)=0.7. The sum totals of the diffraction efficiencies of diffracted light of order 2 or greater in these three types of optical low-pass filters are 0.11, 0.07 and 0.00, respectively.

The cut-off spatial frequencies for which MTF=0 holds are not that different in the three types of optical low-pass filters.

Accordingly, in the description that follows, only 0th-order light and ±1st-order light will be considered.

First, we will derive an equation in which the cut-off spatial frequencies (let these be denoted $f_{xc}$, $f_{yc}$) are represented by the above-mentioned splitting efficiencies $P_0$, $P_1$ and $Q_1$ $(X_1, Y_1)$.

MTF $(f_x, f_y)$ is expressed as the absolute value of the Fourier transform of a line-image distribution function (the spread function of a line) LSF $(x, y)$.

$$MTF(f_x,f_y)=|F[LSF(x,y)]| \qquad \text{Eq. (52)}$$

where F stands for a Fourier transform.

If the efficiency of diffracted light of order −1 and the efficiency of the diffracted light of order +1 are equal, then the following equation holds:

$$LSF(x,y)=P_0+P_1\delta(x-X_1)\delta(y-Y_1)+P_1\delta(x+X_1)\delta(y+Y_1) \qquad \text{Eq. (53)}$$

From this the following equation is obtained:

$$MTF(f_x,f_y)=P_0+2P_1 \cos\{2\pi(X_1f_x+Y_1f_y)\}$$ Eq. (54)

Since the cut-off spatial frequencies are the frequencies at which MTF=0 holds, these are ($f_{xc}$, $f_{yc}$), which satisfy the following equation, in which n is an integer:

$$X_1f_{xc}+Y_1f_{yc}=\frac{2\pi n \pm \cos^{-1}(-P_0/2P_1)}{2\pi}$$ Eq. (55)

The first and second cut-off spatial frequencies L1, L2 are the lowest frequency and the next lowest frequency. Accordingly, with regard to the first cut-off spatial frequency L1, the following is obtained:

$$X_1f_{xc}+Y_1f_{yc}=\frac{\cos^{-1}(-P_0/2P_1)}{2\pi}$$ Eq. (56)

With regard to the second cut-off spatial frequency, the following is obtained:

$$X_1f_{xc}+Y_1f_{yc}=1-\frac{\cos^{-1}(-P_0/2P_1)}{2\pi}$$ Eq. (57)

Let ($F_x$, $F_y$) represent the spatial frequency of point q.

The conditions under which the first cut-off spatial frequency L1 falls within the range aa–ab are expressed by the following equations:

$$\frac{f_{yc}}{f_{xc}}=\frac{F_y}{F_x}$$ Eq. (58)

$$\frac{1}{4}F_x<f_{xc}<\frac{3}{4}F_x$$ Eq. (59)

The following expression is obtained from Equations (56), (58) and (59):

$$\frac{1}{4}<\frac{\cos^{-1}(-P_0/2P_1)}{2\pi(F_xX_1+F_yY_1)}<\frac{3}{4}$$ Eq. (60)

The conditions under which the second cut-off spatial frequency L2 falls within the range ba–bb are expressed by the following equations:

$$\frac{f_{yc}}{f_{xc}}=\frac{F_y}{F_x}$$ Eq. (61)

$$\frac{3}{4}F_x<f_{xc}<\frac{5}{4}F_x$$ Eq. (62)

The following expression is obtained from Equations (57), (61) and (62):

$$\frac{3}{4}<\frac{2\pi-\cos^{-1}(-P_0/2P_1)}{2\pi(F_xX_1+F_yY_1)}<\frac{5}{4}$$ Eq. (63)

The sampling frequencies are obtained by a Fourier transform of the pulse train of an arrangement identical with the pixel arrangement.

In a stripe arrangement, the basic frequencies M, N are represented by Equation (33).

If Equation (34) is substituted into Equations (60) and (63) as the spatial frequency ($F_x$, $F_y$) of point q, Equations (1) and (2) are obtained, respectively.

Similarly, Equations (3), (4) are obtained by substituting Equation (35) into Equations (60), (63), respectively.

Equations (5), (6) are obtained by substituting Equation (36) into Equations (60), (63).

Equations (7), (8) are obtained by substituting Equation (37) into Equations (60), (63).

In a delta arrangement, the basic frequencies M, N are represented by Equation (38).

Equations (9), (10) are obtained by substituting Equation (39) into Equations (60), (63).

Equations (11), (12) are obtained by substituting Equation (40) into Equations (60), (63).

Equations (13), (14) are obtained by substituting Equation (41) into Equations (60), (63).

Equations (15), (16) are obtained by substituting Equation (42) into Equations (60), (63).

Equations (17), (18) are obtained by substituting Equation (43) into Equations (60), (63).

Equations (19), (20) are obtained by substituting Equation (44) into Equations (60), (63).

In a mosaic arrangement, the basic frequencies M, N are represented by Equation (45).

Equations (21), (22) are obtained by substituting Equation (46) into Equations (60), (63).

Equations (23), (24) are obtained by substituting Equation (47) into Equations (60), (63).

Equations (25), (26) are obtained by substituting Equation (48) into Equations (60), (63).

Equations (31), (32) are obtained by substituting Equation (49) into Equations (60), (63).

Equations (29), (30) are obtained by substituting Equation (50) into Equations (60), (63).

Equations (27), (28) are obtained by substituting Equation (51) into Equations (60), (63).

The two-dimensional prism plate can be handled in exactly the same manner as the above-described two-dimensional phase grating.

Figure 49:
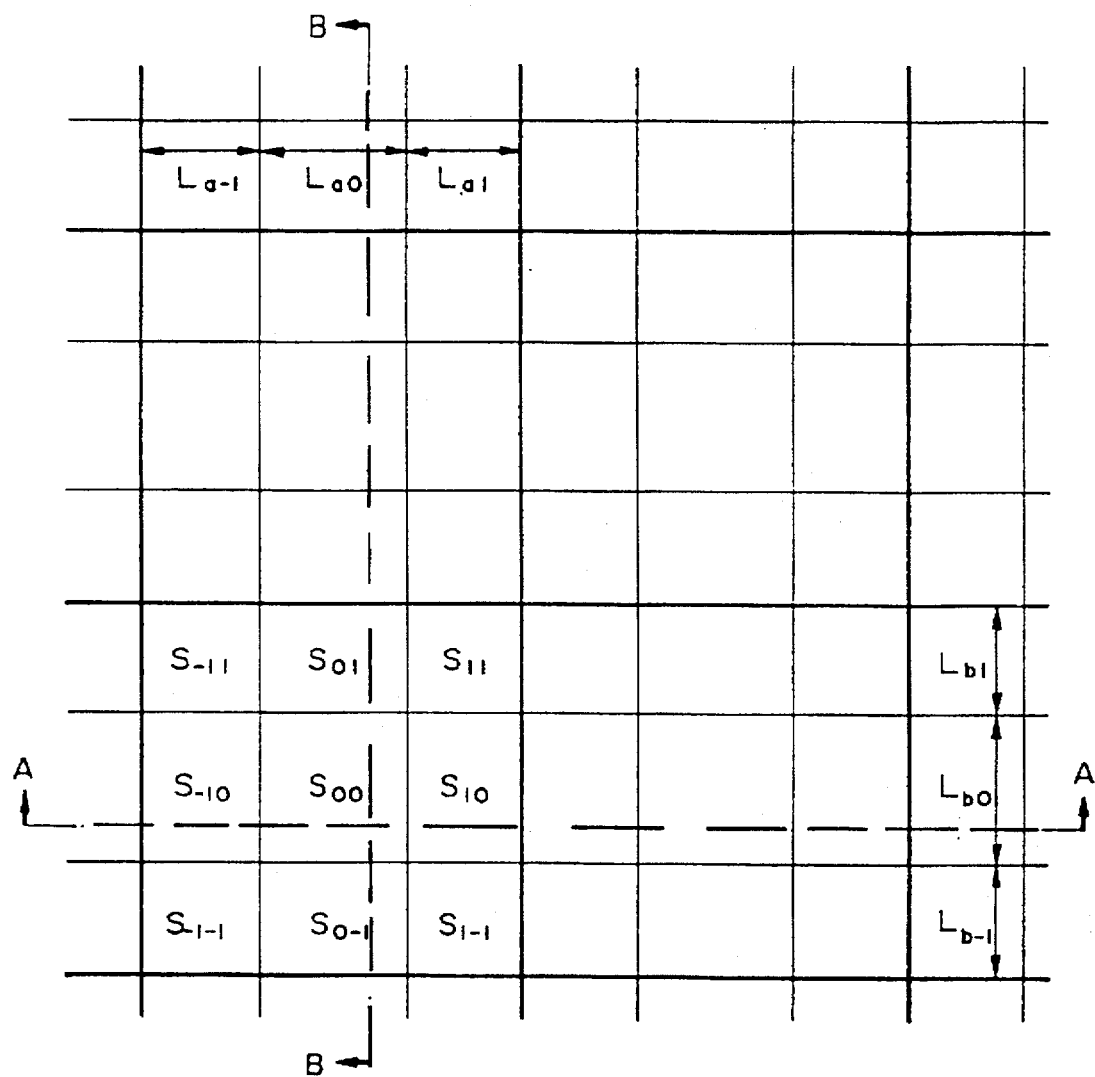
FIG. 49 is a plan view of a prism plate.
Figure 50:
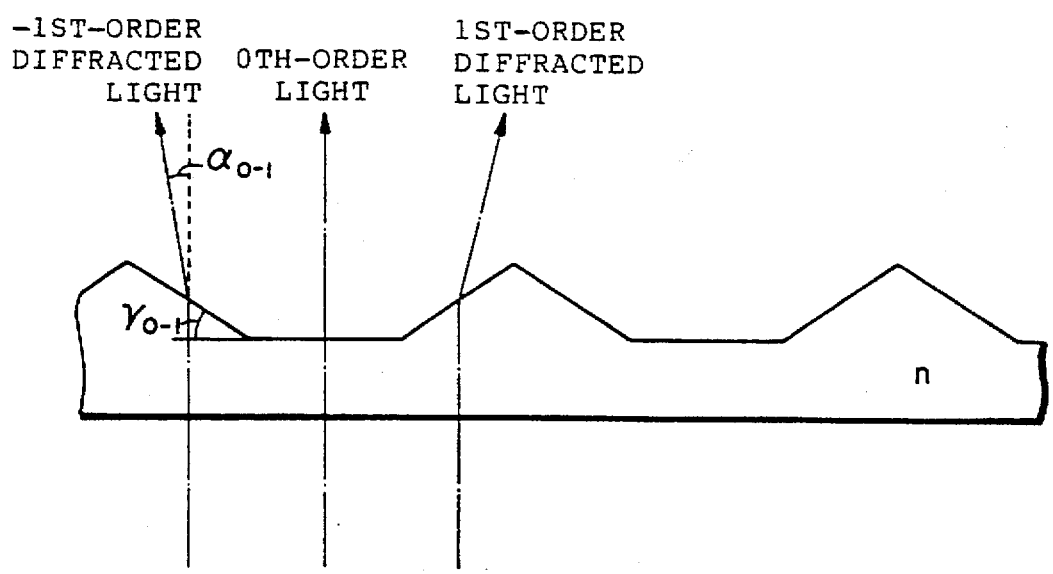
FIG. 50 is a sectional view taken along line A—A or B—B of FIG. 49.

FIG. 49 is a plan view of a two-dimensional prism plate, and FIG. 50 is a sectional view taken along line A—A or B—B (these sectional views have the same shape) of FIG. 49.

The sections bounded by the bold lines in FIG. 49 have a flat zone $S_{00}$ and inclined zones (all of the other areas). The area of these zones is represented by $S_{mn}$ (m, n=0, ±1). The diffraction efficiency $P_{mn}$ of each zone is proportional to the area $S_{mn}$ and therefore is given by the following equation:

$$P_{mn}=S_{mn}/\sum_{i,j=0,\pm 1}S_{ij}$$ Eq. (64)

(5) Specific Example of Design

It will be assumed that a liquid-crystal panel having the delta arrangement shown in FIG. 28 is used. This example will deal with pixels of the color green (G).

The pixel periods is as follows:

$$A_x=60 \ \mu m$$

$$A_y=40 \ \mu m$$ Eq. (65)

Let the central wavelength of the light which passes through the pixels for the color green (G) be $\lambda=555$ nm.

When $P_0=P_1$ holds, the first cut-off spatial frequency L1 and the second cut-off spatial frequency L2 take on an approximately 1:2 size relationship (an exact 1:2 size relationship when higher-order diffracted light of order 2 or greater is entirely zero).

Accordingly, let $P_0=P_1$ hold.

In a case where the first and second cut-off spatial frequencies are set as shown in FIG. 36, it will suffice if $P_0$, $P_1$, ($X_1$, $Y_1$) satisfy Equations (9) and (10). When Equation (65) and $P_0=P_1$ are substituted into Equations (9) and (10), we have the following:

$$\frac{\cos^{-1}(-P_0/2P_1)}{2\pi(2X_1/\Lambda_x + 2Y_1/\Lambda_y)} = \frac{X_1}{90} + \frac{Y_1}{60} \qquad \text{Eq. (66)}$$

$$\frac{2\pi - \cos^{-1}(-P_0/2P_1)}{2\pi(2X_1/\Lambda_x + 2Y_1/\Lambda_y)} = \frac{X_1}{45} + \frac{Y_1}{30} \qquad \text{Eq. (67)}$$

It will suffice to decide $X_1$, $Y_1$ in such a manner that the values of Equations (66) and (67) will fall within the ranges ¼~¾ and ¾~5/4, respectively.

For example, when the following setting is made:

$$(X_1, Y_1) = (22.5, 15) \qquad \text{Eq. (68)}$$

the values of Equations (66) and (67) become 0.5 and 1.0, respectively, and both Equations (9) and (10) are satisfied.

Figure 51:
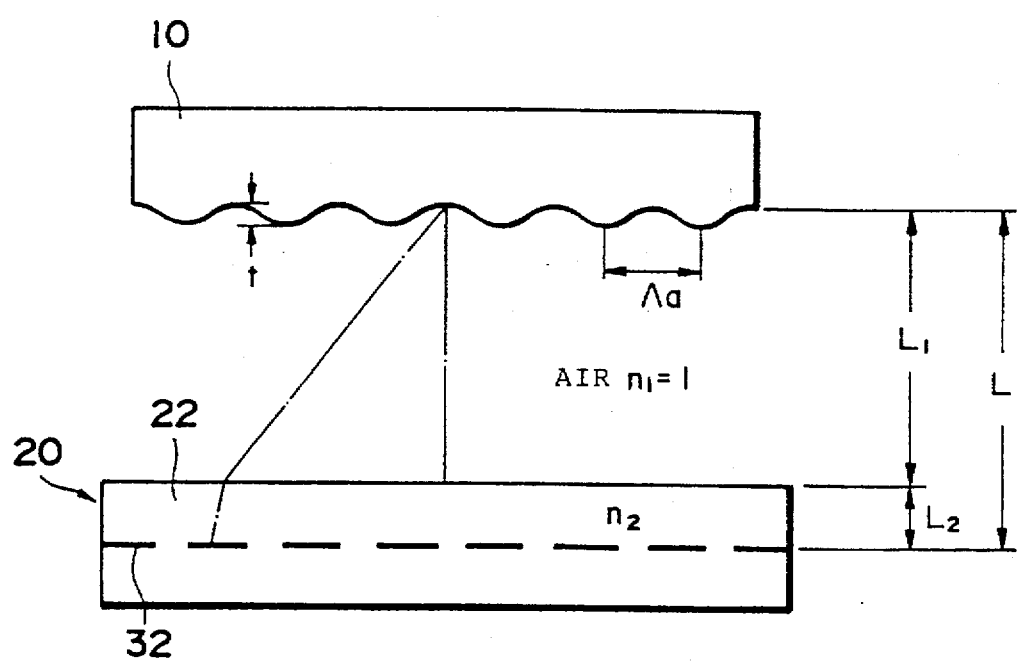
FIG. 51 illustrates various parameters of an optical low-pass filter and liquid-crystal panel.

FIG. 51 illustrates part of a liquid-crystal display device in enlarged form. The position of the black matrix 32 in the liquid-crystal panel 20 is the pixel plane.

Let the optical distance between the pixel plane and the grating plane be L, let the thickness of one glass substrate (that facing the diffraction grating 10) of the liquid-crystal panel 20 be $L_2$=900 μm, and let the optical distance between the surface of the glass substrate 22 and the two-dimensional diffraction grating (optical low-pass filter) 10 be $L_1$=1.4 mm. Further, let the refractive index n2 of the glass substrate 22 be 1.5. Assume that there is air between the glass substrate 22 and the diffraction grating 10. The refractive index of air is $n_1$=1. The following equation holds:

$$\begin{aligned} L &= L_1/n_1 + L_2/n_2 \\ &= 1.4/1 + 0.9/1.5 \\ &= 2 \text{ mm} \end{aligned} \qquad \text{Eq. (69)}$$

The distance A between the real image and the virtual image is given by the following equation:

$$\begin{aligned} A &= (X_1^2 + Y_1^2)^{1/2} \\ &= (22.5^2 + 15^2)^{1/2} \\ &= 27.04 \text{ μm} \end{aligned} \qquad \text{Eq. (70)}$$

from which the diffractive angle $\alpha_1$ is obtained as follows:

$$\begin{aligned} \alpha_1 &= A/L \\ &= 27.04/(2 \times 10^3) \\ &= 13.52 \text{ mrad} \end{aligned} \qquad \text{Eq. (71)}$$

Accordingly, the grating period $\Lambda_a$ is $$\begin{aligned} \Lambda_a &\simeq \Lambda/\alpha_1 \\ &= 41.1 \text{ μm} \end{aligned} \qquad \text{Eq. (72)}$$

The inclination angle $\theta_1$ of the diffraction grating in one direction is given by the following equation:

$$\begin{aligned} \theta &= \tan^{-1}\left(\frac{Y_1}{X_1}\right) \\ &= \tan^{-1}(15/22.5) \\ &= 5.88 \text{ rad}(33.7°) \end{aligned} \qquad \text{Eq. (73)}$$

The direction of the diffraction grating is inclined by 33.7° in the counter-clockwise direction from the pixel arrangement direction (X direction).

Consider a sinusoidal diffraction grating. In the case of a one-dimensional grating, the diffraction efficiency of order n is expressed by the following equation:

$$|J_n(\phi/2)|^2 \qquad \text{Eq. (74)}$$

where $J_n$ is a Bessel function and $\phi$ is the amount of phase shift.

Accordingly, the following equation is obtained:

$$\frac{P_1}{P_0} = \left|\frac{J_1(\phi/2)}{J_0(\phi/2)}\right|^2 = 1 \qquad \text{Eq. (75)}$$

From this we obtain $\phi/2$=1.43 rad.

The following equation holds in a sinusoidal diffraction grading:

$$t \times (n_g - 1) \times (2\pi/\lambda) = \phi \qquad \text{Eq. (76)}$$

where t represents the grating thickness and $n_g$ the refractive index of the phase grating. Assume that $n_g$=1.5 holds.

Accordingly, we have t=0.505 μm.

It will be understood that a sinusoidal phase grating having a grating period $\Lambda_a$ of 41.1 μm and a grating thickness t of 0.505 μm is placed with the direction of the grating at an incline of 33.7°, in the counter-clockwise direction, with respect to the row (X) direction.

If it is assumed that there is no angle-related error in the disposition of the grating (i.e., that $X_1/Y_1$=22.5/15 is fixed), then we have the following from Equation from Equations (66), (67), (9) and (10):

$$\begin{aligned} &16.875 < X_1 < 28.125 \\ &11.25 << Y_1 18.75 \end{aligned} \qquad \text{Eq. (77)}$$

Accordingly, if the grating is placed in such a manner that 0.9<L1<1.9 (mm) holds, on the basis of Equations (69)~(72), then Equations (9) and (10) will be satisfied.

(6) Features of Specific Example and Application Thereof

In a case where a phase grating is used as an optical low-pass filter, a sinusoidal diffraction grating having a sinusoidal cross section (FIG. 6) is preferred. The reason for this is that the MTF value in the low-frequency region is raised, as illustrated in FIG. 48. In other words, blurring is reduced.

Since a diffraction grating or prism plate can be fabricated by plastic molding, an advantage is that cost can be reduced.

Figure 52:
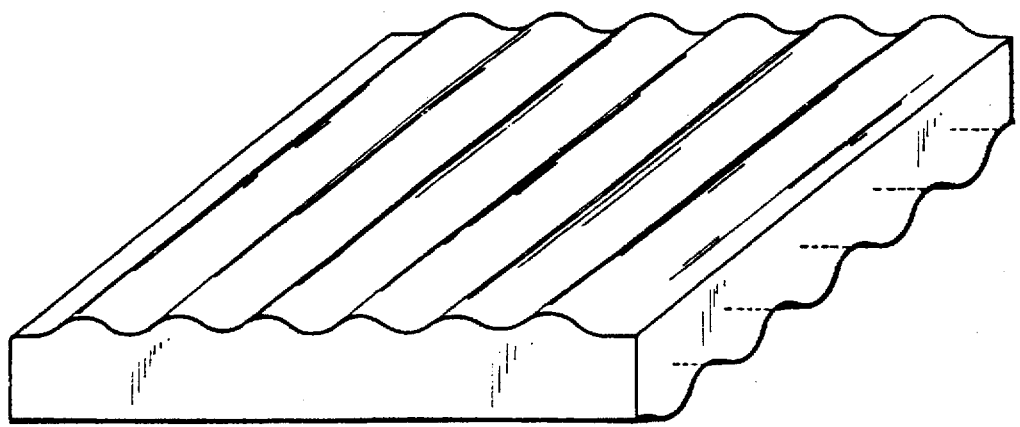
FIG. 52 is a perspective view showing an example of a sinusoidal phase grating.
Figure 53:
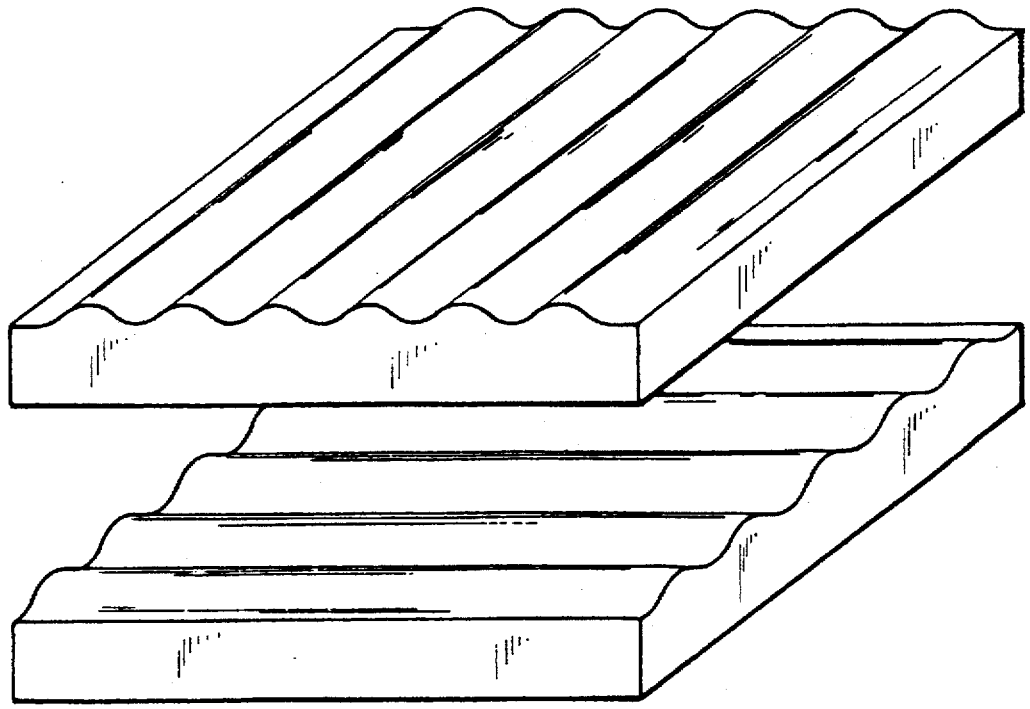
FIG. 53 is a perspective view showing another example of a sinusoidal phase grating.
Figure 54:
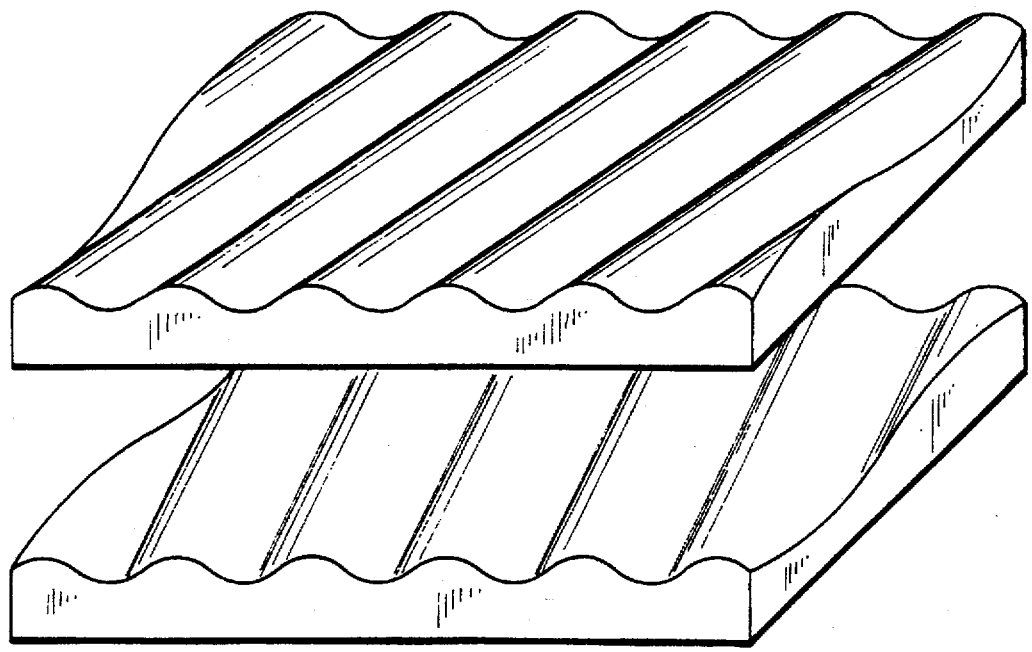
FIG. 54 is a perspective view showing yet another example of a sinusoidal phase grating.

It will be better to form a two-dimensional diffraction grating on one surface of a substrate, as 10 shown in FIGS. 6 and 7. However, in a case where it is difficult to form a two-dimensional diffraction grating on one surface, it will suffice to fabricate a one-dimensional diffraction grating on both surfaces of the substrate in directions that perpendicularly intersect each other, as illustrated in FIG. 52, or intersect each other at an angle of inclination other than a right angle. If difficulty is encountered in forming a diffraction grating on both surfaces of a substrate, then two substrates on each of which a one-dimensional diffraction grating is formed on one surface can be superimposed in such a manner that the diffraction gratings perpendicularly intersect each other, as shown in FIG. 53, or in such a manner that the diffraction gratings intersect each other at an angle of inclination other than a right angle, as shown in FIG. 54.

Figure 55:
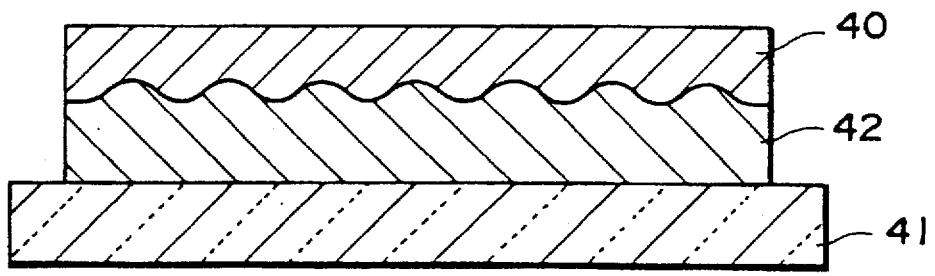
FIG. 55 illustrates a phase grating formed on a transparent substrate.

One method of fabricating a phase grating is a molding method using a stamper. This involves preparing a stamper 40 having a female mold in the shape of the desired grating, as depicted in FIG. 55. A resin 42 curable by ultraviolet radiation is dropped upon a transparent substrate 41 and the stamper 40 is placed upon the resin 42. While the stamper 40 is urged toward the substrate 41, the resin 42 is cured by being irradiated with ultraviolet radiation from the side of the substrate 41. The stamper 40 is then removed.

According to this method, the glass plate or polarizing plate of an image display panel such as a liquid-crystal display panel, or some other optical element is adopted as the substrate and a two-dimensional diffraction grating can be fabricated directly on the substrate. This is advantageous in terms of size reduction, integration and lower cost.

When an optical low-pass filter is mounted on a liquid-crystal panel (image display panel), or when an image display device including these is used, the MTF characteristic changes if the aforementioned optical distance L between the optical low-pass filter and the liquid-crystal panel changes.

Figure 56:
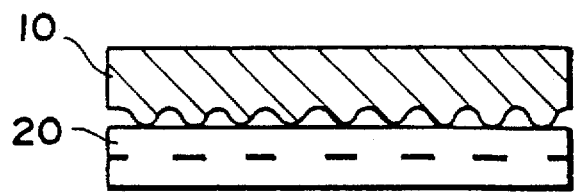
FIG. 56 illustrates a structure in which an optical low-pass filter is attached to a liquid-crystal panel.
Figure 57:
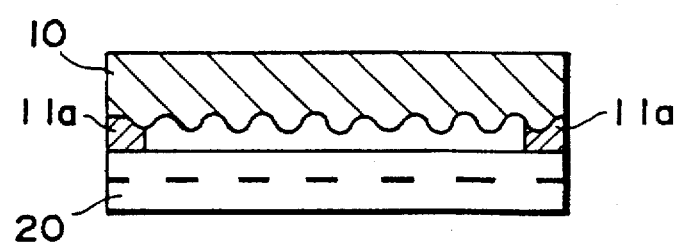
FIG. 57 illustrates another example of a structure in which an optical low-pass filter is attached to a liquid-crystal panel.
Figure 58:
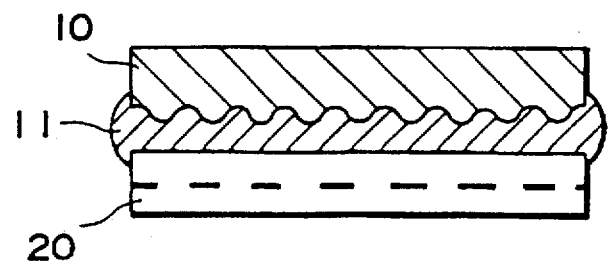
FIG. 58 illustrates yet another example of a structure in which an optical low-pass filter is attached to a liquid-crystal panel.

FIGS. 56 through 58 illustrate a method and structure for holding the optical distance L fixed and mounting an optical low-pass filter in simple fashion.

In FIG. 56, the optical low-pass filter 10 is brought into intimate contact with the liquid-crystal panel 20 and the two are secured by fixing means (not shown).

FIG. 57 illustrates an arrangement in which the optical low-pass filter 10 and liquid-crystal panel 20 are secured via a spacer 11a.

In FIG. 58, the optical low-pass filter 10 is secured to the liquid-crystal panel 20 by the bonding agent 11. The refractive index of the bonding agent 11 differs from that of the optical low-pass filter 10. This expedient reduces the number of parts required for fixing the filter and results in lower cost. Since the difference in refractive index between the optical low-pass filter 10 and bonding agent 11 is small, more leeway can be provided for the precision of grating thickness t of the optical low-pass filter and the accuracy of the optical low-pass filter is improved.

Figure 59:
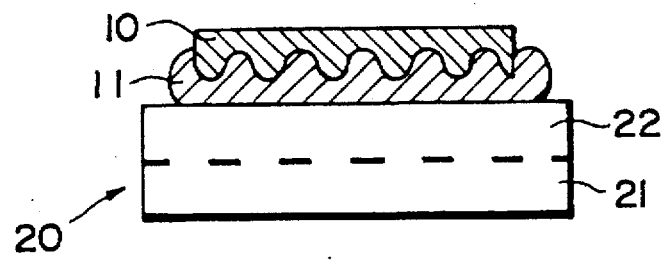
FIG. 59 illustrates still another example of a structure in which an optical low-pass filter is attached to a liquid-crystal panel.

FIG. 59 illustrates an example of another arrangement. Here the optical low-pass filter 10 is such that its external shape is smaller than that of the liquid-crystal panel 20. Accordingly, even if the bonding resin 11 for bonding the optical low-pass filter 10 to the liquid-crystal 20 protrudes somewhat from the outer side of the optical low-pass filter 10, the bonding resin 11 will not protrude beyond the outer side of the liquid-crystal panel 20. This facilitates the operation for bonding the optical low-pass filter. In addition, when the display device is assembled, assembly is made easier since the liquid-crystal panel 20 need only be supported and not the optical low-pass filter 10.

It is preferred that the thickness of the optical low-pass filter be made less than that of the glass substrate 22 (or polarizing plate 24) of the liquid-crystal panel 20. As a result, warping of the liquid-crystal panel as ascribable to a difference in rate of thermal expansion between the optical low-pass filter 10 and glass substrate 22 can be mitigated. In addition, the optical low-pass filter can be prevented from peeling off. This improves overall resistance to the environment.

Figure 60:
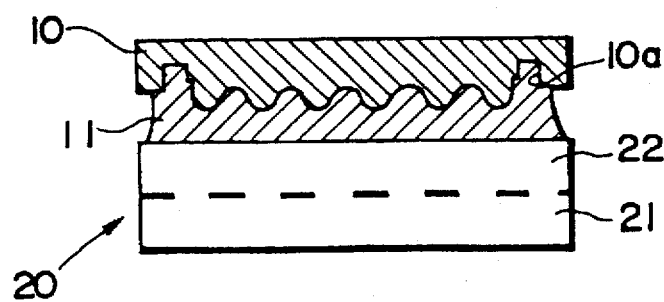
FIG. 60 illustrates a further example of a structure in which an optical low-pass filter is attached to a liquid-crystal panel.

FIG. 60 illustrates an example in which a groove 10a is formed in the outer circumferential portion of the optical low-pass filter 10 on the bonding surface side thereof. Preferably, the groove 10a is continuous along the entire perimeter of the optical low-pass filter 10. By forming the groove 10a, the bonding agent 11 can be prevented from protruding to the exterior even if the size of the optical low-pass filter 10 is the same as that of the liquid-crystal panel 20.

Figure 61:
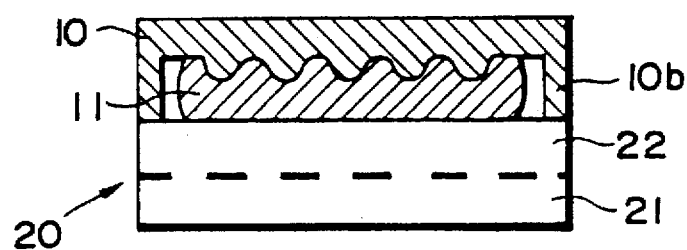
FIG. 61 illustrates a still further example of a structure in which an optical low-pass filter is attached to a liquid-crystal panel.

FIG. 61 illustrates an example in which a projecting wall 10b is formed on the outer circumference of the optical low-pass filter 10 on the bonding surface side thereof. The projecting wall 10b may be provided along the entire perimeter or portions thereof may be cut away. By making the height of the projecting wall 10b the same at all locations, the gap between the optical low-pass filter 10 and the liquid-crystal panel 20 (glass substrate 22) is made uniform irrespective of location and the two can be maintained in a parallel relationship. In addition, the bonding resin 11 can be prevented from protruding to the outside.

Figure 62:
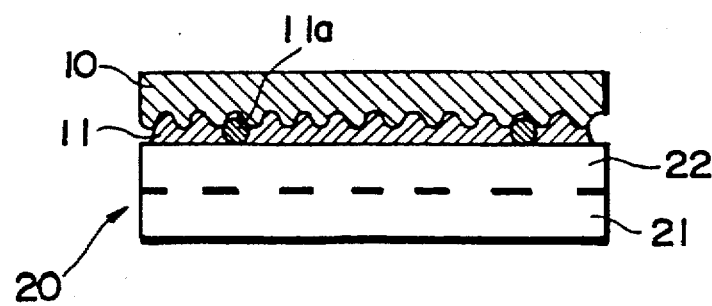
FIG. 62 illustrates a further example of a structure in which an optical low-pass filter is attached to a liquid-crystal panel.

FIG. 62 illustrates an arrangement in which the spacer 11a is provided between the optical low-pass filter 10 and the glass plate 22 of the liquid-crystal panel 20. This is similar to the arrangement of FIG. 57. The optical low-pass filter 10 and glass substrate 22 can be maintained in parallel with the arrangement of FIG. 60 as well. It is necessary that the refractive index of the bonding layer 11 and that of the spacer 11a be made equal or nearly equal.

Figure 63A:
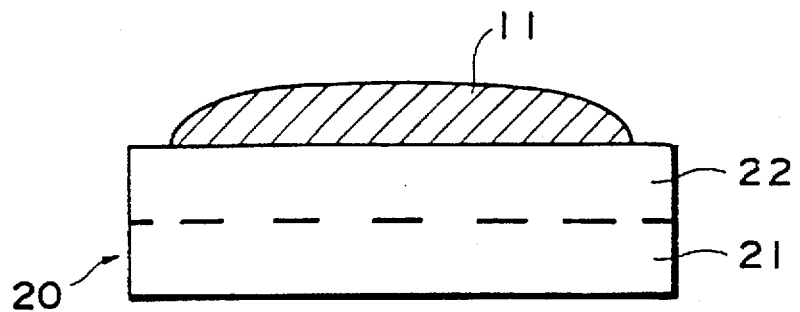
FIGS. 63a through 63c illustrate a process for mounting an optical low-pass filter.
Figure 63B:
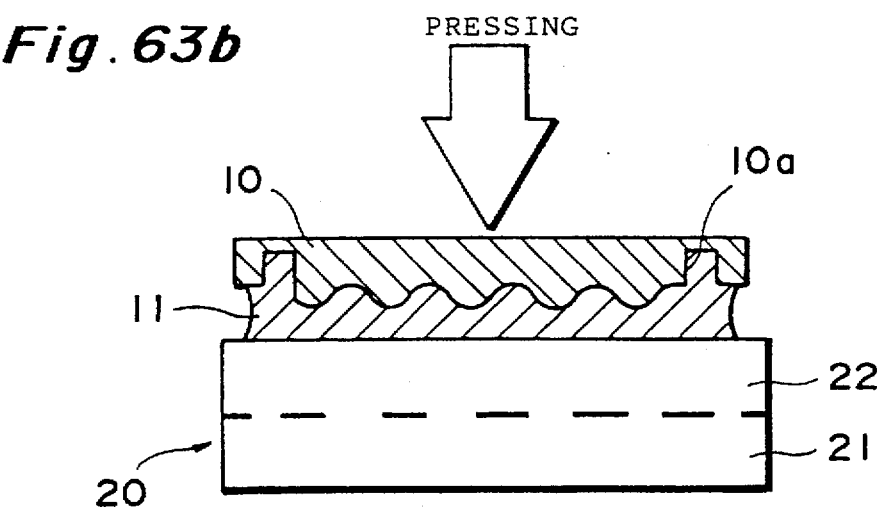
Figure 63C:
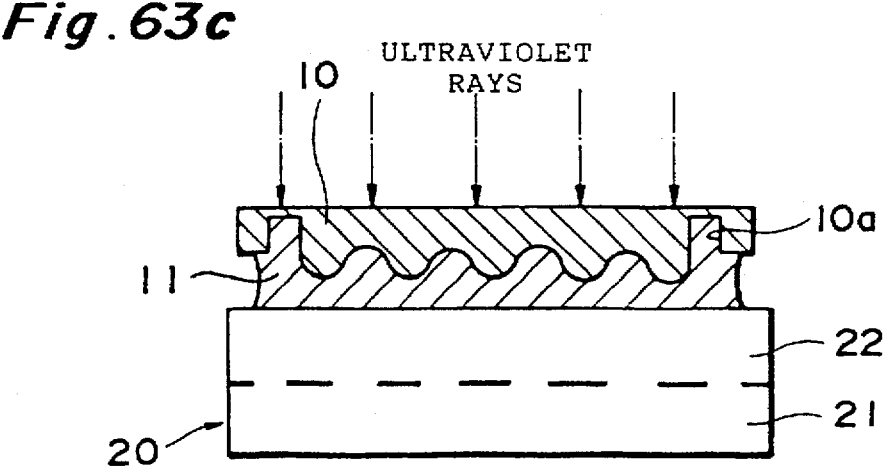

FIGS. 63a through 63c illustrate an example of a process for mounting an optical low-pass filter in a liquid-crystal panel.

The resin 11 curable by ultraviolet radiation is dropped upon the glass substrate 22 of the liquid-crystal panel 20 (FIG. 63a).

The optical low-pass filter 10 having the groove 10a in its outer circumferential portion is placed upon the resin 11 with its patterned surface (having projections and depressions) being faced toward the resin 11. The optical low-pass filter 10 is urged toward the glass substrate 22 while it is kept parallel to the substrate (FIG. 63b).

The resin 11 is cured by being irradiated with ultraviolet radiation through the optical low-pass filter 10 (FIG. 63c).

When the optical low-pass filter in which the groove 10a is formed is used, the mounting process is facilitated because the resin 11 will not protrude to the outside. It goes without saying that an optical low-pass filter not having the groove can also be used. Even if the bonding resin does not happen to protrude beyond the liquid-crystal panel, the liquid-crystal panel can be fixed to the frame of the display device using the side surface (end face) of the liquid-crystal panel in the manner mentioned above. This facilitates assembly.

It is permissible to use an adhesive (a pressure sensitive adhesive) to join the optical low-pass filter and the glass substrate or polarizing plate of the liquid-crystal panel.

If the optical distance L between the optical low-pass filter and the liquid-crystal panel is enlarged, the ratio of a distance error ΔL to the distance L (ΔL/L) is reduced and so is the change or error in the MTF characteristic. This is an example which is the converse of the above-described example.

Figure 64:
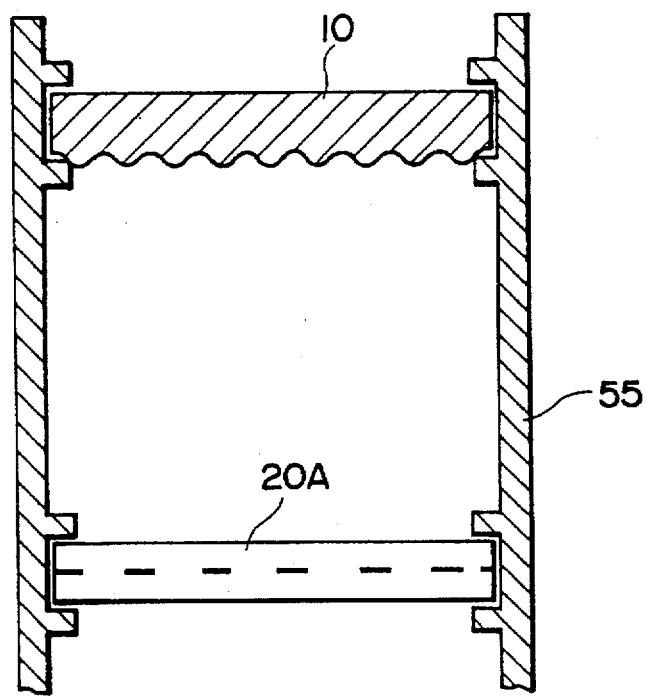
FIG. 64 illustrates the structure in a viewfinder.
Figure 65:
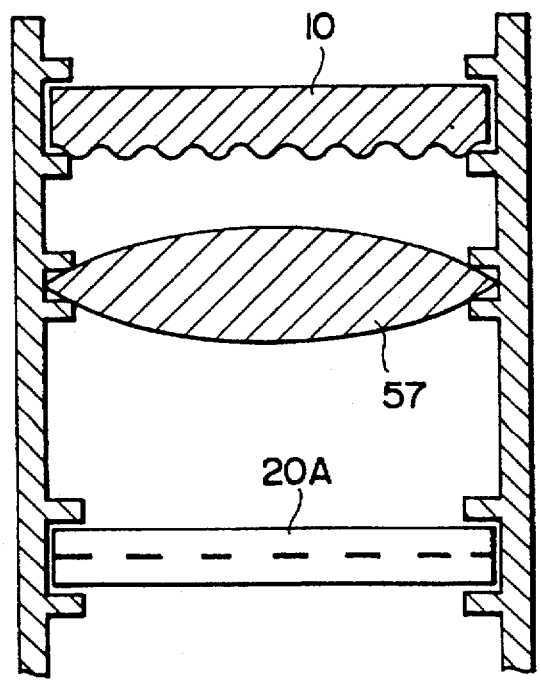
FIG. 65 illustrates another example of the structure in a viewfinder.

FIGS. 64 and 65 illustrate the construction of a viewfinder in a video camera.

In FIG. 64, a liquid-crystal display device (inclusive of the liquid-crystal panel and polarizing plates) 20A and the optical low-pass filter 10 are incorporated within a cylinder 55 and fixed. A long distance is provided between the liquid-crystal display device 20A and optical low-pass filter 10. In accordance with this arrangement, any dust that should happen to attach itself to the optical low-pass filter will appear blurred when viewed (because the focal point of the observer's eye is located on the display plane of the display device 20A). As a result, a decline in image quality due to clinging dust is reduced.

A lens 57 may be placed between the liquid-crystal display 20A and optical low-pass filter 10, as depicted in FIG. 65. As will be illustrated later, the lens 57 can also be placed on the outer side of the optical low-pass filter 10.

Examples of display panels which may utilize the optical low-pass filter are the above-mentioned liquid-crystal panel, a plasma display, a light-emitting diode array and an electroluminescent (EL) display.

Examples of display devices which may utilize the optical low-pass filter are a television, a television projector and the viewfinder of a video camera, etc.

Finally, a typical example of application of an image display device having an optical low-pass filter will be described.

Figure 66:
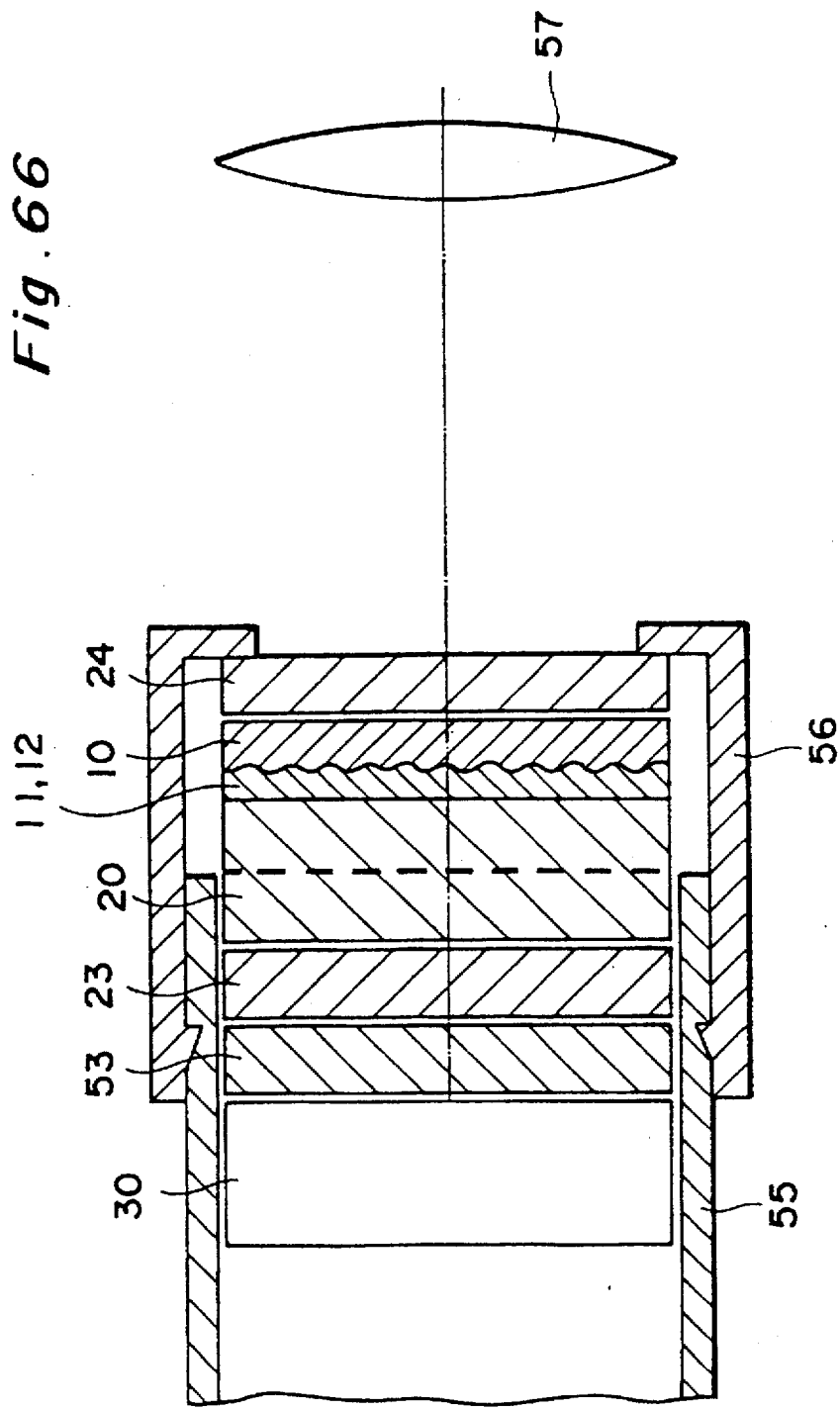
FIG. 66 is a sectional view showing the construction of the viewfinder.

FIG. 66 illustrates the optical system of a viewfinder provided on a video camera (inclusive of a still-video camera). The light source 30, a light diffusing plate 53, the polarizing plate 23, the liquid-crystal panel 20, the optical low-pass filter 10 and the polarizing plate 24 are fitted into a cylinder 55 in the order mentioned, and a cap 56 is attached to front end of the cylinder. The optical low-pass filter 10 is secured to the front face of the liquid-crystal panel 20 via the bonding layer 11 or adhesive layer 12.

A video signal from an image sensing device of the video camera is applied to the liquid-crystal panel 20 after being subjected to suitable signal processing. The captured image is displayed on the liquid-crystal panel 20. If necessary, the lens 57 is provided in front of the liquid-crystal panel 20.

Figure 67:
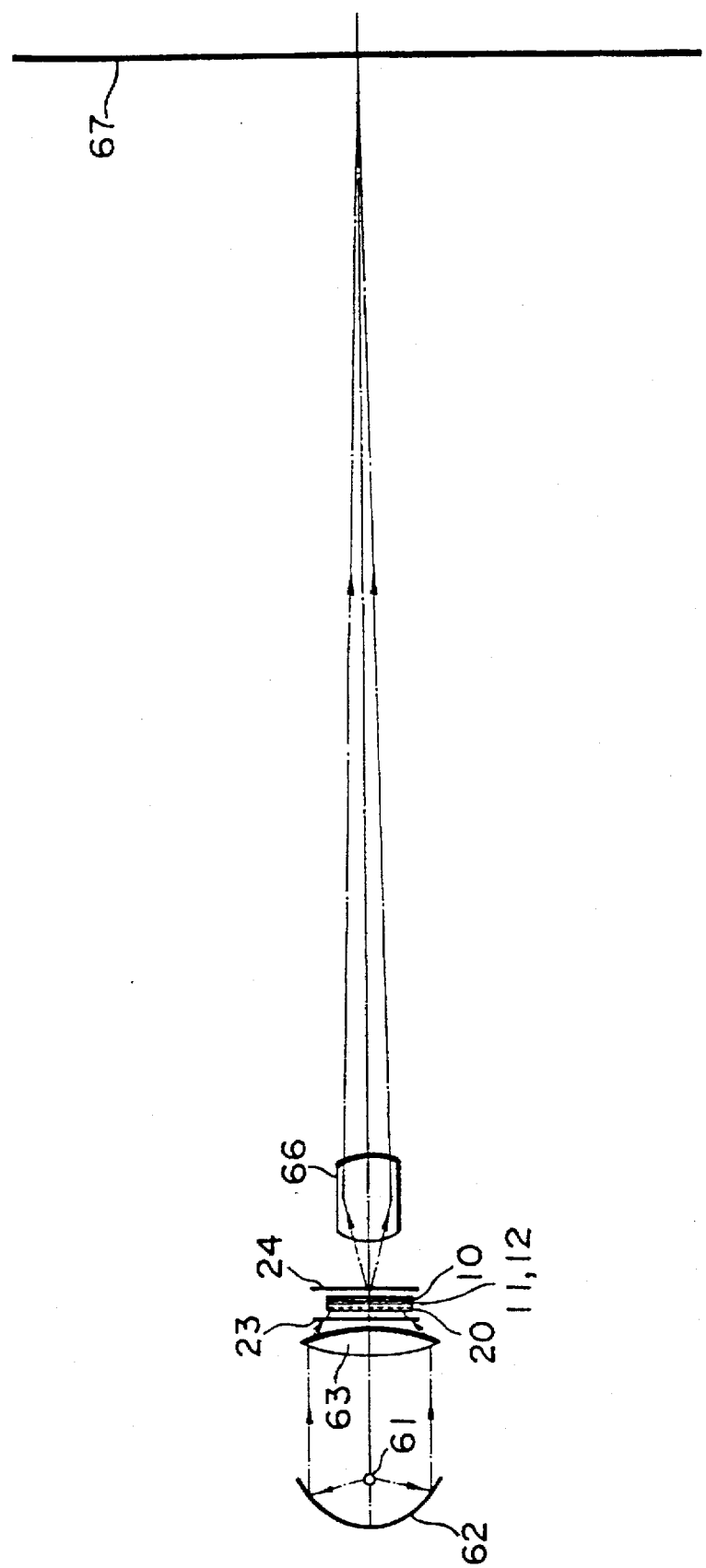
FIG. 67 is a diagram showing the construction of a TV projector.

FIG. 67 illustrates the overall optical construction of a liquid-crystal TV (television) projector.

Light produced by a light source 61 is rendered substantially parallel by being reflected by a parabolic mirror 62 placed in back of the light source 61, and the parallel light is condensed by a condenser lens 63. The liquid-crystal panel 20 is placed on optical path of the light condensed by the condenser lens 63. The two polarizing plates 24, 23 whose polarizing directions perpendicularly intersect each other are provided in front and back, respectively, of the liquid-crystal panel 20. The optical low-pass filter 10 is secured to the front face of the liquid-crystal panel 20 via the bonding layer 11 or adhesive layer 12.

The liquid-crystal panel 20 is controlled by a video signal applied externally as set forth above. As a result, the image represented by the video signal appears on the plane of the liquid-crystal panel 20. The image represented by the light that has passed through the liquid-crystal panel 20 and polarizing plates 23, 24 is formed on a distant screen 67 through an image forming lens 66.

As many apparently widely different embodiments of the present invention can be made without departing from the spirit and scope thereof, it is to be understood that the invention is not limited to the specific embodiments thereof except as defined in the appended claims.

What is claimed is:

1. An image display device comprising:

an image display body having a plurality of pixels arranged periodically in two dimensions; and an optical low-pass filter placed on or above a front surface of said image display body;

one of two cut-off spatial frequencies in at least one direction of said optical low-pass filter being set within a range of values greater than ¼ and less than ¾ of a specific sampling frequency among sampling frequencies determined by a pixel arrangement of said image display body, and the other of the two cut-off spatial frequencies being set within a range of values greater than ¾ and less than 5⁄4 of the specific sampling frequency, where said specific sampling frequency is taken as being 1.

2. The device according to claim 1, wherein when two basic frequency vectors capable of expressing all sampling frequencies decided by the pixel arrangement of the image display body are considered, said specific sampling frequency is decided by a value that is twice at least one of the basic frequency vectors.

3. The device according to claim 1, wherein when two basic frequency vectors capable of expressing all sampling frequencies decided by the pixel arrangement of the image display body are considered, said specific sampling frequency is decided by the sum of or difference between the two basic frequency vectors.

4. The device according to claim 1, wherein when two basic frequency vectors capable of expressing all sampling frequencies decided by the pixel arrangement of the image display body are considered, said specific sampling frequency is decided by a value twice the sum of or twice the difference between the two basic frequency vectors.

5. The device according to claim 1, wherein the pixel arrangement in said image display body is a stripe arrangement composed of rows and columns perpendicularly intersecting each other;

said optical low-pass filter splitting incident light into at least three light rays in one direction, the optic axis of any of these split light rays serving as a central optic axis, and there being at least one set of optic axes having point symmetry with respect to this central optic axis;

said image display body having a pixel period in the row direction which is $\Lambda_x$ and a pixel period in the column direction which is $\Lambda_y$;

a relative position of a virtual image of a pixel, which virtual image is formed on said image display body by the one set of split light rays, with respect to the central optic axis being represented by a row-direction component $X_1$ of the pixel arrangement and a column-direction component $Y_1$ of the pixel arrangement;

any one of the following set of Equations (1) and (2), set of Equations (3) and (4), set of Equations (5) and (6) and set of Equations (7) and (8) holding when the light-intensity ratio of light on the central optic axis to incident light and the light-intensity ratio of the one set of split light rays to incident light are represented by $P_0$ and $P_1$, respectively:

$$\frac{1}{4} < \frac{\cos^{-1}(-P_0/2P_1)}{4\pi X_1/\Lambda_x} < \frac{3}{4} \qquad \text{Eq. (1)}$$

$$\frac{3}{4} < \frac{2\pi - \cos^{-1}(-P_0/2P_1)}{4\pi X_1/\Lambda_x} < \frac{5}{4} \qquad \text{Eq. (2)}$$

$$\frac{1}{4} < \frac{\cos^{-1}(-P_0/2P_1)}{4\pi Y_1/\Lambda_y} < \frac{3}{4} \qquad \text{Eq. (3)}$$

$$\frac{3}{4} < \frac{2\pi - \cos^{-1}(-P_0/2P_1)}{4\pi Y_1/\Lambda_y} < \frac{5}{4} \qquad \text{Eq. (4)}$$

$$\frac{1}{4} < \frac{\cos^{-1}(-P_0/2P_1)}{2\pi(X_1/\Lambda_x + Y_1/\Lambda_y)} < \frac{3}{4} \qquad \text{Eq. (5)}$$

$$\frac{3}{4} < \frac{2\pi - \cos^{-1}(-P_0/2P_1)}{2\pi(X_1/\Lambda_x + Y_1/\Lambda_y)} < \frac{5}{4} \qquad \text{Eq. (6)}$$

$$\frac{1}{4} < \frac{\cos^{-1}(-P_0/2P_1)}{2\pi(X_1/\Lambda_x - Y_1/\Lambda_y)} < \frac{3}{4} \qquad \text{Eq. (7)}$$

$$\frac{3}{4} < \frac{2\pi - \cos^{-1}(-P_0/2P_1)}{2\pi(X_1/\Lambda_x - Y_1/\Lambda_y)} < \frac{5}{4} \qquad \text{Eq. (8)}$$

6. The device according to claim 1, wherein the pixel arrangement in said image display body is a delta arrangement composed of rows and columns perpendicularly intersecting each other, mutually adjacent rows being offset from each other by a half period; .

said optical low-pass filter splitting incident light into at least three light rays in one direction, the optic axis of any of these split light rays serving as a central optic axis, and there being at least one set of optic axes having point symmetry with respect to this central optic axis;

said image display body having a pixel period in the row direction which is $\Lambda_x$ and a pixel period in the column direction which is $\Lambda_y$;

a relative position of a virtual image of a pixel, which virtual image is formed on said image display body by the one set of split light rays, with respect to the central optic axis being represented by a row-direction component $X_1$ of the pixel arrangement and a column-direction component $Y_1$ of the pixel arrangement;

any one of the following set of Equations (9) and (10), set of Equations (11) and (12), set of Equations (13) and (14), set of Equations (15) and (16), set of Equations (17) and (18) and set of Equations (19) and (20) holding when the light-intensity ratio of light on the central optic axis to incident light and the light-intensity ratio of the one set of split light rays to incident light are represented by $P_0$ and $P_1$, respectively:

$$\frac{1}{4} < \frac{\cos^{-1}(-P_0/2P_1)}{2\pi(2X_1/\Lambda_x + 2Y_1/\Lambda_y)} < \frac{3}{4} \quad \text{Eq. (9)}$$

$$\frac{3}{4} < \frac{2\pi - \cos^{-1}(-P_0/2P_1)}{2\pi(2X_1/\Lambda_x + 2Y_1/\Lambda_y)} < \frac{5}{4} \quad \text{Eq. (10)}$$

$$\frac{1}{4} < \frac{\cos^{-1}(-P_0/2P_1)}{-2 2\pi(X_1/\Lambda_x + 2Y_1/\Lambda_y)} < \frac{3}{4} \quad \text{Eq. (11)}$$

$$\frac{3}{4} < \frac{2\pi - \cos^{-1}(-P_0/2P_1)}{2\pi(-2X_1/\Lambda_x + 2Y_1/\Lambda_y)} < \frac{5}{4} \quad \text{Eq. (12)}$$

$$\frac{1}{4} < \frac{\cos^{-1}(-P_0/2P_1)}{4\pi X_1/\Lambda_x} < \frac{3}{4} \quad \text{Eq. (13)}$$

$$\frac{3}{4} < \frac{2\pi - \cos^{-1}(-P_0/2P_1)}{4\pi X_1/\Lambda_x} < \frac{5}{4} \quad \text{Eq. (14)}$$

$$\frac{1}{4} < \frac{\cos^{-1}(-P_0/2P_1)}{4\pi Y_1/\Lambda_y} < \frac{3}{4} \quad \text{Eq. (15)}$$

$$\frac{3}{4} < \frac{2\pi - \cos^{-1}(-P_0/2P_1)}{4\pi Y_1/\Lambda_y} < \frac{5}{4} \quad \text{Eq. (16)}$$

$$\frac{1}{4} < \frac{\cos^{-1}(-P_0/2P_1)}{8\pi X_1/\Lambda_x} < \frac{3}{4} \quad \text{Eq. (17)}$$

$$\frac{3}{4} < \frac{2\pi - \cos^{-1}(-P_0/2P_1)}{8\pi X_1/\Lambda_x} < \frac{5}{4} \quad \text{Eq. (18)}$$

$$\frac{1}{4} < \frac{\cos^{-1}(-P_0/2P_1)}{8\pi Y_1/\Lambda_y} < \frac{3}{4} \quad \text{Eq. (19)}$$

$$\frac{3}{4} < \frac{2\pi - \cos^{-1}(-P_0/2P_1)}{8\pi Y_1/\Lambda_y} < \frac{5}{4} \quad \text{Eq. (20)}$$

7. The device according to claim 1, wherein the pixel arrangement in said image display body is a mosaic arrangement composed of rows and columns perpendicularly intersecting each other, basic rows being arranged in the column direction and staggered by one-third period in the row direction;

said optical low-pass filter splitting incident light into at least three light rays in one direction, the optic axis of any of these split light rays serving as a central optic axis, and there being at least one set of optic axes having point symmetry with respect to this central optic axis;

said image display body having a pixel period in the row direction which is $\Lambda_x$ and a pixel period in the column direction which is $\Lambda_y$;

a relative position of a virtual image of a pixel, which virtual image is formed on said image display body by the one set of split light rays, with respect to the central optic axis being represented by a row-direction component $X_1$ of the pixel arrangement and a column-direction component $Y_1$ of the pixel arrangement;

any one of the following set of Equations (21) and (22), set of Equations (23) and (24), set of Equations (25) and (26), set of Equations (27) and (28), set of Equations (29) and (30) and set of Equations (31) and (32) holding when the light-intensity ratio of light on the central optic axis to incident light and the light-intensity ratio of the one set of split light rays to incident light are represented by $P_0$ and $P_1$, respectively:

$$\frac{1}{4} < \frac{\cos^{-1}(-P_0/2P_1)}{2\pi(2X_1/\Lambda_x + 2Y_1/\Lambda_y)} < \frac{3}{4} \quad \text{Eq. (21)}$$

$$\frac{3}{4} < \frac{2\pi - \cos^{-1}(-P_0/2P_1)}{2\pi(2X_1/\Lambda_x + 2Y_1/\Lambda_y)} < \frac{5}{4} \quad \text{Eq. (22)}$$

$$\frac{1}{4} < \frac{\cos^{-1}(-P_0/2P_1)}{2\pi(-2X_1/\Lambda_x + 4Y_1/\Lambda_y)} < \frac{3}{4} \quad \text{Eq. (23)}$$

$$\frac{3}{4} < \frac{2\pi - \cos^{-1}(-P_0/2P_1)}{2\pi(-2X_1/\Lambda_x + 4Y_1/\Lambda_y)} < \frac{5}{4} \quad \text{Eq. (24)}$$

$$\frac{1}{4} < \frac{\cos^{-1}(-P_0/2P_1)}{2\pi(2X_1/\Lambda_x - Y_1/\Lambda_y)} < \frac{3}{4} \quad \text{Eq. (25)}$$

$$\frac{3}{4} < \frac{2\pi - \cos^{-1}(-P_0/2P_1)}{2\pi(2X_1/\Lambda_x - Y_1/\Lambda_y)} < \frac{5}{4} \quad \text{Eq. (26)}$$

$$\frac{1}{4} < \frac{\cos^{-1}(-P_0/2P_1)}{6\pi Y_1/\Lambda_y} < \frac{3}{4} \quad \text{Eq. (27)}$$

$$\frac{3}{4} < \frac{2\pi - \cos^{-1}(-P_0/2P_1)}{6\pi Y_1/\Lambda_y} < \frac{5}{4} \quad \text{Eq. (28)}$$

$$\frac{1}{4} < \frac{\cos^{-1}(-P_0/2P_1)}{2\pi(4X_1/\Lambda_x - 2Y_1/\Lambda_y)} < \frac{3}{4} \quad \text{Eq. (29)}$$

$$\frac{3}{4} < \frac{2\pi - \cos^{-1}(-P_0/2P_1)}{2\pi(4X_1/\Lambda_x - 2Y_1/\Lambda_y)} < \frac{5}{4} \quad \text{Eq. (30)}$$

$$\frac{1}{4} < \frac{\cos^{-1}(-P_0/2P_1)}{12\pi Y_1/\Lambda_y} < \frac{3}{4} \quad \text{Eq. (31)}$$

$$\frac{3}{4} < \frac{2\pi - \cos^{-1}(-P_0/2P_1)}{12\pi Y_1/\Lambda_y} < \frac{5}{4} \quad \text{Eq. (32)}$$

8. The device according to claim 1, wherein said optical low-pass filter is a two-dimensional phase grating or a two-dimensional prism plate.

9. The device according to claim 5, wherein said image display body is a color image display body and is composed of an arrangement of pixels of a plurality of colors, said pixel periods $\Lambda_x$, $\Lambda_y$ being decided by the arrangement of pixels of one color among said plurality of colors.

10. The device according to claim 1, wherein said optical low-pass filter has a characteristic determined using a wavelength in the vicinity of the central wavelength of displayed light.

11. The device according to claim 1, wherein an image is displayed using a plurality of colors, and said optical low-pass filter has a characteristic determined using a central wavelength.

12. The device according to claim 8, wherein said two-dimensional phase grating is a sinusoidal phase grating.

13. The device according to claim 8, wherein said two-dimensional phase grating is constituted by two one-dimensional phase gratings formed on respective ones of two sides of a substrate, said two phase gratings having grating directions that differ from each other.

14. The device according to claim 8, wherein said two-dimensional phase grating is constituted by two one-dimensional phase gratings having grating directions that differ from each other.

15. The device according to claim 1, wherein said optical low-pass filter is fixed on said image display body in a manner in intimate contact therewith.

16. The device according to claim 1, wherein said optical low-pass filter is secured to said image display body via a bonding layer or adhesive layer.

17. The device according to claim 1, wherein said optical low-pass filter is provided between said image display body and a lens.

18. The device according to claim 1, wherein said image display body is an image display element of a liquid-crystal display device, a plasma display device, an electroluminescent device or CRT display device.

19. A viewfinder of a video camera having the image display device set forth in claim 1.

20. A TV projector having the image display device set forth in claim 1.

21. A television having the image display device set forth in claim 1.

* * * * *